(12) United States Patent
Kobayashi et al.

(10) Patent No.: US 11,029,221 B2
(45) Date of Patent: Jun. 8, 2021

(54) SENSOR, INPUT DEVICE, AND ELECTRONIC APPARATUS

(71) Applicant: Sony Corporation, Tokyo (JP)

(72) Inventors: Ken Kobayashi, Kanagawa (JP); Akira Ebisui, Kanagawa (JP); Kei Tsukamoto, Kanagawa (JP); Taizo Nishimura, Kanagawa (JP); Tetsuro Goto, Tokyo (JP); Tomoki Kawabata, Kanagawa (JP); Makoto Yamaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 16/486,755

(22) PCT Filed: Feb. 16, 2018

(86) PCT No.: PCT/JP2018/005552
§ 371 (c)(1),
(2) Date: Aug. 16, 2019

(87) PCT Pub. No.: WO2018/151268
PCT Pub. Date: Aug. 23, 2018

(65) Prior Publication Data
US 2019/0376852 A1 Dec. 12, 2019

(30) Foreign Application Priority Data

Feb. 17, 2017 (JP) .............................. JP2017-028492
May 19, 2017 (JP) .............................. JP2017-100383

(51) Int. Cl.
*G01L 1/14* (2006.01)
*B32B 27/06* (2006.01)
(Continued)

(52) U.S. Cl.
CPC ............ *G01L 1/146* (2013.01); *B32B 27/065* (2013.01); *B32B 27/08* (2013.01); *G06F 3/044* (2013.01)

(58) Field of Classification Search
CPC ....... G01L 1/146; B32B 27/065; B32B 27/08; G06F 3/044
See application file for complete search history.

(56) References Cited

U.S. PATENT DOCUMENTS

2009/0278814 A1 11/2009 Fang et al.
2020/0037077 A1* 1/2020 Peterson ............... G06F 3/0448

FOREIGN PATENT DOCUMENTS

JP 2011-133421 A 7/2011
JP 2011-170659 A 9/2011
(Continued)

OTHER PUBLICATIONS

International Search Report and Written Opinion dated May 1, 2018 issued in connection with PCT Application No. PCT/2018/005552. (7 pages).

*Primary Examiner* — Michael C Miggins
(74) *Attorney, Agent, or Firm* — K&L Gates LLP

(57) ABSTRACT

An electronic apparatus includes: an exterior body; a pressure-sensitive sensor having a first surface and a second surface; a support body supporting the pressure-sensitive sensor such that the exterior body faces the first surface; and a first deformation layer disposed at least either between the first surface and the exterior body or between the second surface and the support body. The pressure-sensitive sensor includes a capacitive sensor electrode unit including a sensing unit, a reference electrode layer, and a second deformation layer disposed between the reference electrode (Continued)

layer and the sensor electrode unit. The first deformation layer and the second deformation layer satisfy a predetermined relationship.

14 Claims, 32 Drawing Sheets

(51) Int. Cl.
    *B32B 27/08*     (2006.01)
    *G06F 3/044*     (2006.01)

(56) References Cited

FOREIGN PATENT DOCUMENTS

| | | |
|---|---|---|
| JP | 2011-197991 A | 10/2011 |
| JP | 2013-132855 A | 7/2013 |
| WO | 2015/115411 A1 | 8/2015 |

\* cited by examiner

FIG. 1
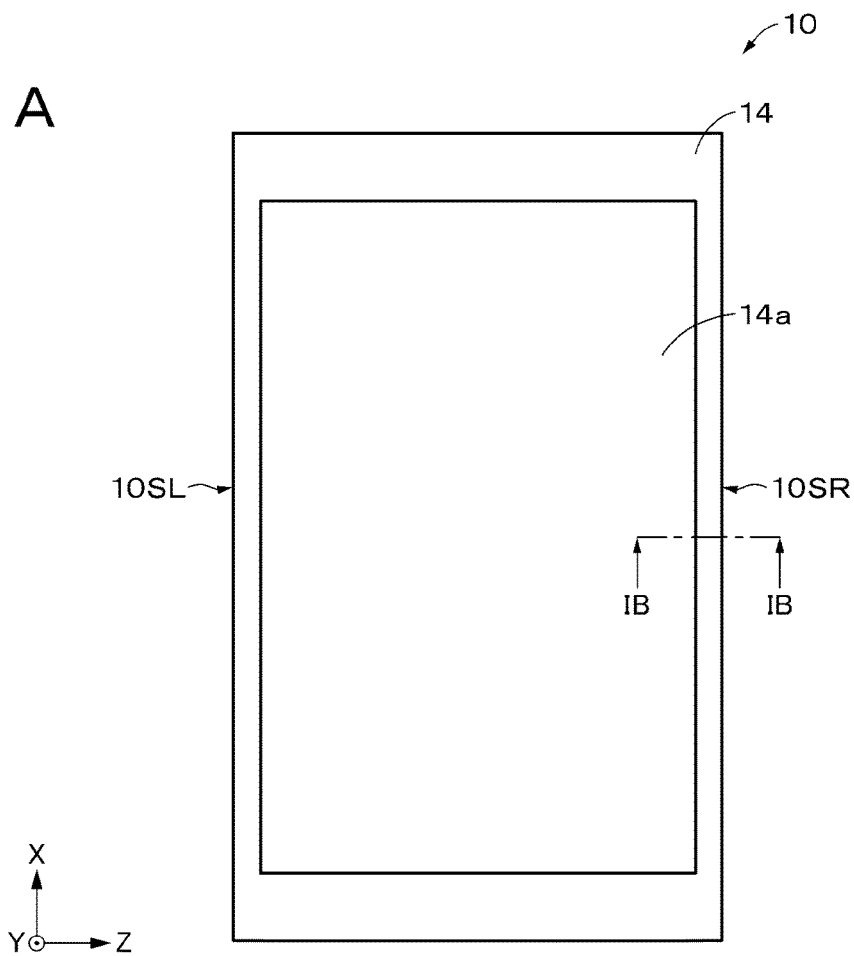
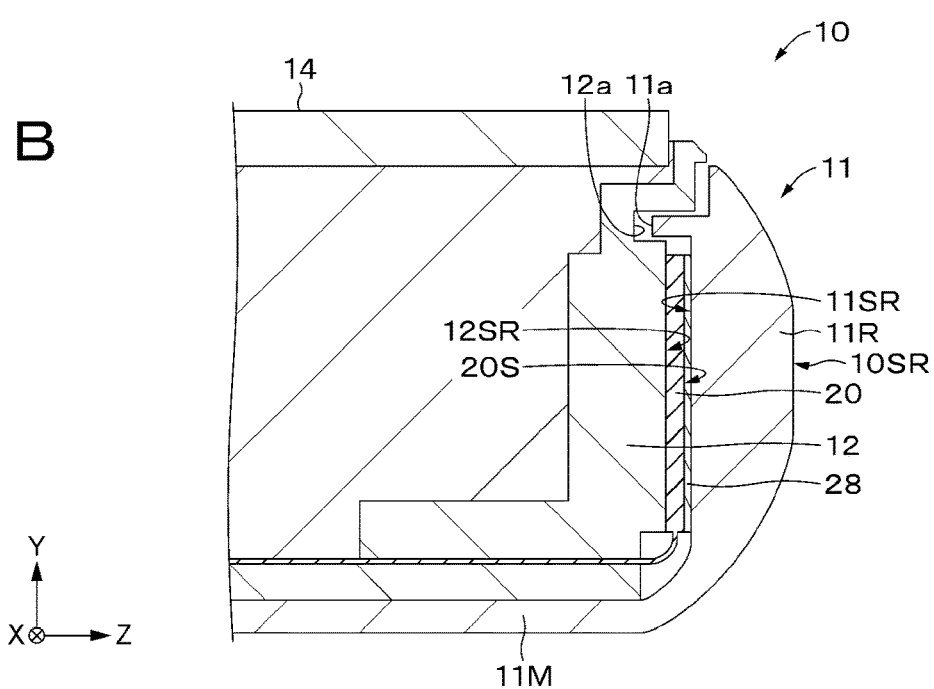

FIG. 3
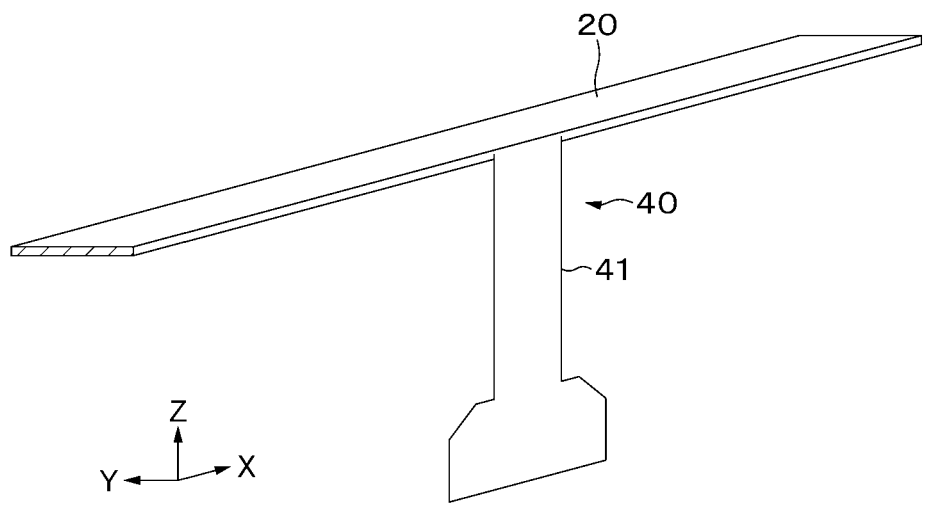
A
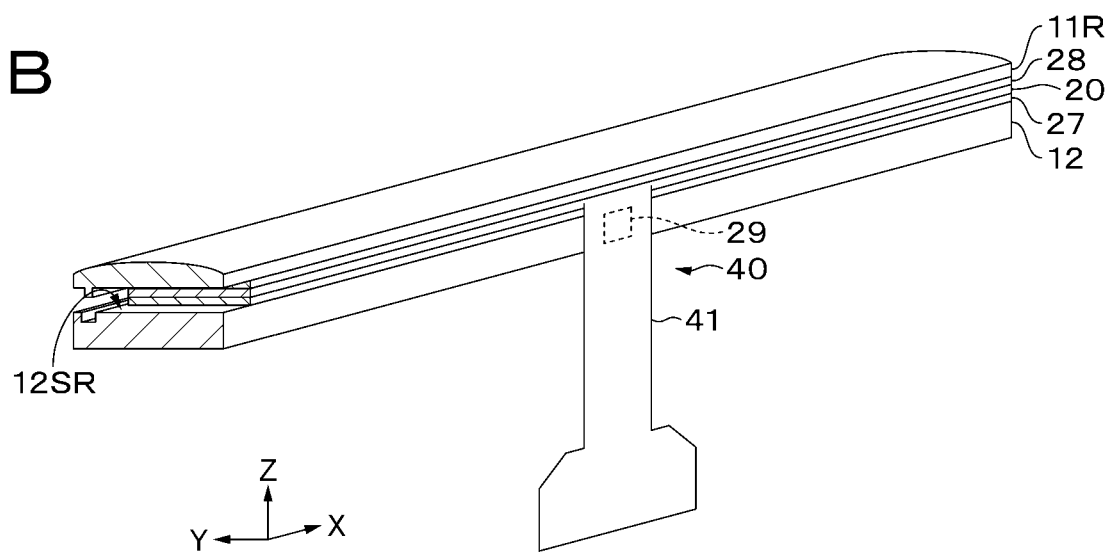
B

FIG. 15
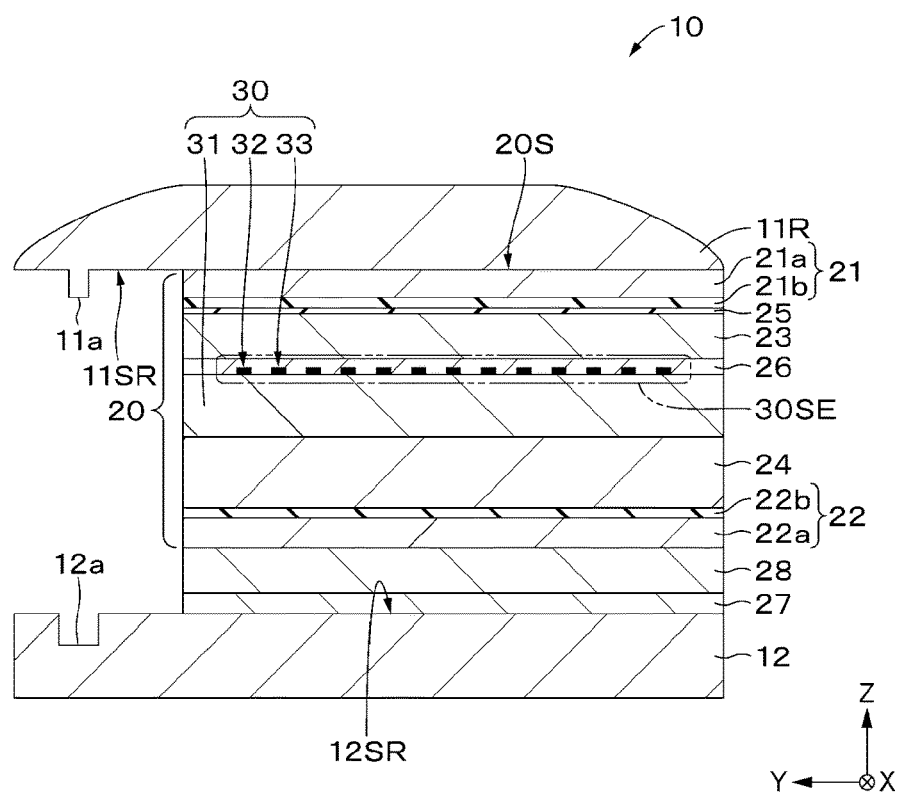
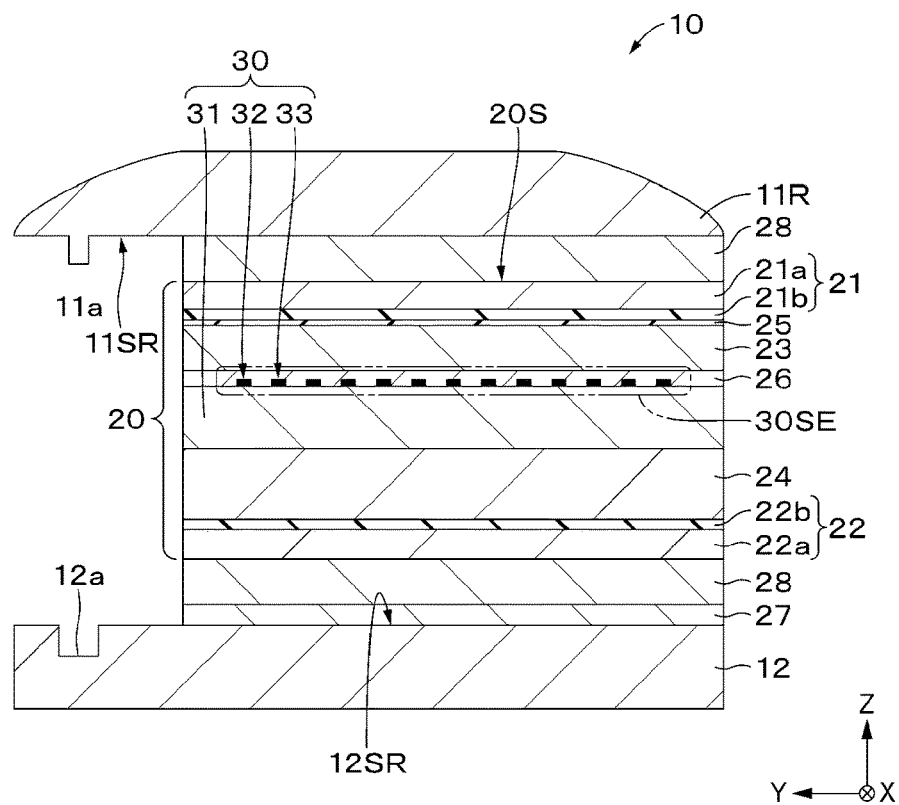

FIG. 17
A
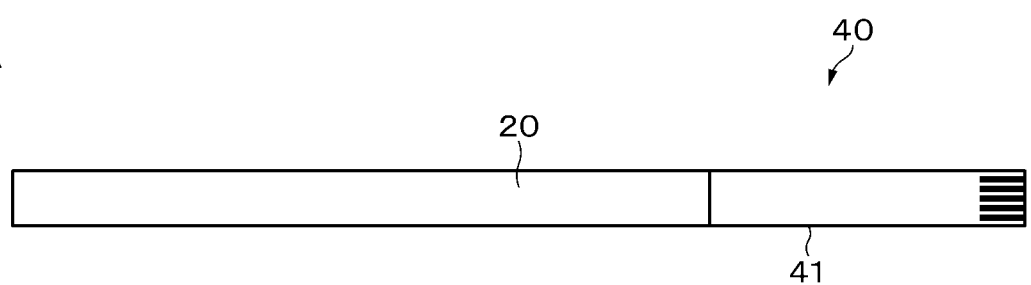
B
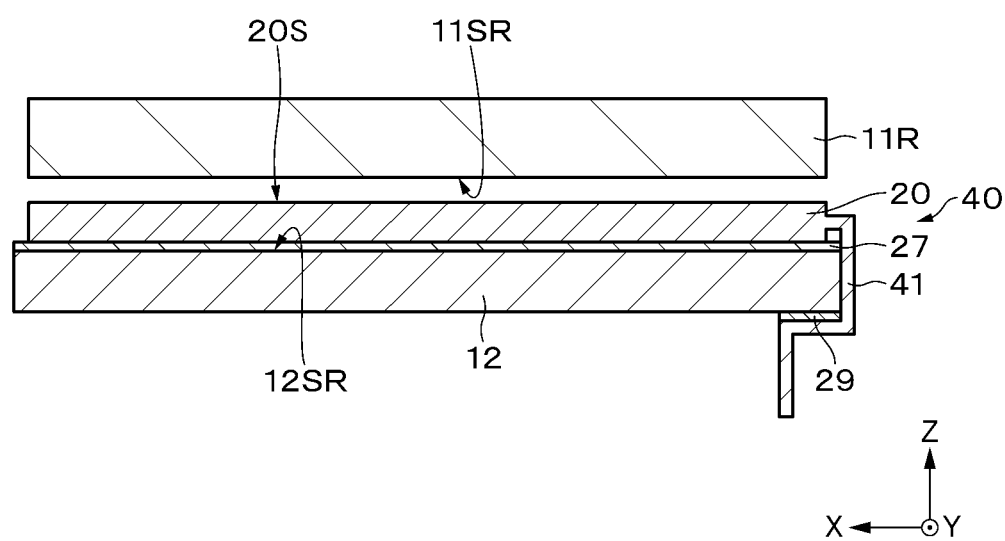

FIG. 20
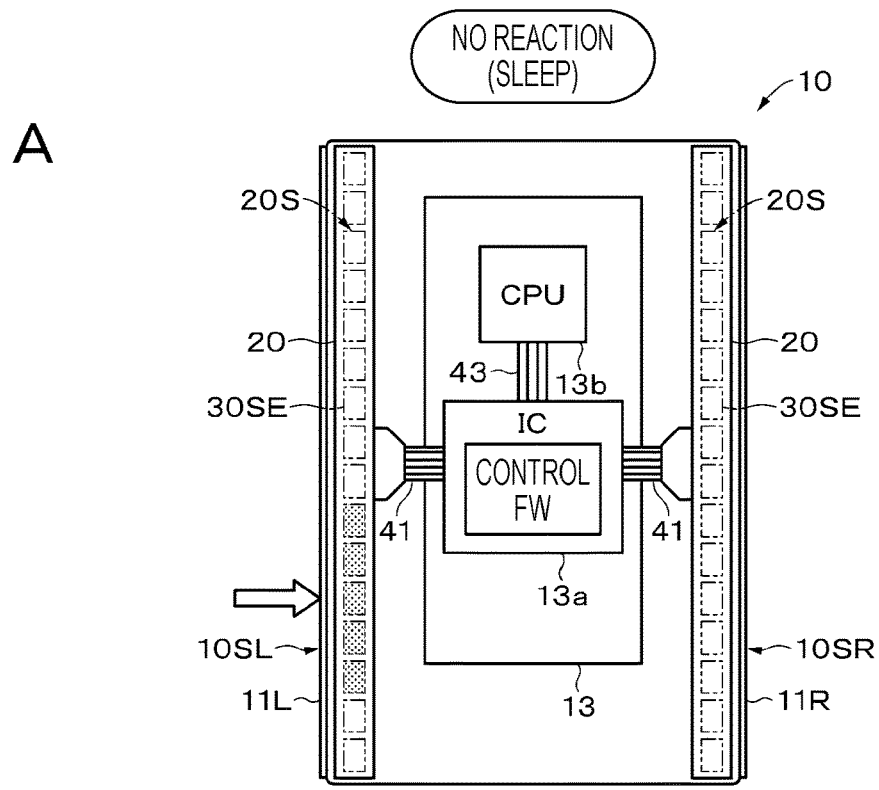
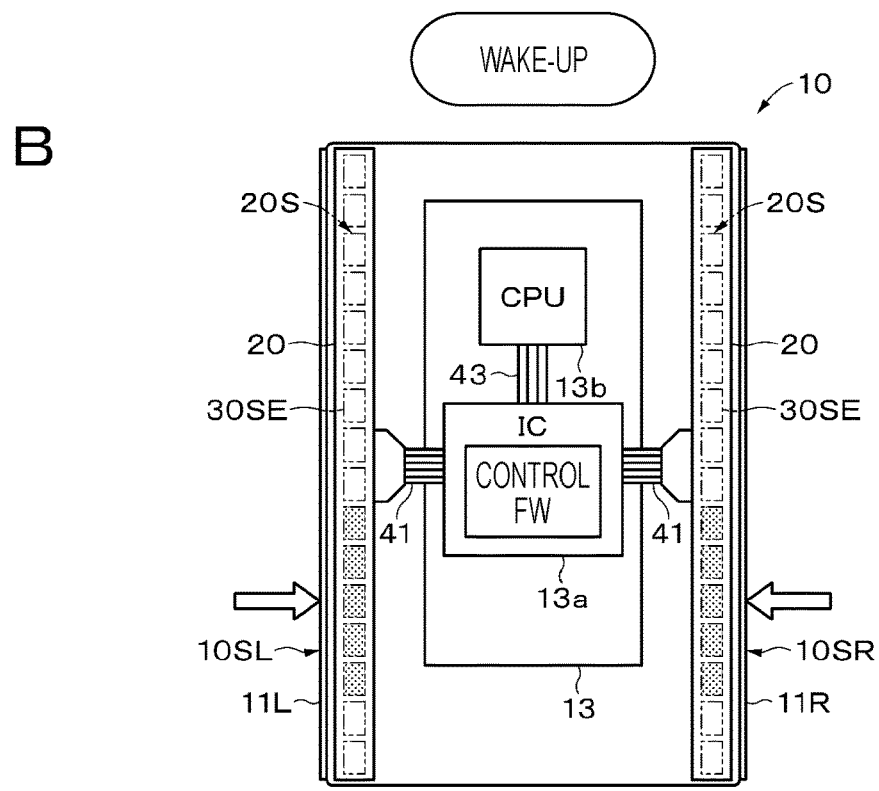

*FIG. 22*
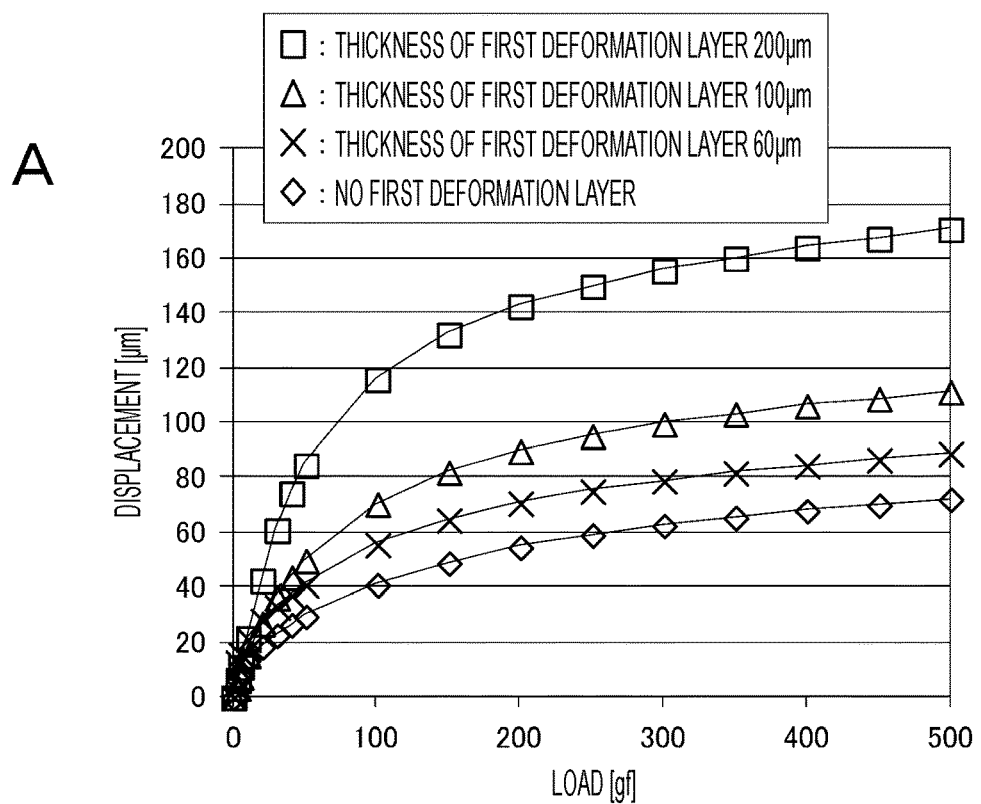
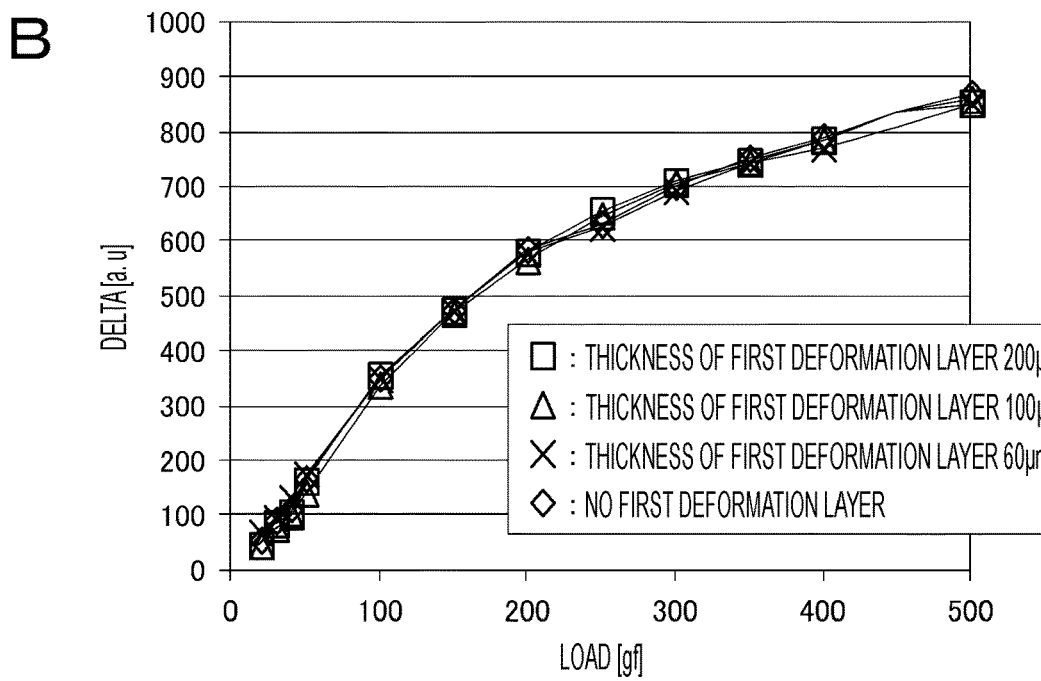

FIG. 25
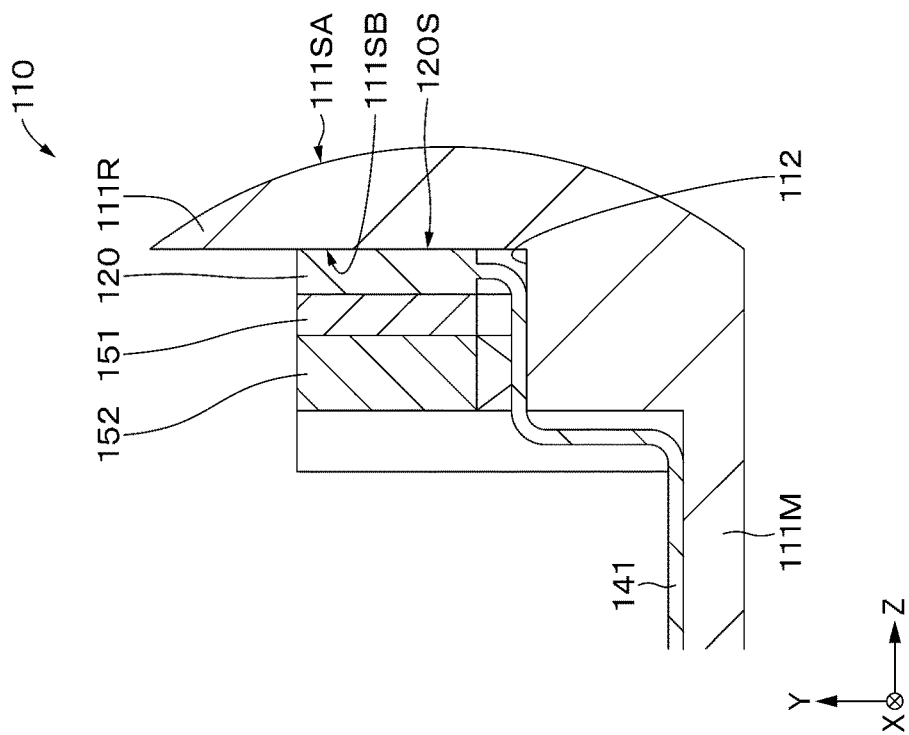
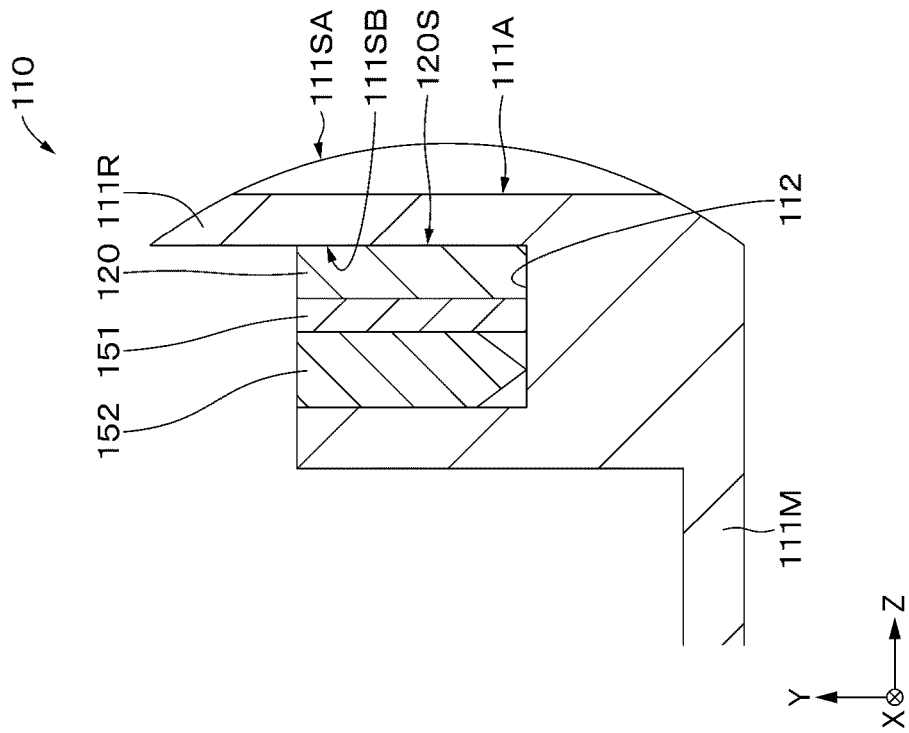

FIG. 33
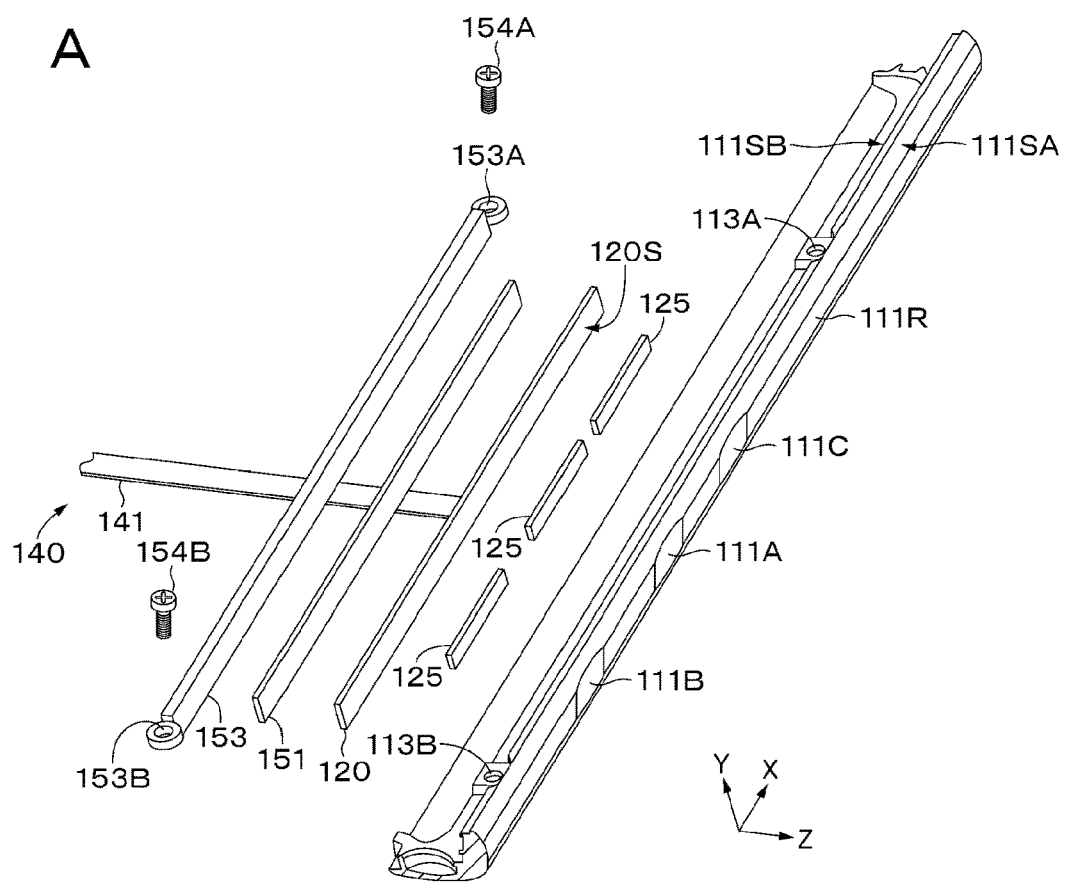
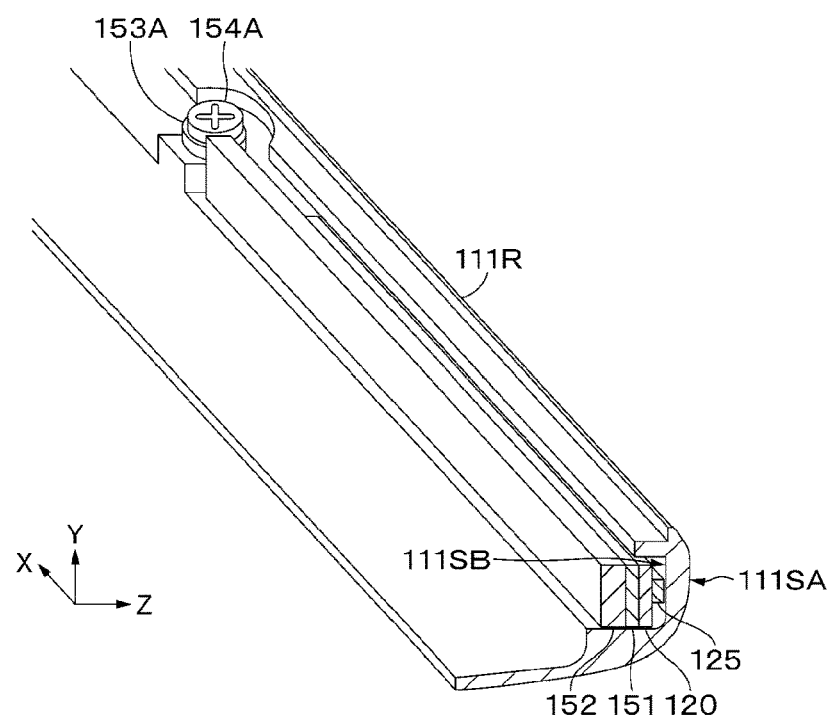

SENSOR, INPUT DEVICE, AND ELECTRONIC APPARATUS

TECHNICAL FIELD

The present technology relates to a sensor, an input device, and an electronic apparatus.

BACKGROUND ART

In recent years, a sensor capable of electrostatically detecting input operation has been widely used for various electronic apparatuses such as a mobile personal computer (PC) and a tablet PC. As a sensor for an electronic apparatus, a sensor including a capacitive element and capable of detecting an operation position of an operating element on an input operation surface and a pressing force is known (see, for example, Patent Document 1).

CITATION LIST

Patent Document

Patent Document 1: Japanese Patent Application Laid-Open No. 2011-170659

SUMMARY OF THE INVENTION

Problems to be Solved by the Invention

An object of the present technology is to provide a sensor, an input device, and an electronic apparatus capable of improving a dynamic range in load sensitivity.

Solutions to Problems

In order to solve the above-described problem, a first technique relates to an electronic apparatus including: an exterior body; a pressure-sensitive sensor having a first surface and a second surface; a support body supporting the pressure-sensitive sensor such that the exterior body faces the first surface; and a first deformation layer disposed at least either between the first surface and the exterior body or between the second surface and the support body, in which the pressure-sensitive sensor includes a capacitive sensor electrode unit including a sensing unit, a reference electrode layer, and a second deformation layer disposed between the reference electrode layer and the sensor electrode unit, and the first deformation layer and the second deformation layer satisfy at least one of relationships represented by the following formulas (1) to (3).

Elastic modulus of first deformation layer≤elastic modulus of second deformation layer (1)

Thickness of first deformation layer≥thickness of second deformation layer (2)

Area occupancy of first deformation layer≤area occupancy of second deformation layer (3)

A second technique relates to an electronic apparatus including: an exterior body; a pressure-sensitive sensor having a first surface and a second surface; a support body supporting the pressure-sensitive sensor such that the exterior body faces the first surface; and a first deformation layer disposed at least either between the first surface and the exterior body or between the second surface and the support body and including a conductive material, in which the pressure-sensitive sensor includes a capacitive sensor electrode unit including a sensing unit, and a second deformation layer disposed between the first deformation layer and the sensor electrode unit, and the first deformation layer and the second deformation layer satisfy at least one of relationships represented by the following formulas (1) to (3).

Elastic modulus of first deformation layer≤elastic modulus of second deformation layer (1)

Thickness of first deformation layer≥thickness of second deformation layer (2)

Area occupancy of first deformation layer≤area occupancy of second deformation layer (3)

A third technique relates to a sensor including: a pressure-sensitive sensor main body having a first surface and a second surface; and a first deformation layer disposed on at least one of the first surface or the second surface, in which the pressure-sensitive sensor main body includes a capacitive sensor electrode unit including a sensing unit, a reference electrode layer, and a second deformation layer disposed between the reference electrode layer and the sensor electrode unit, and the first deformation layer and the second deformation layer satisfy at least one of relationships represented by the following formulas (1) to (3).

Elastic modulus of first deformation layer≤elastic modulus of second deformation layer (1)

Thickness of first deformation layer≥thickness of second deformation layer (2)

Area occupancy of first deformation layer≤area occupancy of second deformation layer (3)

A fourth technique relates to an input device including: an exterior body; a pressure-sensitive sensor having a first surface and a second surface; a support body supporting the pressure-sensitive sensor such that the exterior body faces the first surface; and a first deformation layer disposed at least either between the first surface and the exterior body or between the second surface and the support body, in which the pressure-sensitive sensor includes a capacitive sensor electrode unit including a sensing unit, a reference electrode layer, and a second deformation layer disposed between the reference electrode layer and the sensor electrode unit, and the first deformation layer and the second deformation layer satisfy at least one of relationships represented by the following formulas (1) to (3).

Elastic modulus of first deformation layer≤elastic modulus of second deformation layer (1)

Thickness of first deformation layer≥thickness of second deformation layer (2)

Area occupancy of first deformation layer≤area occupancy of second deformation layer (3)

Effects of the Invention

According to the present technology, a dynamic range in load sensitivity can be improved. Note that the effects described here are not necessarily limited, and may be any of the effects described in the present disclosure or may be different therefrom.

BRIEF DESCRIPTION OF DRAWINGS

FIG. 1A is a plan view illustrating the appearance of an electronic apparatus according to a first embodiment of the present technology. FIG. 1B is a cross-sectional view taken along line IB-IB of FIG. 1A.

FIG. 3A is a perspective view illustrating the shape of a sensor. FIG. 3B is a perspective view illustrating how the sensor is disposed.

FIGS. 15A and 15B are each a cross-sectional view illustrating a modification of how the first deformation layer is disposed.

FIG. 17A is a schematic view illustrating a modification of the flexible printed circuit. FIG. 17B is a schematic view illustrating how the flexible printed circuit illustrated in FIG. 17A is disposed.

FIGS. 20A and 20B are schematic views for explaining operation of the electronic apparatus at the time of wake-up operation.

FIG. 22A is a graph illustrating a relationship between a load and a displacement amount in the sensors of samples 1-1 to 1-4. FIG. 22B is a graph illustrating a relationship between a load and delta in the sensors of samples 1-1 to 1-4.

FIG. 25A is a cross-sectional view taken along line XXVA-XXVA of FIG. 24. FIG. 25B is a cross-sectional view taken along line XXVB-XXVB of FIG. 24.

FIG. 33A is an exploded perspective view illustrating the configuration of a sensor support. FIG. 33B is a perspective view illustrating the configuration of the sensor support.

MODE FOR CARRYING OUT THE INVENTION

Figure 2:
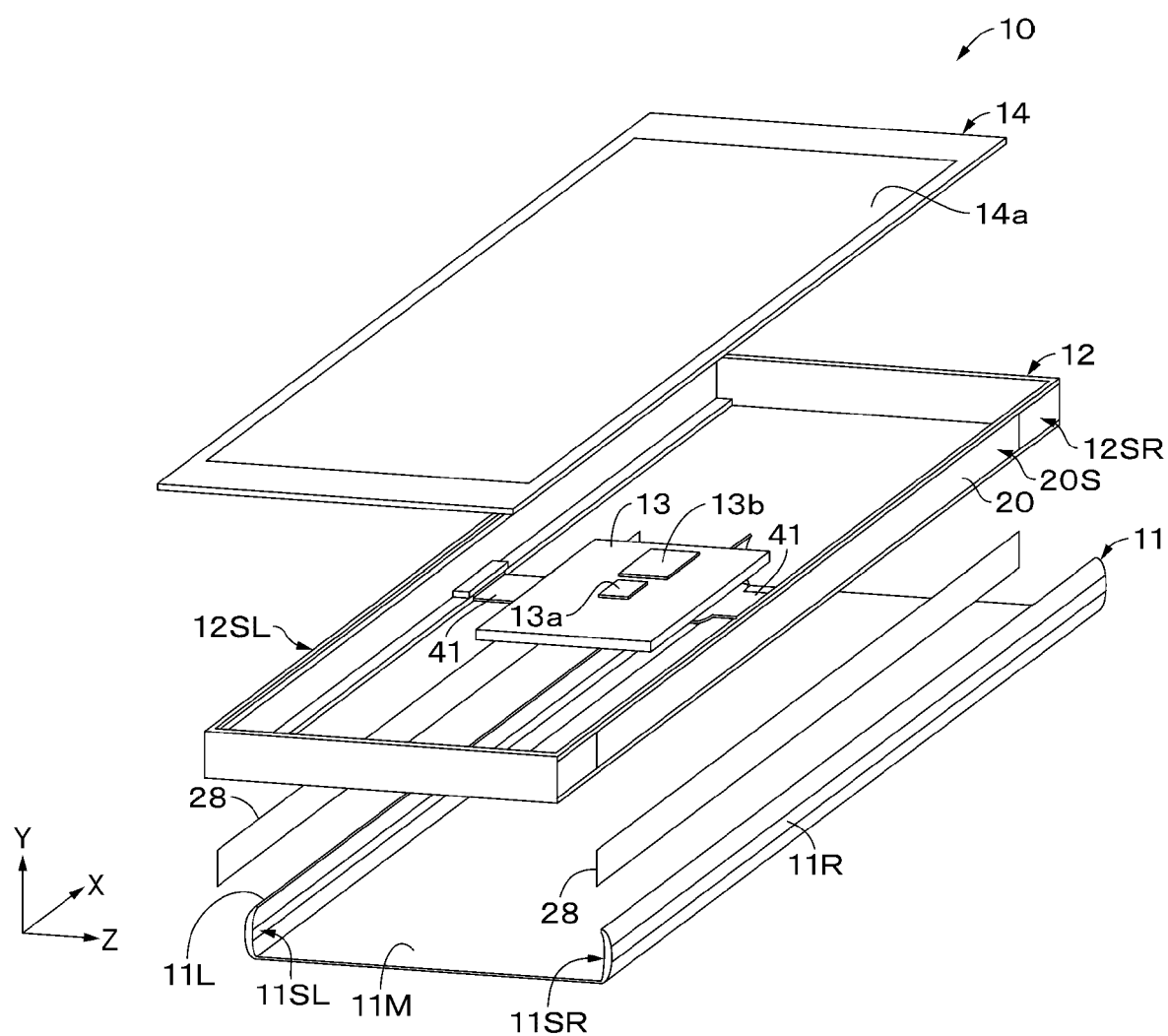
FIG. 2 is an exploded perspective view illustrating the configuration of the electronic apparatus according to the first embodiment of the present technology.

In the present technology, as the type of a sensor detection circuit, for example, a mutual capacitive type (for example, a circuit that operates by a charge transfer method used for a touch panel or the like), and a self-capacitive type (for example, a circuit that operates by a charge transfer method used for a touch switch or the like, or a circuit that operates using an alternating current resonance circuit used for a liquid level meter or the like) can be used.

In the present technology, as a sensor electrode unit, for example, a mutual capacitive electrode unit, a self-capacitive electrode unit, and a coil (also serving as a resonance coil) can be used. As the mutual capacitive electrode unit, for example, an electrode unit including a lattice-like or comb teeth-like pulse electrode and sense electrode can be used. As the self-capacitive electrode unit, for example, an electrode unit including one thin film-like electrode, an electrode unit including two lattice-like or comb teeth-like electrodes also serving as a resonance capacitor, or an electrode unit including two thin film-like electrodes also serving as a resonance capacitor can be used.

In the present technology, as a sensor, for example, a coil capacitor of an LC resonance circuit can be used. More specifically, as the sensor, a sensor including one sensing electrode and two chips of L and C for resonance on a substrate side, a sensor including one coil for sensing and resonance, and one chip of C for resonance on the substrate side, or a sensor including one capacitor for sensing and resonance, and one chip of L for resonance on the substrate side can be used.

Embodiments of the present technology will be described in the following order.

1 First embodiment
1.1 Outline
1.2 Configuration of electronic apparatus
1.3 Operation of sensor
1.4 Operation of electronic apparatus
1.5 Effect
1.6 Modification
2 Second embodiment
2.1 Configuration of electronic apparatus
2.2 Procedure for disposing sensor, elastic body, and spacer
2.3 Operation of electronic apparatus
2.4 Effect
2.5 Modification

[1.1 Outline]

In a case where a sensor is mounted on a housing (particularly inside the housing) such as a smartphone or a portable music player, a mounting location is largely restricted. Furthermore, there is a variation in intersection (clearance) accuracy of the dimensions of the housing and mounting. In order to attach the sensor within the above mounting restriction, a deformation layer (hereinafter referred to as "first deformation layer") is preferably disposed on at least one of a sensing surface of the sensor or the back surface thereof. However, in a case where pretension is applied to the first deformation layer at the time of mounting, the deformation layer (hereinafter referred to as "second deformation layer") inside the sensor may be crushed, and the sensitivity may be lowered. Therefore, in the present embodiment, in order to suppress crushing of the second deformation layer, the first and second deformation layers satisfy at least one of relationships represented by formulas (1) to (3) described later.

[1.2 Configuration of Electronic Apparatus]

Hereinafter, an electronic apparatus 10 according to the first embodiment of the present technology will be described with reference to FIGS. 1A, 1B, and 2. The electronic apparatus 10 according to the first embodiment of the present technology is a so-called smartphone, and includes: an exterior body 11 as a housing; two sensors 20 and 20 each having a sensing surface (first surface) 20S and the back surface (second surface) opposite thereto; a frame 12 as a support body supporting the sensors 20 and 20 such that inner side surfaces 11SR and 11SL of the exterior body 11 face the sensing surfaces 20S; first deformation layers 28 and 28 disposed between the sensing surface 20S and the inner side surfaces 11SR and 11SL; a substrate 13 disposed in the frame 12; and a front panel 14 disposed on the frame 12.

In the electronic apparatus 10, by pressing side surfaces 10SR and 10SL thereof with a hand or a finger, (1) wake-up operation, (2) slide operation, (3) automatic start-up operation of a camera application, (4) right/left hand detection function, and the like can be executed.

The exterior body 11, the sensor 20, the first deformation layer 28, and the frame 12 as a support body constitute an input device. The input device may further include the substrate 13 as necessary.

(Exterior Body)

The exterior body 11 includes: a rectangular main surface portion 11M constituting the back surface of the electronic apparatus 10; and side wall portions 11R and 11L disposed on both long sides of the main surface portion 11M. The frame 12 is housed between the side wall portions 11R and 11L. The side wall portions 11R and 11L can press the sensing surface 20S via the first deformation layer 28 by pressing the side wall portions 11R and 11L toward the sensing surface 20S. A protrusion 11a is formed near a tip of the inner side surface 11SR. The protrusion 11a is engaged with a recess 12a formed on a support surface 12SR of the frame 12. The inner side surface 11SL and a support surface 12SL also have similar configurations to the inner side surface 11SR and the support surface 12SR, respectively.

The exterior body 11 contains, for example, a metal, a polymer resin, or wood. Examples of the metal include a simple substance such as aluminum, titanium, zinc, nickel, magnesium, copper, or iron, and an alloy containing two or more kinds thereof. Specific examples of the alloy include stainless used steel (SUS), an aluminum alloy, a magnesium alloy, and a titanium alloy. Examples of the polymer resin include a copolymer synthetic resin of acrylonitrile, butadiene, and styrene (ABS resin), a polycarbonate (PC) resin, and a PC-ABS alloy resin.

(Frame)

When the frame 12 is viewed in plan from a direction perpendicular to the main surface portion 11M, the frame 12 has a rectangular shape slightly smaller than the main surface portion 11M. The frame 12 has support surfaces 12SR and 12SL facing the inner side surfaces 11SR and 11SR of the side wall portions 11R and 11L, respectively. The support surface 12SR supports the sensor 20 such that the inner side surface 11SR of the side wall portion 11R faces the sensing surface 20S. The first deformation layer 28 is disposed between the sensing surface 20S and the inner side surface 11SR. The support surface 12SL supports the sensor 20 such that the inner side surface 11SL of the side wall portion 11L faces the sensing surface 20S. The first deformation layer 28 is disposed between the sensing surface 20S and the inner side surface 11SL.

(Substrate)

The substrate 13 is a main substrate of the electronic apparatus 10, and includes a controller integrated circuit (IC) (hereinafter simply referred to as "IC") 13a and a main central processing unit (CPU) (hereinafter simply referred to as "CPU") 13b. The IC 13a is a control unit for controlling the two sensors 20 and detecting a pressure applied to each of the sensing surfaces 20S thereof. The CPU 13b is a control unit for controlling the entire electronic apparatus 10. For example, the CPU 13b executes various processes on the basis of a signal supplied from the IC 13a.

(Front Panel)

The front panel 14 includes a display device 14a, and the display device 14a has a capacitive touch panel on a surface thereof. The display device 14a displays a video (screen) on the basis of a video signal or the like supplied from the CPU 13b. Examples of the display device 14a include a liquid crystal display and an electro luminescence (EL) display, but are not limited thereto.

(Sensor)

Figure 5:
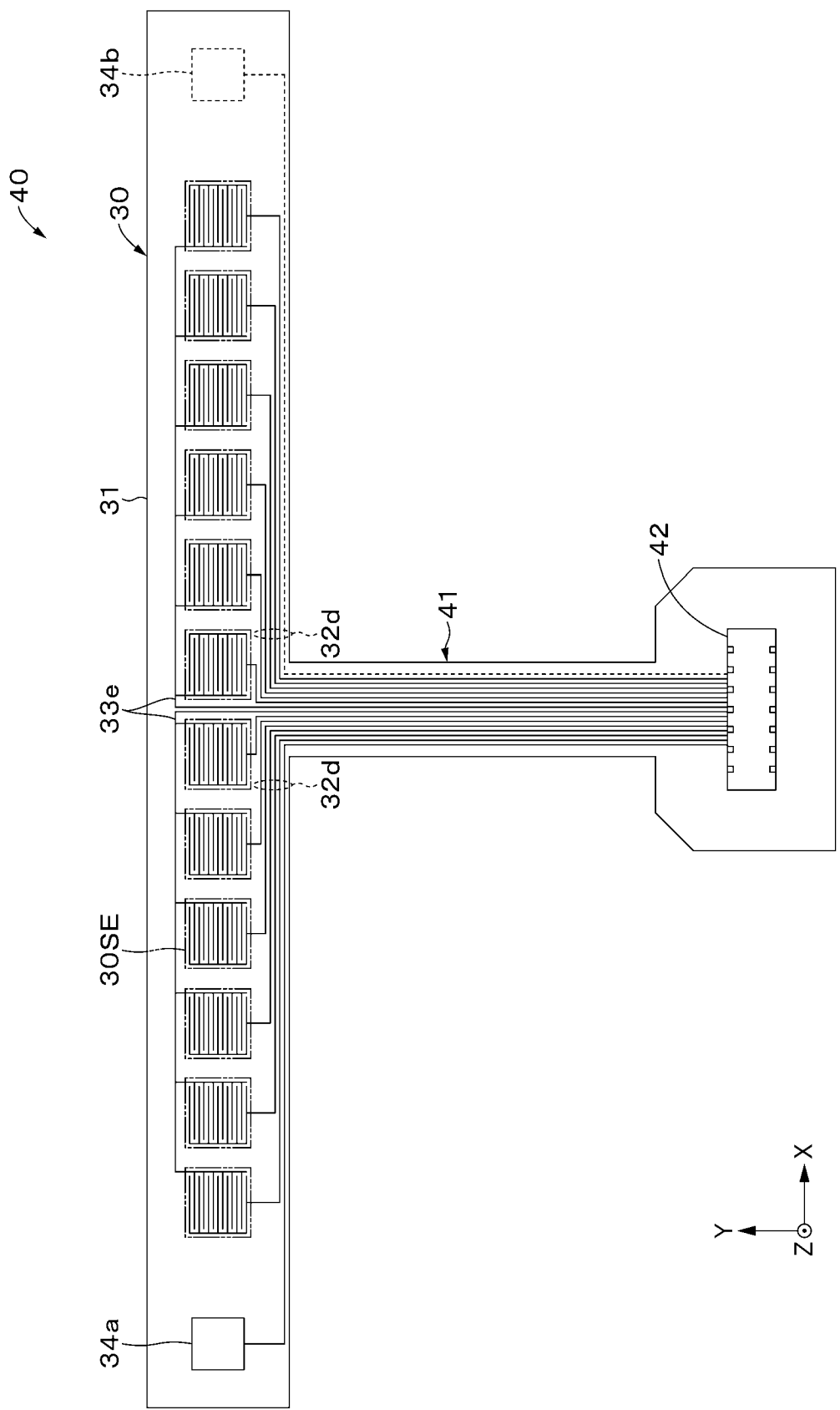
FIG. 5 is a plan view illustrating the configuration of a flexible printed circuit.

The sensor 20 is a so-called pressure-sensitive sensor and has a long rectangular shape as illustrated in FIG. 3A. A connecting portion 41 extends from the center of a long side of the sensor 20. More specifically, as illustrated in FIG. 5, the sensor 20 includes a sensor electrode unit 30 having a long rectangular shape, and the connecting portion 41 extends from the center of a long side of the sensor electrode unit 30. The sensor electrode unit 30 and the connecting portion 41 are integrally configured by one flexible printed circuit (hereinafter referred to as "FPC") 40.

As illustrated in FIG. 3B, the sensor 20 on the side of the side wall portion 11R is bonded to the support surface 12SR of the frame 12 via an adhesive layer 27. The sensor 20 on the side of the side wall portion 11L is also bonded to the support surface 12SL in a similar manner to the sensor 20 of the side wall portion 11R. Furthermore, since noise is generated when a force is applied to the FPC 40, the connecting portion 41 is preferably bonded to the frame 12 via an adhesive layer 29.

Figure 4:
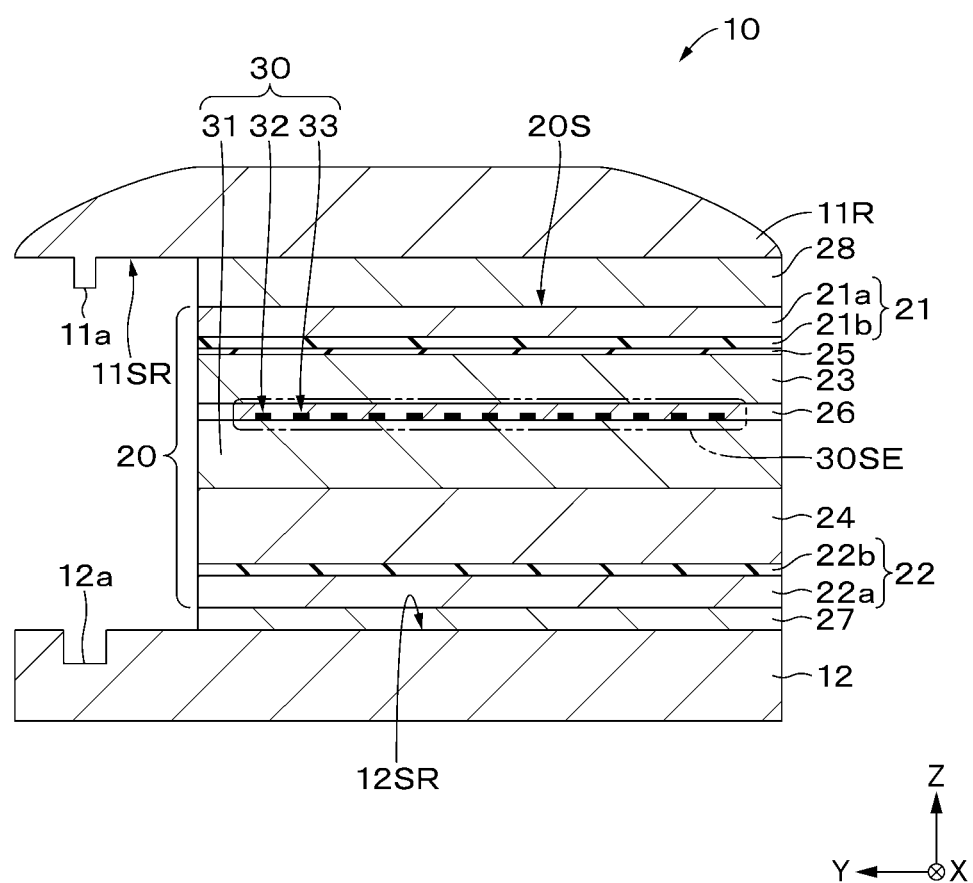
FIG. 4 is a cross-sectional view illustrating the configuration of the sensor.

The sensor 20 is a so-called pressure-sensitive sensor, and includes, as illustrated in FIG. 4, the capacitive sensor electrode unit 30 including a plurality of sensing units 30SE, electrode base materials 21 and 22, and second deformation layers 23 and 24, and adhesive layers 25 to 27. The back surface of the sensor 20 is bonded to the support surfaces 12SR and 12SL. Note that here, a longitudinal direction of the sensor 20 is referred to as ±X-axis direction, a width direction (short direction) thereof is referred to as ±Y-axis direction, and a direction perpendicular to the longitudinal direction and the width direction (that is, a direction perpendicular to the sensing surface 20S) is referred to as ±Z-axis direction.

The electrode base material 21 and the sensor electrode unit 30 are disposed such that main surfaces of the electrode base material 21 and the sensor electrode unit 30 face each other. The second deformation layer 23 is disposed between the main surfaces of the electrode base material 21 and the sensor electrode unit 30, and is elastically deformed by a pressure applied to the sensing surface 20S. The second deformation layer 23 and the electrode base material 21 are bonded to each other by the adhesive layer 25, and the second deformation layer 23 and the sensor electrode unit 30 are bonded to each other by the adhesive layer 26.

The electrode base material 22 and the sensor electrode unit 30 are disposed such that the main surfaces of the electrode base material 22 and the sensor electrode unit 30 face each other. The second deformation layer 24 is disposed between the electrode base material 22 and the sensor electrode unit 30, and is elastically deformed by a pressure applied to the sensing surface 20S. The second deformation layer 24 includes an adhesive material and also has a function as an adhesive layer. The electrode base material 22 and the sensor electrode unit 30 are bonded to each other by the second deformation layer 24.

(Sensor Electrode Unit)

As described above, the sensor electrode unit 30 has a long rectangular shape, and is a part of the FPC 40. By forming the sensor electrode unit 30 as a part of the FPC 40 in this manner, the number of parts can be reduced. Furthermore, impact durability of connection between the sensor 20 and the substrate 13 can be improved. As illustrated in FIG. 5, the FPC includes the sensor electrode unit 30 and the connecting portion 41 extending from the center of a long side of the sensor electrode unit 30.

Figure 6:
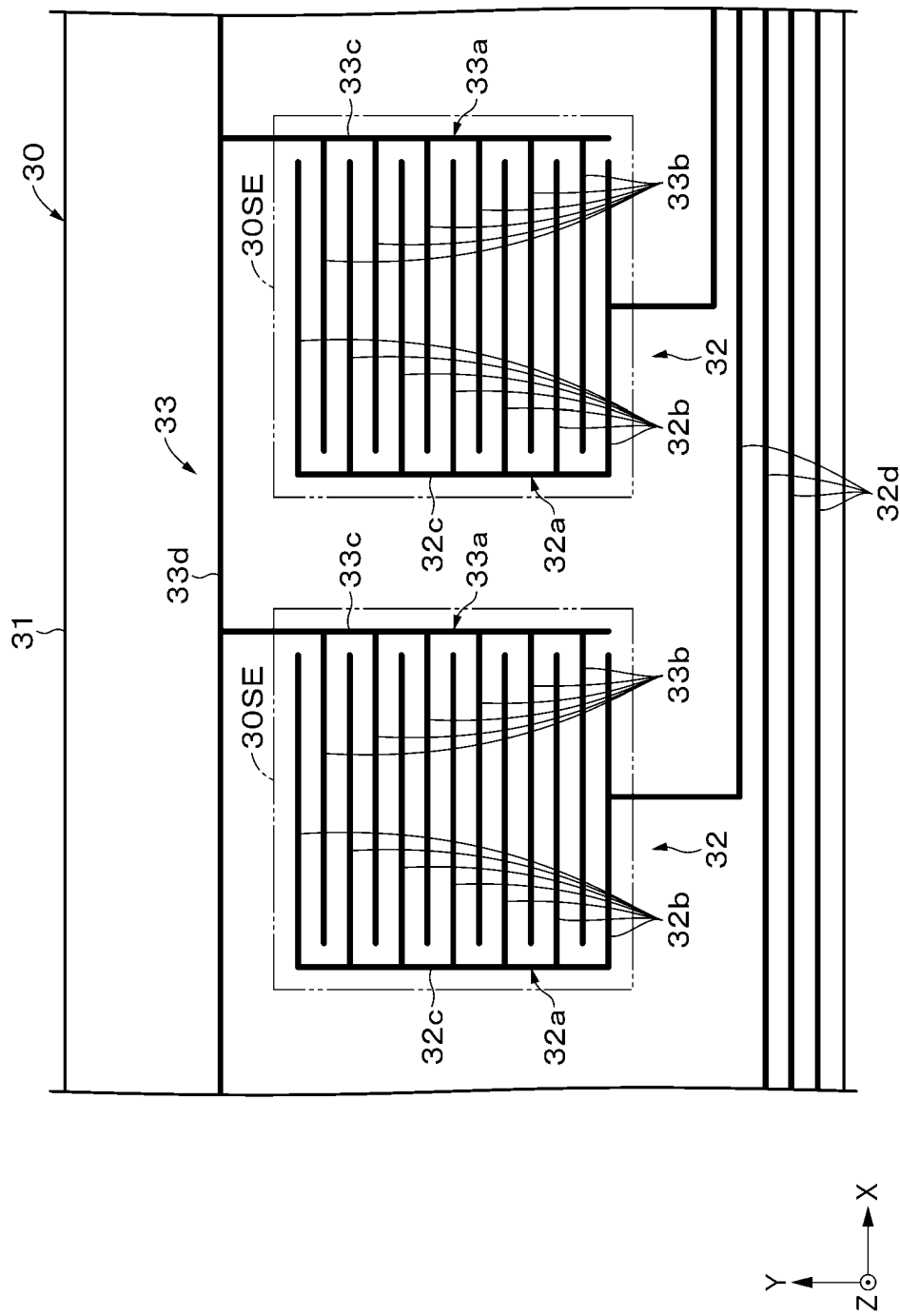
FIG. 6 is a plan view illustrating the configuration of a sensing unit.

As illustrated in FIG. 6, the sensor electrode unit 30 includes a plurality of pulse electrodes 32 disposed on one main surface of the flexible base material 31, one sense electrode 33, one ground electrode 34a, and one ground electrode 34b disposed on the other main surface of the base material 31. The pulse electrodes 32 and the sense electrode 33 constitute the sensing units 30SE. When the plurality of sensing units 30SE is viewed in plan from the Z-axis direction, the plurality of sensing units 30SE is one-dimensionally disposed so as to form a line at equal intervals in the X-axis direction.

The connecting portion 41 includes wires 32d and 33e disposed on one main surface of the base material 31 and a connecting terminal 42. The wire 32d electrically connects the pulse electrode 32 and the ground electrodes 34a and 34b of the sensor electrode unit 30 to the connecting terminal 42 disposed at a tip of the connecting portion 41. The wire 33e electrically connects the sense electrode 33 of the sensor electrode unit 30 to the connecting terminal 42 disposed at a tip of the connecting portion 41. The connecting terminal 42 is electrically connected to the substrate 13.

The FPC 40 may further include an insulating layer (not illustrated) such as a coverlay film covering the pulse electrode 32, the sense electrode 33, and the wires 32d and 33e on one main surface of the base material 31.

The base material 31 is a flexible substrate containing a polymer resin. Examples of the polymer resin include polyethylene terephthalate (PET), polyethylene naphthalate (PEN), polycarbonate (PC), an acrylic resin (PMMA), polyimide (PI), triacetyl cellulose (TAC), polyester, polyamide (PA), aramid, polyethylene (PE), polyacrylate, polyether sulfone, polysulfone, polypropylene (PP), diacetyl cellulose, polyvinyl chloride, an epoxy resin, a urea resin, a urethane resin, a melamine resin, a cyclic olefin polymer (COP), and a norbornene-based thermoplastic resin.

As illustrated in FIG. 6, the pulse electrode 32 as a first electrode includes one unit electrode body 32a. The unit electrode bodies 32a respectively included in the plurality of pulse electrodes 32 are arranged one-dimensionally in a line at constant intervals in the X-axis direction. As illustrated in FIG. 6, the sense electrode 33 as a second electrode includes a plurality of unit electrode bodies 33a and one connecting portion 33d. The plurality of unit electrode bodies 33a is one-dimensionally arranged in a line at constant intervals in the X-axis direction, and adjacent unit electrode bodies 33a are connected by the connecting portion 33d.

The wire 32d is drawn out from the pulse electrode 32, is drawn around a peripheral portion of one main surface of the base material 31, and is connected to the connecting terminal 42 through the connecting portion 41. The wire 33e is drawn out from the sense electrode 33, is drawn around a peripheral portion of one main surface of the base material 31, and is connected to the connecting terminal 42 through the connecting portion 41.

The unit electrode bodies 32a and 33a each have a comb teeth shape, and are disposed such that comb teeth portions are engaged with each other. Specifically, the unit electrode body 32a includes a plurality of linear sub electrodes 32b and a linear linking portion 32c. The unit electrode body 33a includes a plurality of linear sub electrodes 33b and a linear linking portion 33c. The plurality of sub electrodes 32b and 33b extend in the X-axis direction, and are disposed alternately so as to be separated from each other at predetermined intervals in the Y-axis direction. The adjacent sub electrodes 32b and 33b can form capacitive coupling.

The linking portion 32c extends in the Y-axis direction, and connects one ends of the plurality of sub electrodes 32b to each other. The linking portion 33c extends in the Y-axis direction, and connects the other ends of the plurality of sub electrodes 33b to each other. An interval between the sub electrodes 32b and 33b may be constant or variable. The unit electrode bodies 32a and 33a disposed so as to be engaged with each other constitute the sensing unit 30SE.

(Electrode Base Material)

The electrode base materials 21 and 22 are flexible electrode films. The electrode base material 21 constitutes the sensing surface 20S of the sensor 20, and the electrode base material 22 constitutes the back surface of the sensor 20.

The electrode base material 21 includes a flexible base material 21a and a reference electrode layer (hereinafter referred to as "REF electrode layer") 21b disposed on one main surface of the base material 21a. The electrode base material 21 is disposed on one main surface side of the sensor electrode unit 30 such that the REF electrode layer 21b faces one main surface of the sensor electrode unit 30. The electrode base material 22 includes a flexible base material 22a and an REF electrode layer 22b disposed on one main surface of the base material 22a. The electrode base material 22 is disposed on the other main surface side of the sensor electrode unit 30 such that the REF electrode layer 22b faces the other main surface of the sensor electrode unit 30.

The base materials 21a and 22a each have a film shape. As materials of the base materials 21a and 22a, a polymer resin similar to the above-described base material 31 is exemplified. The REF electrode layers 21b and 22b are so-called ground electrodes and are at a ground potential.

Examples of the shapes of the REF electrode layers 21b and 22b include a thin film shape, a foil shape, and a mesh shape, but are not limited thereto.

As the REF electrode layers 21b and 22b, any layer may be used as long as having electric conductivity. Examples of the REF electrode layers 21b and 22b include an inorganic conductive layer containing an inorganic conductive material, an organic conductive layer containing an organic conductive material, and an organic-inorganic conductive layer containing both an inorganic conductive material and an organic conductive material. The inorganic conductive material and the organic conductive material may be particles.

Examples of the inorganic conductive material include a metal and a metal oxide. Here, it is defined that the metal includes a semimetal. Examples of the metal include metals such as aluminum, copper, silver, gold, platinum, palladium, nickel, tin, cobalt, rhodium, iridium, iron, ruthenium, osmium, manganese, molybdenum, tungsten, niobium, tantelum, titanium, bismuth, antimony, and lead, and alloys thereof, but are not limited thereto. Examples of the metal oxide include indium tin oxide (ITO), zinc oxide, indium oxide, antimony-added tin oxide, fluorine-added tin oxide, aluminum-added zinc oxide, gallium-added zinc oxide, silicon-added zinc oxide, a zinc oxide-tin oxide-based compound, an indium oxide-tin oxide-based compound, and a zinc oxide-indium oxide-magnesium oxide-based compound, but are not limited thereto.

Examples of the organic conductive material include a carbon material and a conductive polymer. Examples of the carbon material include carbon black, a carbon fiber, fullerene, graphene, a carbon nanotube, a carbon microcoil, and nanohorn, but are not limited thereto. Examples of the conductive polymer include substituted or unsubstituted polyaniline, polypyrrole, polythiophene, and a (co)polymer containing one or two kinds selected therefrom, but are not limited thereto.

The REF electrode layers 21b and 22b may be thin films manufactured by either a dry process or a wet process. Examples of the dry process include a sputtering method and a vapor deposition method, but are not particularly limited thereto.

With the electrode base materials 21 and 22 disposed on both main surface sides of the sensor electrode unit 30, entry of external noise (external electric field) from both main surface sides of the sensor 20 into the sensor electrode unit 30 can be suppressed. Therefore, it is possible to suppress a decrease in detection accuracy of the sensor 20 or erroneous detection due to external noise.

(First and Second Deformation Layers)

The first deformation layer 28 is a film elastically deformed by a pressure applied to the side wall portions 11R and 11L. The electronic apparatus 10 improves a dynamic range in load sensitivity of the sensor 20 by sandwiching the elastically deformable and soft first deformation layers 28 and 28 between the sensing surface 20S and the inner side surfaces 11SR and 11SL.

Figure 7:
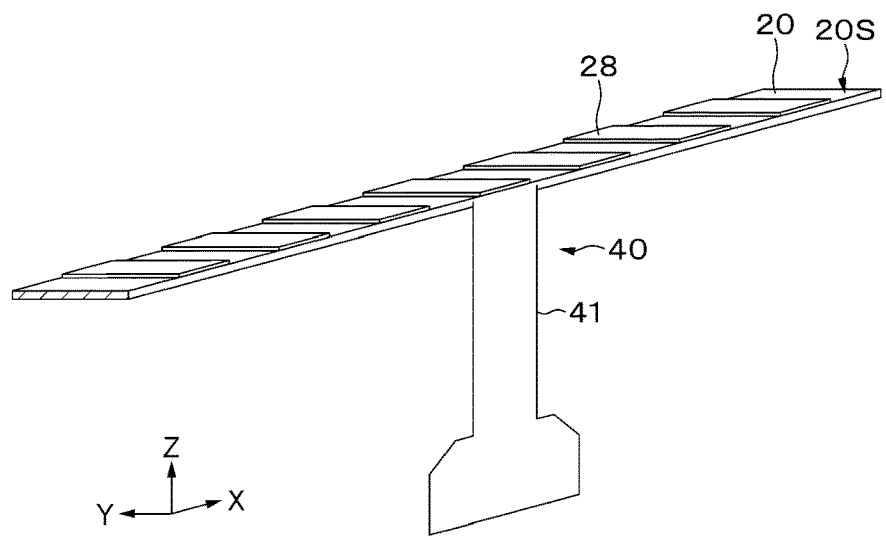
FIG. 7 is a perspective view illustrating an example of a shape pattern of a first deformation layer.

The first deformation layer 28 may be disposed continuously so as to completely fill the entire sensing surface 20S, or may have a predetermined shape pattern as illustrated in FIG. 7. The shape pattern may be regular or irregular. Examples of the shape pattern include a stripe shape, a mesh shape, a radial shape, a geometric pattern shape, a meander shape, a concentric shape, a spiral shape, a spider web shape, a tree shape, a fish bone shape, a ring shape, a lattice shape, and an irregular shape, but are not limited thereto. Note that FIG. 7 illustrates an example in which the first deformation layer 28 has a stripe shape.

The second deformation layer 23 is a film elastically deformed by a pressure applied to the sensing surface 20S of the sensor 20. The sensor 20 adjusts the sensitivity and dynamic range of the sensor 20 by sandwiching the elastically deformable and soft second deformation layer 23 between main surfaces of the sensor electrode unit 30 and the electrode base material 21. The second deformation layer 23 preferably has a hole (not illustrated) such as a through hole. This is because load sensitivity can be improved.

The first deformation layer 28 and the second deformation layer 23 each contain a dielectric such as a foamed resin or an insulating elastomer. The foamed resin is a so-called sponge, and is for example, at least one of foamed polyurethane, foamed polyethylene, foamed polyolefin, or sponge rubber. The insulating elastomer is, for example, at least one of a silicone-based elastomer, an acrylic elastomer, a urethane-based elastomer, or a styrene-based elastomer. Note that the first deformation layer 28 and the second deformation layer 23 may be disposed on a base material (not illustrated).

The second deformation layer 24 includes an insulating adhesive or double-sided adhesive tape. As the adhesive, for example, one or more kinds selected from the group consisting of an acrylic adhesive, a silicone-based adhesive, and a urethane-based adhesive can be used. Here, pressure sensitive adhesion is defined as a kind of adhesion. According to this definition, a pressure sensitive adhesive layer is regarded as one kind of adhesive layer. The second deformation layer 24 includes an adhesive or a double-sided adhesive tape, but is thicker than the adhesive layers 25 to 27, and therefore functions as a good second deformation layer. Note that the second deformation layer 24 may include a similar material to the second deformation layer 23.

The first deformation layer 28 and the second deformation layers 23 and 24 satisfy at least one of relationships represented by the following formulas (1) to (3), preferably satisfy at least two of the relationships represented by the following formulas (1) to (3), and more preferably satisfy all of the three relationships represented by the following formulas (1) to (3). For example, at least the relationships of formulas (1) and (2) may be satisfied, or at least the relationships of formulas (1) and (3) may be satisfied.

$$\text{Elastic modulus of first deformation layer 28} \leq \text{elastic modulus of each of second deformation layers 23 and 24} \quad (1)$$

$$\text{Thickness of first deformation layer 28} \geq \text{thickness of each of second deformation layers 23 and 24} \quad (2)$$

$$\text{Area occupancy of first deformation layer 28} \leq \text{area occupancy of each of second deformation layers 23 and 24} \quad (3)$$

Here, the area occupancy of the first deformation layer 28 means the ratio [%] of an area SB of the first deformation layer 28 with respect to an area SA of the sensing surface 20S (=(SB/SA)×100). Furthermore, the area occupancy rate of each of the second deformation layers 23 and 24 means the ratio [%] of an area SC of each of the second deformation layers 23 and 24 with respect to the area SA of the sensing surface 20S (=(SC/SA)×100).

When the first deformation layer 28 and the second deformation layers 23 and 24 satisfy at least one of the relationships represented by the above formulas (1) to (3), at the time when the sensors 20 and 20 are disposed between the inner side surfaces 11SR and 11SL of the exterior body 11 and the frame 12, it is possible to suppress crushing of the second deformation layers 23 and 24 due to a variation (tolerance) in the dimensions of the exterior body 11 and the frame 12 and the like. In other words, the first deformation layer 28 can absorb a variation (tolerance) in the dimensions of the exterior body 11 and the frame 12 instead of the second deformation layers 23 and 24. Therefore, a dynamic range in load sensitivity can be improved.

The first deformation layer 28 and the second deformation layers 23 and 24 preferably satisfy at least one of relationships represented by the following formulas (4) to (6), more preferably satisfy at least two of the relationships represented by the following formulas (4) to (6), and still more preferably satisfy all of the three relationships represented by the following formulas (4) to (6) from a viewpoint of improving the dynamic range. For example, at least the relationships of formulas (4) and (5) may be satisfied, or at least the relationships of formulas (4) and (6) may be satisfied.

Elastic modulus of first deformation layer 28≤elastic modulus of each of second deformation layers 23 and 24 (4)

Thickness of first deformation layer 28≥thickness of each of second deformation layers 23 and 24 (5)

Area occupancy of first deformation layer 28≤area occupancy of each of second deformation layers 23 and 24 (6)

Sensitivity is preferably equal to or higher than a noise level and within a linearity range of the sensitivity of the sensor 20 within a range of the sum of a variation in the dimensions of the exterior body 11 and a detection requirement displacement amount of the sensor 20. Here, the detection requirement displacement amount of the sensor 20 means a range of the deformation amount of the exterior body 11 with respect to a load actually applied.

The elastic modulus (25% CLD) is preferably 0.04 Mpa or less, and more preferably 0.03 Mpa or less. When the elastic modulus exceeds 0.04 Mpa, the first deformation layer 28 is too hard, and therefore the function of the first deformation layer 28 may be lowered. Here, the elastic modulus (25% CLD) is a value measured according to JIS K 6254.

The thickness of the first deformation layer 28 is preferably 10 μm or more and 1000 μm or less. When the thickness of the first deformation layer 28 is less than 10 μm, the function of the first deformation layer 28 may be lowered. Meanwhile, when the thickness of the first deformation layer 28 exceeds 1000 μm, the micro-deformation sensitivity may be lowered.

The area occupancy of the first deformation layer 28 is preferably 100% or less, and more preferably 10% or more and 100% or less. When the area occupancy of the first deformation layer 28 exceeds 100% or more, the function of the first deformation layer 28 may be lowered. Meanwhile, when the area occupancy of the first deformation layer 28 is less than 10%, processing of the first deformation layer 28 may be difficult.

Note that even in a case where the present technology is applied to an electronic apparatus including a hard housing, other than a smartphone, the above numerical ranges of the elastic modulus, the thickness, and the area occupancy are preferably adopted.

(Adhesive Layer)

The adhesive layers 25 to 27 each include, for example, an insulating adhesive or double-sided adhesive tape. As the adhesive, an adhesive similar to the adhesive of the above-described second deformation layer 24 can be exemplified.

[Circuit Configuration of Electronic Apparatus]

Figure 8:
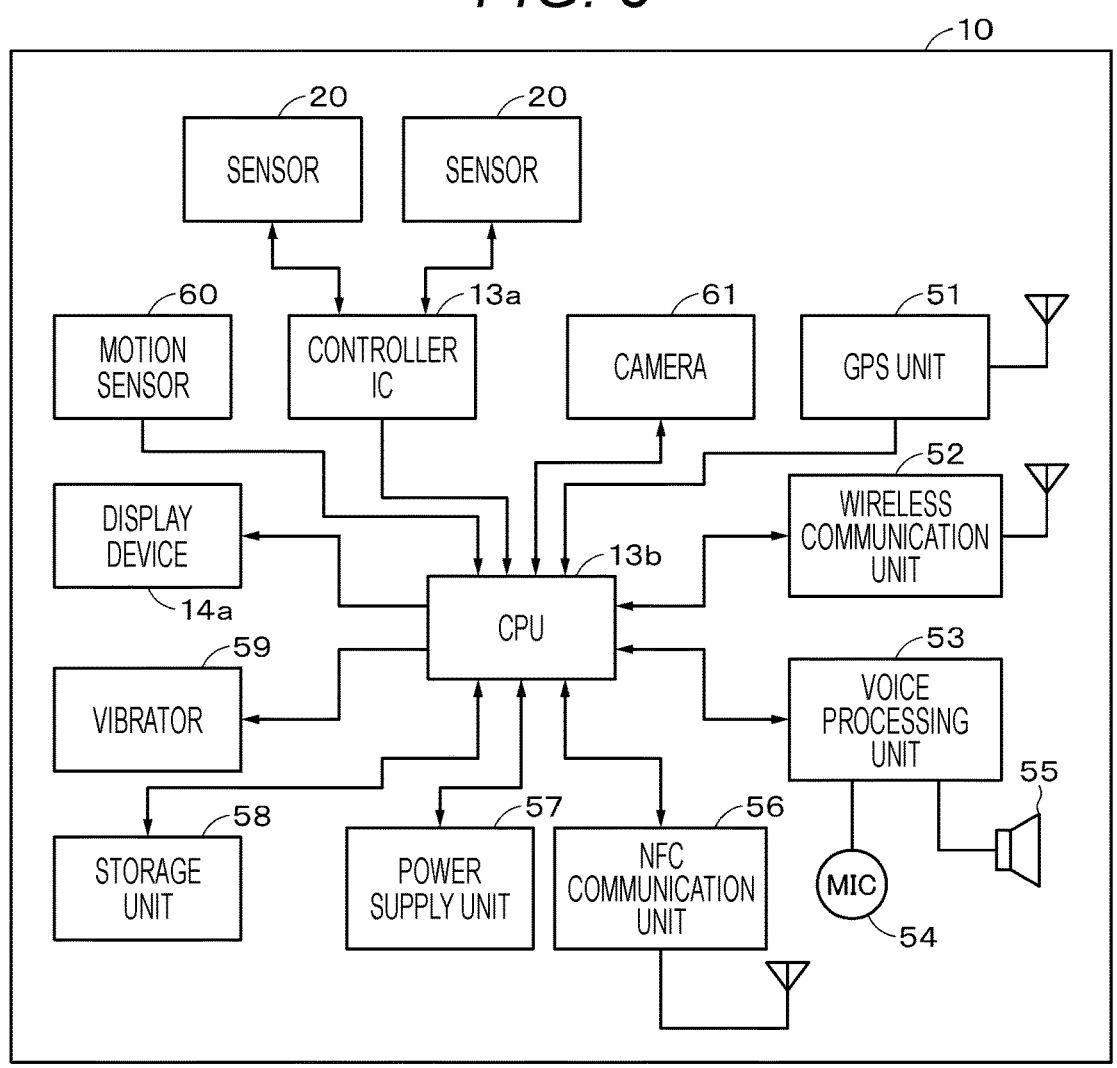
FIG. 8 is a block diagram illustrating the circuit configuration of the electronic apparatus according to the first embodiment of the present technology.

As illustrated in FIG. 8, the electronic apparatus 10 includes the two sensors 20, the CPU 13b, the IC 13a, a GPS unit 51, a wireless communication unit 52, a voice processing unit 53, a microphone 54, a speaker 55, an NFC communication unit 56, a power supply unit 57, a storage unit 58, a vibrator 59, a display device 14a, a motion sensor 60, and a camera 61.

The GPS unit 51 is a positioning unit for receiving a radio wave from a satellite of a system called a global positioning system (GPS) and measuring a current position. The wireless communication unit 52 performs near field communication with another terminal according to, for example, a Bluetooth (registered trademark) standard. The NFC communication unit 56 wirelessly communicates with a reader/writer in proximity according to a near field communication (NFC) standard. Data obtained by the GPS unit 51, the wireless communication unit 52, and the NFC communication unit 56 are supplied to the CPU 13b.

The microphone 54 and the speaker 55 are connected to the voice processing unit 53, and the voice processing unit 53 performs a process of calling with the other party connected by wireless communication in the wireless communication unit 52. Furthermore, the voice processing unit 53 can also perform a process for voice input operation.

The power supply unit 57 supplies power to the CPU 13b, the display device 14a, and the like included in the electronic apparatus 10. The power supply unit 57 includes a secondary battery such as a lithium ion secondary battery, a charge/discharge control circuit for controlling charge/discharge of the secondary battery, and the like. Note that although not illustrated in FIG. 8, the electronic apparatus 10 includes a terminal for charging a secondary battery.

The storage unit 58 is a random access memory (RAM) or the like, and stores various kinds of data such as an operating system (OS), an application, a moving image, an image, music, and a document.

The vibrator 59 is a member for vibrating the electronic apparatus 10. For example, the electronic apparatus 10 vibrates the electronic apparatus 10 with the vibrator 59 to give a notification of arrival of a call, reception of an e-mail, or the like.

The display device 14a displays various screens on the basis of a video signal and the like supplied from the CPU 13b. Furthermore, the display device 14a supplies a signal corresponding to touch operation on a display surface of the display device 14a to the CPU 13b.

The motion sensor 60 detects movement of a user holding the electronic apparatus 10. As the motion sensor 60, an acceleration sensor, a gyro sensor, an electronic compass, an air pressure sensor, or the like is used.

The camera 61 includes a lens group and an imaging element such as a complementary metal oxide semiconductor (CMOS), and photographs an image such as a still image or a moving image on the basis of control of the CPU 13b. The photographed still image, moving image, and the like are stored in the storage unit 58.

The sensor 20 is a pressure sensor with high sensitivity and high position resolution, detects a capacitance corresponding to pressing operation corresponding to the sensing surface 20S, and outputs an output signal corresponding thereto to the IC 13a.

The IC 13*a* stores firmware for controlling the sensor 20, detects a change (pressure) in capacitance of each sensing unit 30SE of the sensor 20, and outputs a signal corresponding to the result to the CPU 13*b*.

The CPU 13*b* executes various processes based on a signal supplied from the IC 13*a*. Furthermore, the CPU 13*b* processes data supplied from the GPS unit 51, the wireless communication unit 52, the NFC communication unit 56, the motion sensor 60, and the like.

[Areas of Electronic Apparatus]

Figure 9:
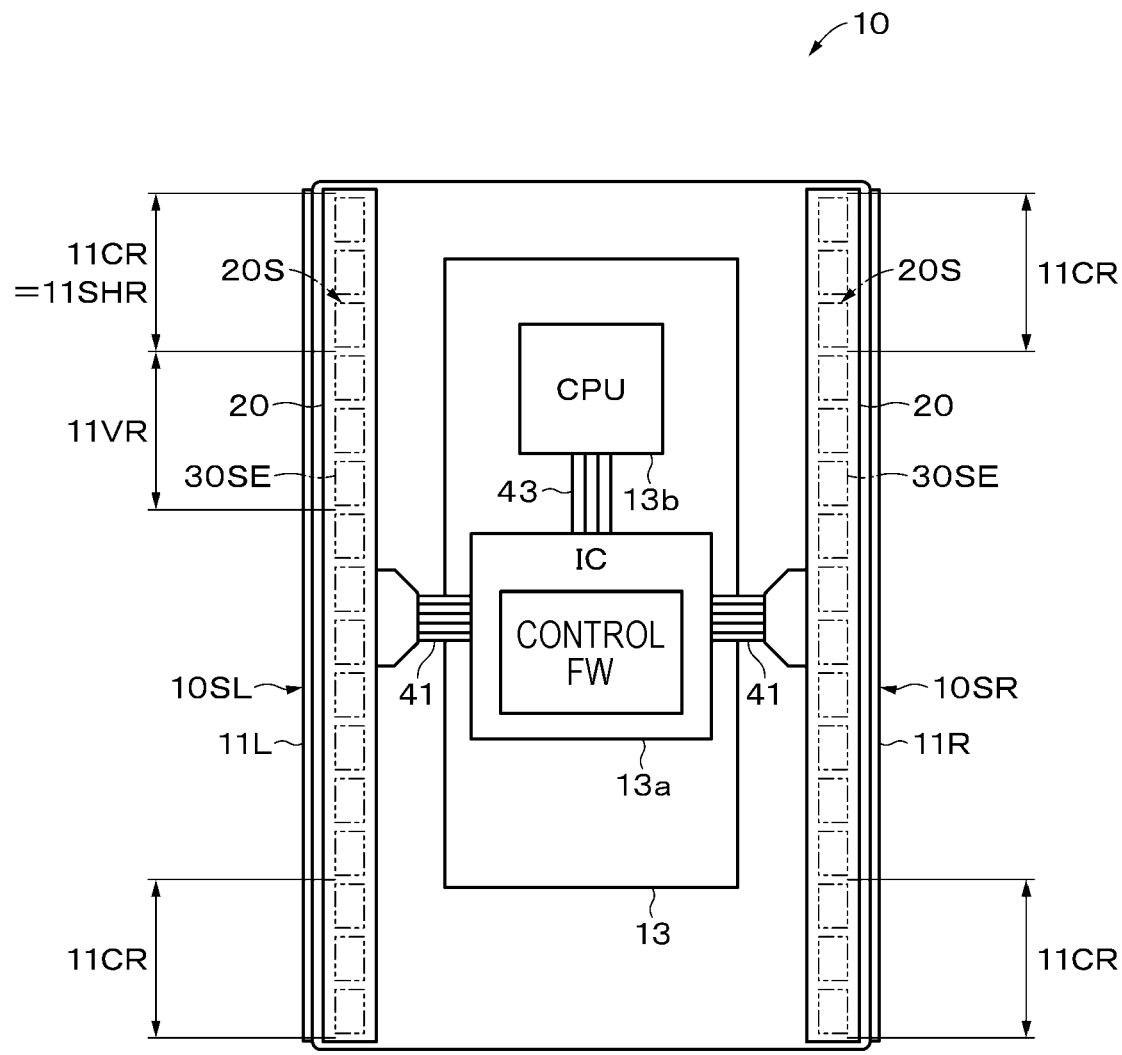
FIG. 9 is a schematic view for explaining each area of the electronic apparatus according to the first embodiment of the present technology.

As illustrated in FIG. 9, the sensor 20 is connected to the IC 13*a* via the connecting portion 41. The IC 13*a* is connected to the CPU 13*b* by a bus 43 such as I$^2$C. FIG. 9 illustrates a case where the sensor 20 includes 16 sensing units 30SE. However, the number of the sensing units 30SE is not limited thereto, and may be set appropriately according to the desired characteristics of the sensor 20. Furthermore, the sensing surface 20S is illustrated so as to be parallel to the XZ plane in order to make the configuration of the sensor 20 easily understood. However, the sensing surface 20S is actually maintained parallel to the XY plane.

(Volume Adjusting Area)

The electronic apparatus 10 has a volume adjusting area 11VR for adjusting a volume on the side surface 10SR. By sliding the volume adjusting area 11VR with a finger in an upward direction (first direction), a volume can be increased. By sliding the volume adjusting area 11VR with a finger in a downward direction (second direction), a volume can be decreased. Here, the upward direction means the +X-axis direction, and the downward direction means the −X-axis direction. Note that the volume adjusting area 11VR is an example of a slide operation area.

Note that the position of the volume adjusting area 11VR illustrated in FIG. 9 is an example, and the position of the volume adjusting area 11VR is not limited thereto. Furthermore, FIG. 9 illustrates a configuration in which the electronic apparatus 10 includes the volume adjusting area 11VR only on the side surface 10SL. However, the electronic apparatus may include the volume adjusting areas 11VR on both the side surfaces 10SR and 10SL.

The volume adjusting area 11VR includes two or more sensing units 30SE. The IC 13*a* determines whether or not a slide operation has been performed in the upward or downward direction on the volume adjusting area 11VR on the basis of signals supplied from the sensing units 30SE included in the volume adjusting area 11VR. In a case where it is determined that the slide operation has been performed in the upward or downward direction, the IC 13*a* supplies a signal giving a notification that the slide operation has been performed in the upward or downward direction to the CPU 13*b*.

(Camera Holding Area)

The electronic apparatus 10 has camera holding areas 11CR at both ends of each of the side surfaces 10SR and 10SL. When a user holds four camera holding areas 11CR with fingers, a camera application is automatically activated. The camera holding area 11CR includes at least one sensing unit 30SE.

The IC 13*a* determines whether or not a user holds the four camera holding areas 11CR with fingers on the basis of a signal supplied from the sensing unit 30SE included in each of the camera holding areas 11CR. In a case where it is determined that the four camera holding areas 11CR are held with fingers, the IC 13*a* supplies a signal requesting activation of a camera application to the CPU 13*b*.

(Shutter Operating Area)

The electronic apparatus 10 has a shutter operating area 11SHR at one end of the side surface 10SL in the upward direction. Note that FIG. 9 illustrates a case where the shutter operating area 11SHR and one of the four camera holding areas 11CR are the same as each other, but these areas may be different from each other.

The IC 13*a* determines whether or not the shutter operating area 11SHR is pressed by a finger on the basis of a signal supplied from the sensing unit 30SE included in the shutter operating area 11SHR. In a case where it is determined that the shutter operating area 11SHR is held with fingers, the IC 13*a* supplies a signal for requesting shutter operation (that is, image capturing operation) to the CPU 13*b*.

[1.3 Operation of Sensor]

Next, operation of the sensor 20 according to the first embodiment of the present technology will be described. When the IC 13*a* applies a voltage between the pulse electrode 32 and the sense electrode 33, that is, between the sub electrodes 32*b* and 33*b*, an electric line of force (capacitive coupling) is formed between the sub electrodes 32*b* and 33*b*.

When the sensing surface 20S of the sensor 20 is pressed, the second deformation layers 23 and 24 are elastically deformed, the electrode base material 21 is bent toward the sensor electrode unit 30, and the sensor electrode unit 30 is bent toward the electrode base material 22. As a result, the electrode base material 21 and the sensor electrode unit 30 approach each other, the sensor electrode unit 30 and the electrode base material 22 approach each other, and a part of the electric line of force between the sub electrodes 32*b* and 33*b* flows into the electrode base materials 21 and 22 to change the capacitance of the sensing unit 30SE. The IC 13*a* detects a pressure applied to one main surface of the sensor 20 on the basis of the change in capacitance, and outputs the result to the CPU 13*b*.

[1.4 Operation of Electronic Apparatus]

Next, the operation of the electronic apparatus 10 in (1) wake-up operation, (2) slide operation, (3) automatic start-up operation of a camera application, and (4) right/left hand detection function will be sequentially described.

(1) Wake-Up Operation

In the wake-up operation, a user grips the electronic apparatus 10 in a sleeping mode, and the CPU 13*b* thereby returns from the sleeping mode to drive the display device 14*a*. As a specific example of the wake-up operation, a user takes up the electronic apparatus 10 in a sleeping mode, placed on a desk, and grips the electronic apparatus 10 to display a screen of the display device 14*a*.

Figure 10:
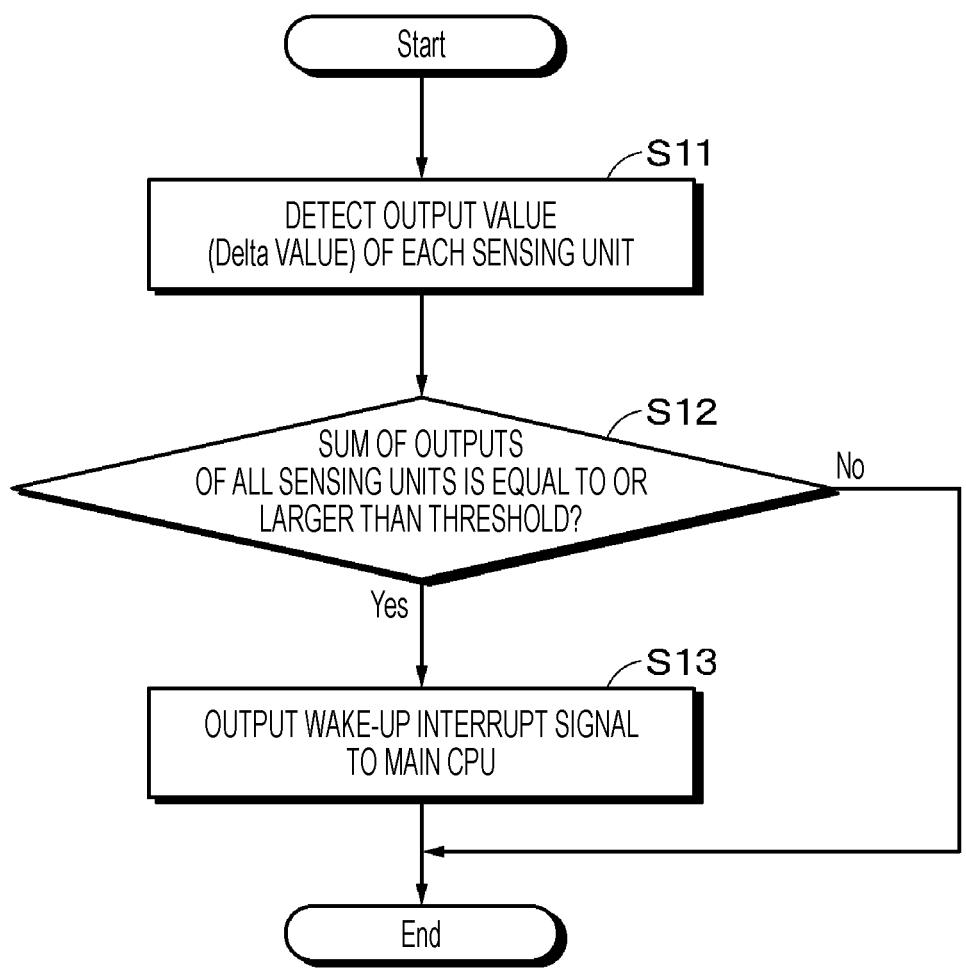
FIG. 10 is a flowchart for explaining operation of the electronic apparatus at the time of wake-up operation.

Hereinafter, the operation of the electronic apparatus 10 at the time of the wake-up operation will be described with reference to FIG. 10. Here, the CPU 13*b* is in a sleeping mode before step S11, and the process illustrated in FIG. 10 is executed, for example, in one frame. Note that the frame means a series of processes in which scan operation is performed on the sensor 20 to which the IC 13*a* is connected, a signal process is performed to obtain a pressure distribution (capacitance distribution), input operation performed by a user is interpreted on the basis of the result (in some cases, a time series change in pressure distribution between a plurality of frames in the past is also interpreted), and contents of input operation performed by the user are output to a superordinate control unit (here, the CPU 13*b*) as necessary, or a period thereof. Usually, the IC 13*a* interprets input operation performed by the user by repeating this frame process at predetermined constant time intervals, and outputs the result to the CPU 13*b*.

First, in step S11, the IC 13*a* detects an output value (delta value) of each of the sensing units 30SE. Next, in step S12, the IC 13*a* determines whether or not the sum of the output values of all the sensing units 30SE is equal to or larger than a threshold.

In step S12, in a case where it is determined that the sum of the output values of all the sensing units 30SE is equal to or larger than the threshold, in step S13, the IC 13*a* outputs a wake-up interrupt signal to the CPU 13*b*. The wake-up interrupt signal is a signal for causing the CPU 13*b* to execute a wake-up function. When the wake-up interrupt signal is supplied from the IC 13*a* to the CPU 13*b*, the CPU 13*b* wakes up from a sleeping mode and returns to a normal activation state. Meanwhile, in step S12, in a case where it is determined that the sum of the output values of all the sensing units 30SE is not equal to or larger than the threshold, the process ends.

(2) Slide Operation

The slide operation adjusts the volume of the electronic apparatus 10 by sliding the volume adjusting area 11VR disposed on the side surface 10SL in the vertical direction with a finger by a user.

Figure 11:
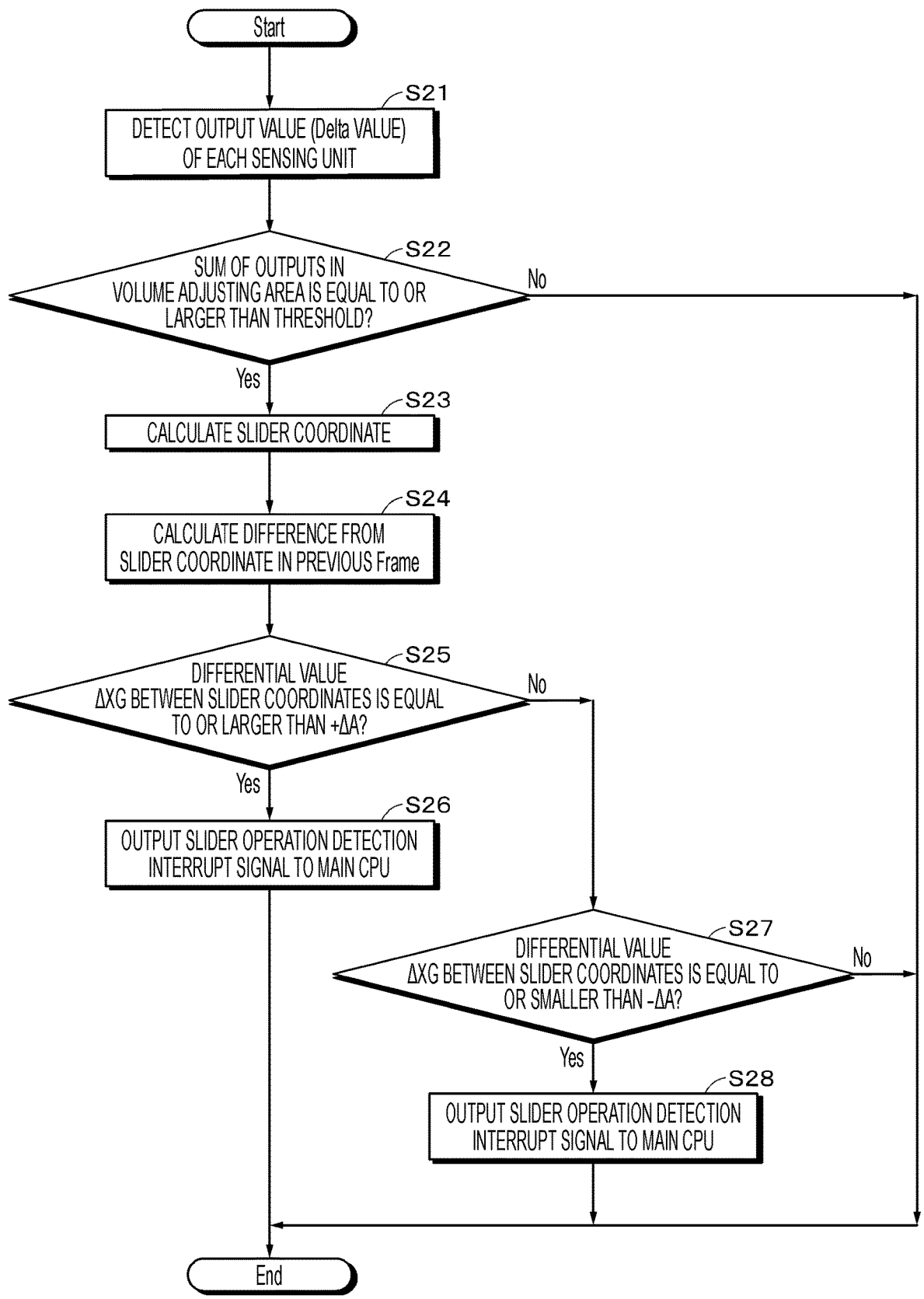
FIG. 11 is a flowchart for explaining operation of the electronic apparatus at the time of slide operation.

Hereinafter, operation of the electronic apparatus 10 at the time of the slide operation will be described with reference to FIG. 11. Here, the slide operation can be performed, for example, in a state where a home screen is displayed, and the process illustrated in FIG. 11 is executed, for example, in one frame.

First, in step S21, the IC 13*a* detects an output value (delta value) of each of the sensing units 30SE. Next, in step S22, the IC 13*a* determines whether or not the sum of the output values of all the sensing units 30SE included in the volume adjusting area 11VR is equal to or larger than a threshold.

In step S22, in a case where it is determined that the sum of the output values of all the sensing units 30SE included in the volume adjusting area 11VR is equal to or larger than the threshold, in step S23, the IC 13*a* calculates the coordinate of the center of gravity $X_G$ (hereinafter referred to as "slider coordinate $X_G$") of a sliding finger. Specifically, a value of the center of gravity of an output value in each of the sensing units 30SE (the plurality of continuous sensing units 30SE) included in the volume adjusting area 11VR is calculated using the following formula. Meanwhile, in step S22, in a case it is determined that the sum of the output values of all the sensing units 30SE included in the volume adjusting area 11VR is not equal to or larger than the threshold, the process ends.

[Numerical Formula 1]
$$X_G = \frac{\sum_{i=1}^{n} m_i x_i}{\sum_{i=1}^{n} m_i}$$

(in which $m_i$ represents an output value (delta value) of the i-th sensing unit 30SE of the volume adjusting area 11VR, and $x_i$ represents a position where the i-th sensing unit 30SE of the volume adjusting area 11VR is disposed)

Note that the number of the sensing unit 30SE increases from one end to the other end of the side surface 10SL in a longitudinal direction (that is, toward +X-axis direction). Furthermore, the origin of the coordinate $x_i$ is the center position of the volume adjusting area 11VR of the sensing unit 30SE in a longitudinal direction thereof (that is, +X-axis direction).

Next, in step S24, the IC 13*a* calculates a difference $\Delta X_G$ between the slider coordinate $X_G$ calculated in the previous frame and the slider coordinate $X_G$ calculated in the current frame (=(slider coordinate $X_G$ calculated in the current frame)–(slider coordinate $X_G$ calculated in the previous frame). Next, in step S25, the IC 13*a* determines whether or not the differential value between the slider coordinates $X_G$ is equal to or larger than a threshold $+\Delta A$.

In step S24, in a case where it is determined that the differential value between the slider coordinates $X_G$ is equal to or larger than the threshold $+\Delta A$, in step S26, the IC 13*a* outputs a slider operation detection interrupt signal to the CPU 13*b*.

Meanwhile, in step S24, in a case where it is determined that the differential value between the slider coordinates $X_G$ is not equal to or larger than the threshold $+\Delta A$, in step S27, the IC 13*a* determines whether or not the differential value between the slider coordinates $X_G$ is equal to or smaller than a threshold $-\Delta A$.

In step S27, in a case where it is determined that the differential value between the slider coordinates $X_G$ is equal to or smaller than the threshold $-\Delta A$, in step S28, the IC 13*a* outputs a slider operation detection interrupt signal to the CPU 13*b*. Meanwhile, in step S27, in a case where it is determined that the differential value between the slider coordinates $X_G$ is not equal to or smaller than the threshold $-\Delta A$, the process ends.

Here, the slider operation detection interrupt signal is a signal for notifying the CPU 13*b* of detection of slide operation and the direction of the slide operation. When the slider operation detection interrupt signal is supplied from the IC 13*a* to the CPU 13*b*, the CPU 13*b* adjusts a volume according to the direction of the slide operation. Specifically, in a case where the direction of the slide operation is the upward direction (that is, in a case where the differential value between the slider coordinates $X_G$ is equal to or larger than the threshold $+\Delta A$), the CPU 13*b* controls volume adjustment so as to increase the volume. Meanwhile, in a case where the direction of the slide operation is the downward direction (that is, in a case where the differential value between the slider coordinates $X_G$ is equal to or smaller than the threshold $-\Delta A$), the CPU 13*b* controls volume adjustment so as to decrease the volume.

(3) Automatic Start-Up Operation of Camera Application

The automatic start-up operation of a camera application is operation of automatically activating a camera application by holding the four camera holding areas 11CR disposed on the side surfaces 10SR and 10SL with fingers by a user.

Figure 12:
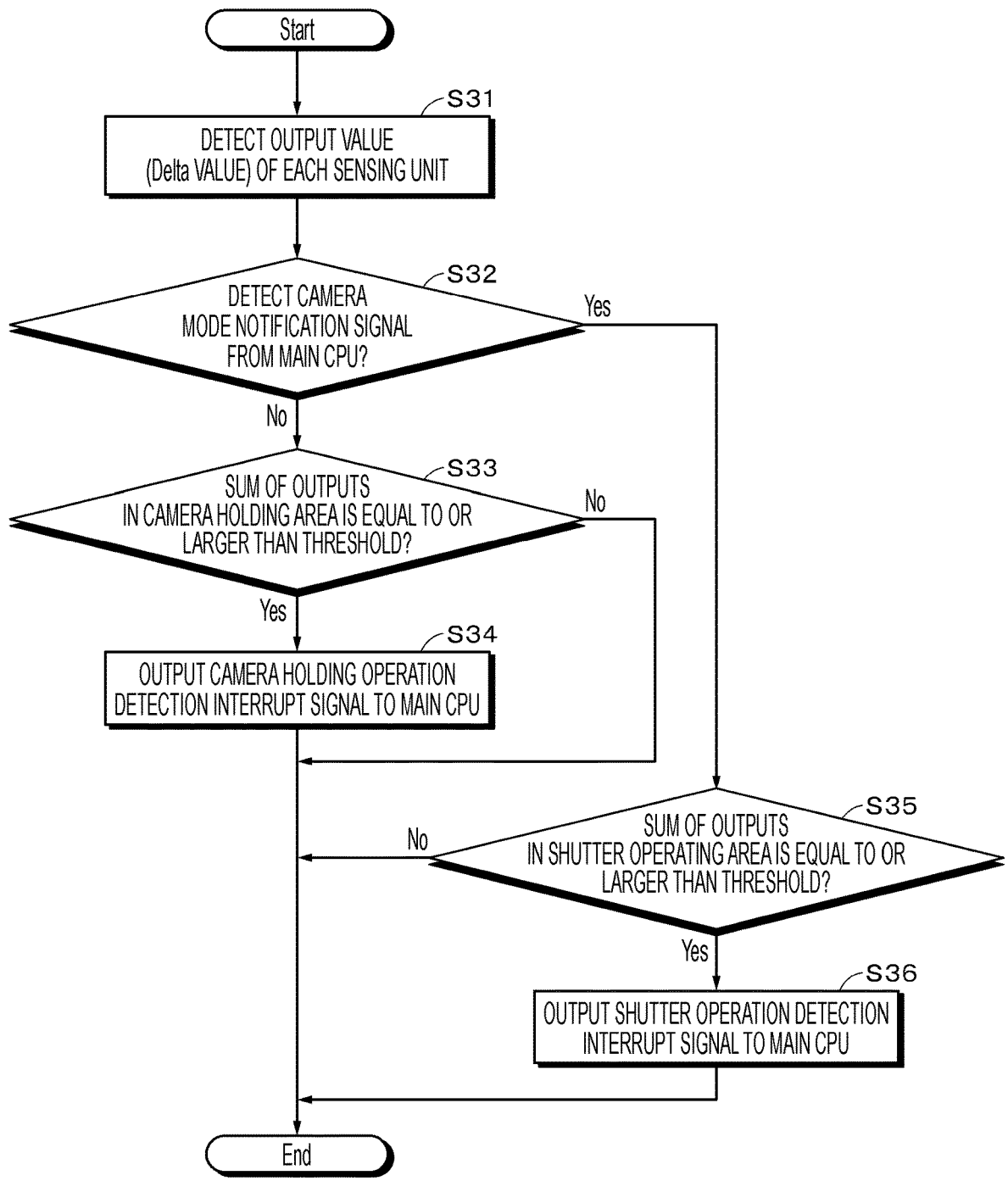
FIG. 12 is a flowchart for explaining operation of the electronic apparatus at the time of automatic start-up operation of a camera application.

Hereinafter, operation of the electronic apparatus 10 at the time of the automatic start-up operation of a camera application will be described with reference to FIG. 12. Here, the automatic start-up operation of a camera application can be performed, for example, in a state where a home screen is displayed, and the process illustrated in FIG. 12 is executed, for example, in one frame.

First, in step S31, the IC 13*a* detects an output value (delta value) of each of the sensing units 30SE. At this time, the output values of all the sensing units 30SE of the sensor 20 may be detected, but only output values of the sensing units 30SE included in the four camera holding areas 11CR may be detected.

Next, in step S32, the IC 13*a* determines whether or not a signal for giving a notification that a camera mode is in progress (hereinafter referred to as "camera mode notification signal") is supplied from the CPU 13*b*. In step S32, in a case where it is determined that the camera mode notification signal is not supplied from the CPU 13*b*, in step S33, the IC 13*a* determines whether or not the sum of outputs of the sensing units 30SE included in the four camera holding areas 11CR is equal to or larger than a threshold.

In step S33, in a case where it is determined that the sum of the outputs in the four camera holding areas 11CR is equal to or larger than the threshold, in step S34, the IC 13*a* outputs a camera holding operation detection interrupt signal to the CPU 13*b*. The camera holding operation detection interrupt signal is a signal for notifying the CPU 13*b* of activation of a camera application. When the camera holding operation detection interrupt signal is supplied from the IC 13*a* to the CPU 13*b*, the CPU 13*b* activates the camera application. Meanwhile, in step S33, in a case where it is determined that the sum of the outputs in the four camera holding areas 11CR is not equal to or larger than the threshold, the process ends.

In step S32, in a case where it is determined that the camera mode notification signal is supplied from the CPU 13*b*, in step S35, the IC 13*a* determines whether or not the sum of outputs of the sensing units 30SE included in the shutter operating area 11SHR is equal to or larger than a threshold. Note that in a case where the number of the sensing units 30SE included in the shutter operating area 11SHR is only one, the IC 13*a* determines whether or not an output of the one sensing unit 30SE is equal to or larger than the threshold.

In step S35, in a case where it is determined that the sum of outputs of the sensing units 30SE included in the shutter operating area 11SHR is equal to or larger than a threshold, in step S36, the IC 13*a* outputs a shutter operation detection interrupt signal to the CPU 13*b*. The shutter operation detection interrupt signal is a signal for requesting the CPU 13*b* to perform shutter operation (that is, image capturing operation). When the shutter operation detection interrupt signal is supplied from the IC 13*a* to the CPU 13*b*, the CPU 13*b* captures an image and stores the image in the storage unit 58. Meanwhile, in step S35, in a case where it is determined that the sum of outputs of the sensing units 30SE included in the shutter operating area 11SHR is not equal to or larger than the threshold, the process ends.

Note that the electronic apparatus 10 may be able to perform focus adjustment by the shutter operating area 11SHR. For example, when the shutter operating area 11SHR is pressed halfway, focus adjustment may be performed. Specifically, in a case where the IC 13*a* determines that the sum of outputs of the sensing unit 30SE is equal to or larger than a first threshold and smaller than a second threshold, the IC 13*a* outputs a focus adjustment detection interrupt signal to the CPU 13*b*. The focus adjustment detection interrupt signal is a signal for requesting the CPU 13*b* to adjust the focus of the camera 61. When the focus adjustment detection interrupt signal is supplied from the IC 13*a* to the CPU 13*b*, the CPU 13*b* adjusts the focus of the camera 61. In a case where the IC 13*a* determines that the sum of the outputs of the sensing unit 30SE is equal to or larger than the second threshold, the IC 13*a* outputs a shutter operation detection interrupt signal to the CPU 13*b*.

(4) Right/Left Hand Detection Function

The right/left hand detection function is a function that the IC 13*a* determines whether a user holds the electronic apparatus 10 with the right hand or the left hand, and automatically changes screen display (for example, application display or operation menu display) according to the hand holding the electronic apparatus 10. Specifically, in a case where the IC 13*a* determines that the user holds the electronic apparatus 10 with the right hand, the IC 13*a* displays a screen for the right hand, and in a case where the IC 13*a* determines that the user holds the electronic apparatus 10 with the left hand, the IC 13*a* displays a screen for the left hand.

For example, in the case of application display, the IC 13*a* automatically changes screen display as follows. In other words, in a case where the IC 13*a* determines that the electronic apparatus 10 is held with the right hand, the IC 13*a* arranges menus in a range easily reached by the thumb of the right hand, or displays the menus by shifting the menus from the central position of the screen toward the side surface 10SR where the thumb of the right hand is positioned such that a reach by the thumb of the right hand is easy. Meanwhile, in a case where the IC 13*a* determines that the electronic apparatus 10 is held with the left hand, the IC 13*a* arranges menus in a range easily reached by the thumb of the left hand, or displays the menus by shifting the menus from the central position of the screen toward the side surface 10SL where the thumb of the left hand is positioned such that a reach by the thumb of the left hand is easy.

Figure 13:
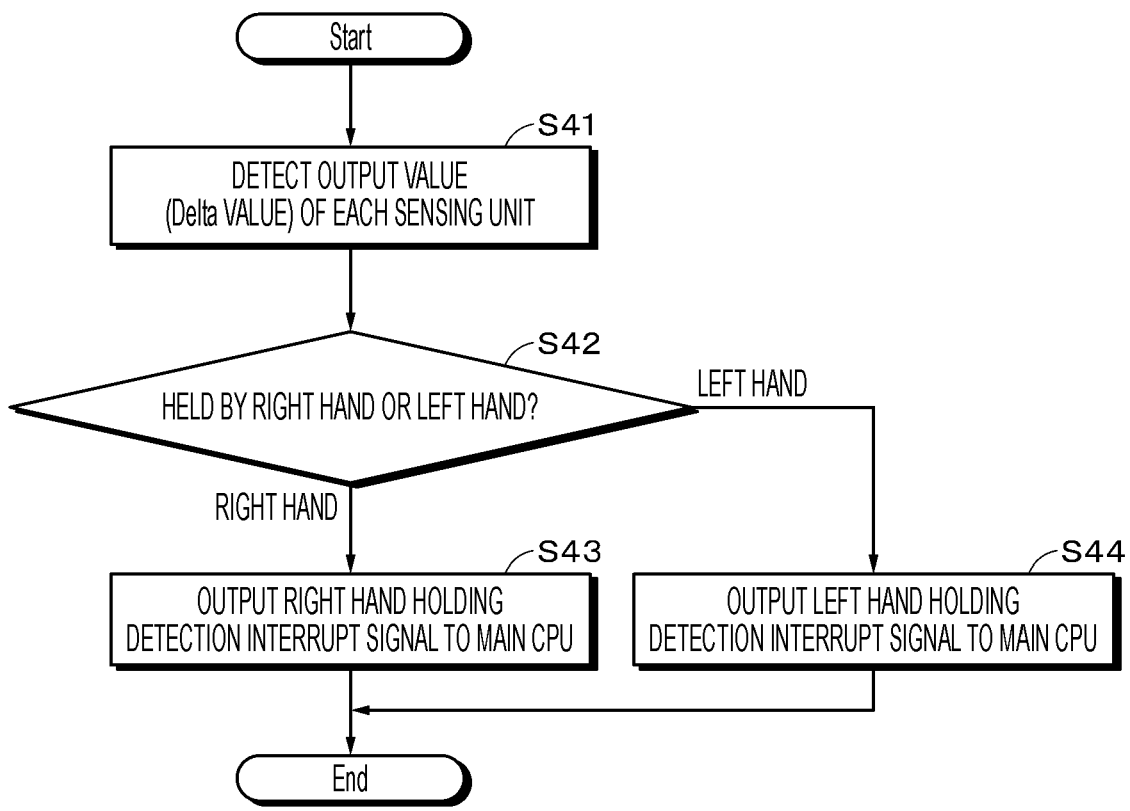
FIG. 13 is a flowchart for explaining operation of the electronic apparatus in a right/left hand detection function.

Hereinafter, operation of the electronic apparatus 10 in the right/left hand detection function will be described with reference to FIG. 13. Here, the right/left hand detection function can be performed in a state where a home screen, a menu screen, or the like is displayed, and the process illustrated in FIG. 13 is executed, for example, in one frame.

Figure 14:
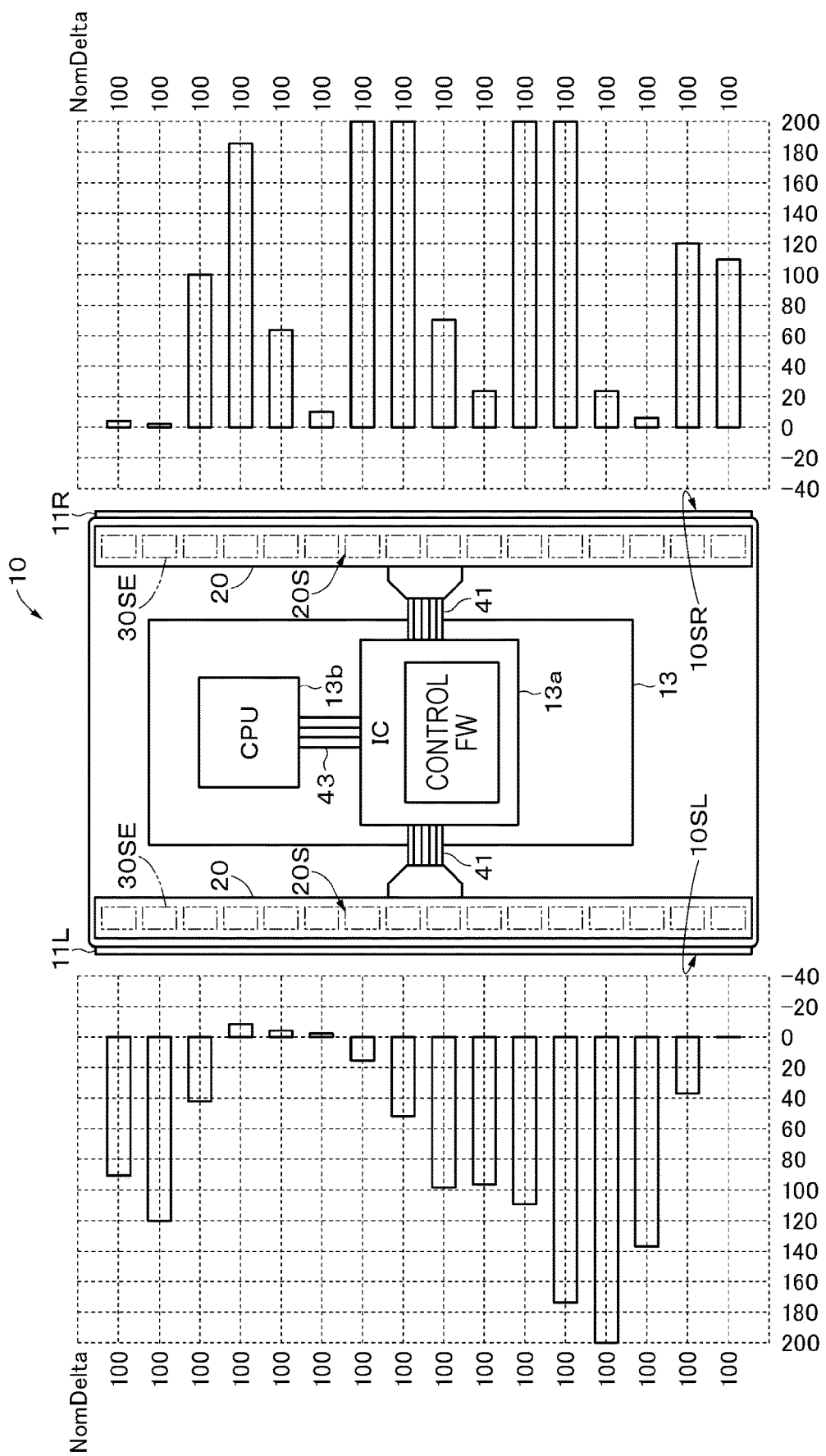
FIG. 14 is a schematic diagram illustrating an example of a profile of output values (delta values) when a user holds the electronic apparatus with the left hand.

First, in step S41, the IC 13*a* detects an output value (delta value) of each of the sensing units 30SE. Next, in step S42, the IC 13*a* determines whether a user holds the electronic apparatus 10 with the right hand or the left hand on the basis of the output value of each of the sensing units 30SE detected in step S41. Specifically, the IC 13*a* determines the user's hand holding the electronic apparatus 10 from correlation between the profiles of output values (delta values) output from all the sensing units 30SE and the profiles for the right hand and the left hand stored in advance in a memory of the IC 13*a*. FIG. 14 illustrates an example of the profiles of output values (delta values) when a user holds the electronic apparatus 10 with the left hand.

In step S42, in a case where it is determined that a user holds the electronic apparatus 10 with the right hand, in step S43, the IC 13*a* outputs a right hand holding detection interrupt signal to the CPU 13*b*. The right hand holding detection interrupt signal is a signal requesting the CPU 13*b* to display a screen for right hand holding. When the right hand holding detection interrupt signal is supplied from the IC 13*a* to the CPU 13*b*, the CPU 13*b* displays a screen for right hand holding (for example, application display or operation menu display).

Meanwhile, in S42, in a case where it is determined that a user holds the electronic apparatus 10 with the left hand, in step S44, the IC 13*a* outputs a left hand holding detection interrupt signal to the CPU 13*b*. The left hand holding detection interrupt signal is a signal requesting the CPU 13*b* to display a screen for left hand holding. When the left hand holding detection interrupt signal is supplied from the IC 13*a* to the CPU 13*b*, the CPU 13*b* displays a screen for left hand holding (for example, application display or operation menu display).

[1.5 Effect]

The electronic apparatus 10 according to the first embodiment includes: the exterior body 11; the sensors 20 each having the sensing surface 20S; the frame 12 supporting the sensors and 20 such that the inner side surfaces 11SR and 11SL of the exterior body 11 face the sensing surfaces 20S;

and the first deformation layers 28 and 28 disposed between the sensing surfaces 20S and the inner side surfaces 11SR and 11SL. The sensor 20 includes: the capacitive sensor electrode unit 30 including the plurality of sensing units 30SE; the REF electrode layers 21b and 22b; the second deformation layer 23 disposed between the electrode base material 21 and the sensor electrode unit 30; and the second deformation layer 24 disposed between the electrode base material 22 and the sensor electrode unit 30. The first deformation layer 18 and the second deformation layers 23 and 24 satisfy at least one of the relationships represented by the above formulas (1) to (3). As a result, at the time when the sensors 20 and 20 are disposed between the inner side surfaces 11SR and 11SL of the exterior body 11 and the frame 12, it is possible to suppress crushing of the second deformation layers 23 and 24 due to a variation (tolerance) in the dimensions of the exterior body 11 and the frame 12 and the like. Therefore, a dynamic range in load sensitivity can be improved.

Furthermore, when the side wall portions 11R and 11L are pressed toward the sensing surface 20S, the sensing surface 20S is pressed by the inner side surfaces 11SR and 11SL. Therefore, pressing of the side surfaces 10SR and 10SL of the electronic apparatus 10 can be detected by the IC 13a.

[1.6 Modification]

(Modification of how First Deformation Layer is Disposed)

As illustrated in FIG. 15A, the first deformation layer 28 may be disposed between the back surface of the sensor 20 and the support surfaces 12SR and 12SL of the frame 12 instead of between the sensing surface 20S and the inner side surfaces 11SR and 11SL. Furthermore, as illustrated in FIG. 15B, the first deformation layers 28 may be disposed between the sensing surface 20S and the inner side surfaces 11SR and 11SL and between the back surface of the sensor 20 and the support surfaces 12SR and 12SL of the frame 12.

(Modification of Sensor)

In the above-described first embodiment, the configuration in which the sensor 20 includes the electrode base material 22 has been described, but the sensor 20 does not have to include the electrode base material 22. However, in order to suppress entry of external noise (external electric field) from the back surface of the sensor 20 into the interior, that is, in order to suppress a decrease in detection accuracy of the sensor 20 or erroneous detection due to external noise, the sensor 20 preferably includes the electrode base material 22.

(Modification of Sensor Layer)

In the above-described first embodiment, the case where the sensor 20 includes the mutual capacitive sensor electrode unit 30 has been described, but the sensor 20 may include a self-capacitive sensor layer. Specifically, the sensor 20 may include a sensor layer including a thin plate-like electrode, and the electrode may extend in the substantially entire sensor layer in an in-plane direction of the sensor layer.

(Modification of Electrode Base Material)

The base material 21a may be absent. In other words, the sensor 20 may include the REF electrode layer 21b instead of the electrode base material 21. Similarly, the base material 22a may be absent. In other words, the sensor 20 may include the REF electrode layer 22b instead of the electrode base material 22.

Figure 16:
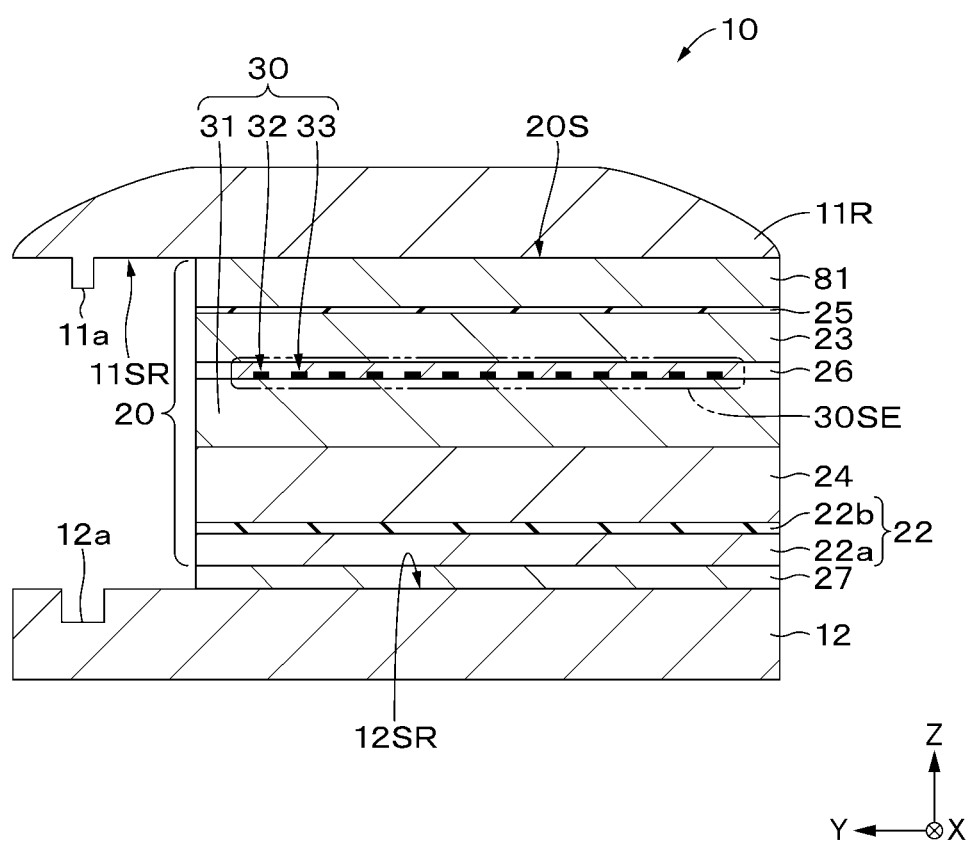
FIG. 16 is a cross-sectional view illustrating a modification of a reference electrode layer.

Furthermore, as illustrated in FIG. 16, the sensor 20 may include an REF electrode layer 81 having a function of the first deformation layer 28 instead of the electrode base material 21 and the first deformation layer 28. In this case, the REF electrode layer 81 may be disposed on a base material (not illustrated). Note that the REF electrode layer 81 can also be regarded as a first deformation layer having the function of the REF electrode layer 21b. The REF electrode layer 81 contains a conductive material and a dielectric such as a foamed resin or an insulating elastomer. The conductive material is preferably dispersed in the dielectric. The conductive material is at least one of an inorganic conductive material or an organic conductive material. As the inorganic conductive material and the organic conductive material, materials similar to those contained in the REF electrode layers 21b and 22b can be exemplified. Specific examples of the REF electrode layer 81 include a conductive rubber (EC-20BH, EC-40BH, EC-20BM, EC-40BM, or the like) manufactured by Shin-Etsu Chemical Co., Ltd. and a conductive cloth pressure sensitive adhesive tape (1825) manufactured by Teraoka Seisakusho Co., Ltd.

Similarly, the sensor 20 may include an REF electrode layer having the function of the first deformation layer 28 instead of the electrode base material 22. Also in this case, the REF electrode layer may be disposed on a base material (not illustrated). Note that the REF electrode layer can also be regarded as a first deformation layer having the function of the REF electrode layer 22b.

(Modification of FPC)

As illustrated in FIG. 17A, the FPC 40 may have a long rectangular shape. In this case, as illustrated in FIG. 17B, the connecting portion 41 disposed at one end of the FPC 40 may be bent at one end of the support surface 12SR of the frame 12 and may be bonded to the back surface of the support surface 12SR via the adhesive layer 29. When a force is applied to the FPC 40, noise is generated. Therefore, the connecting portion 41 is preferably fixed to the frame 12 as described above.

Figure 18:
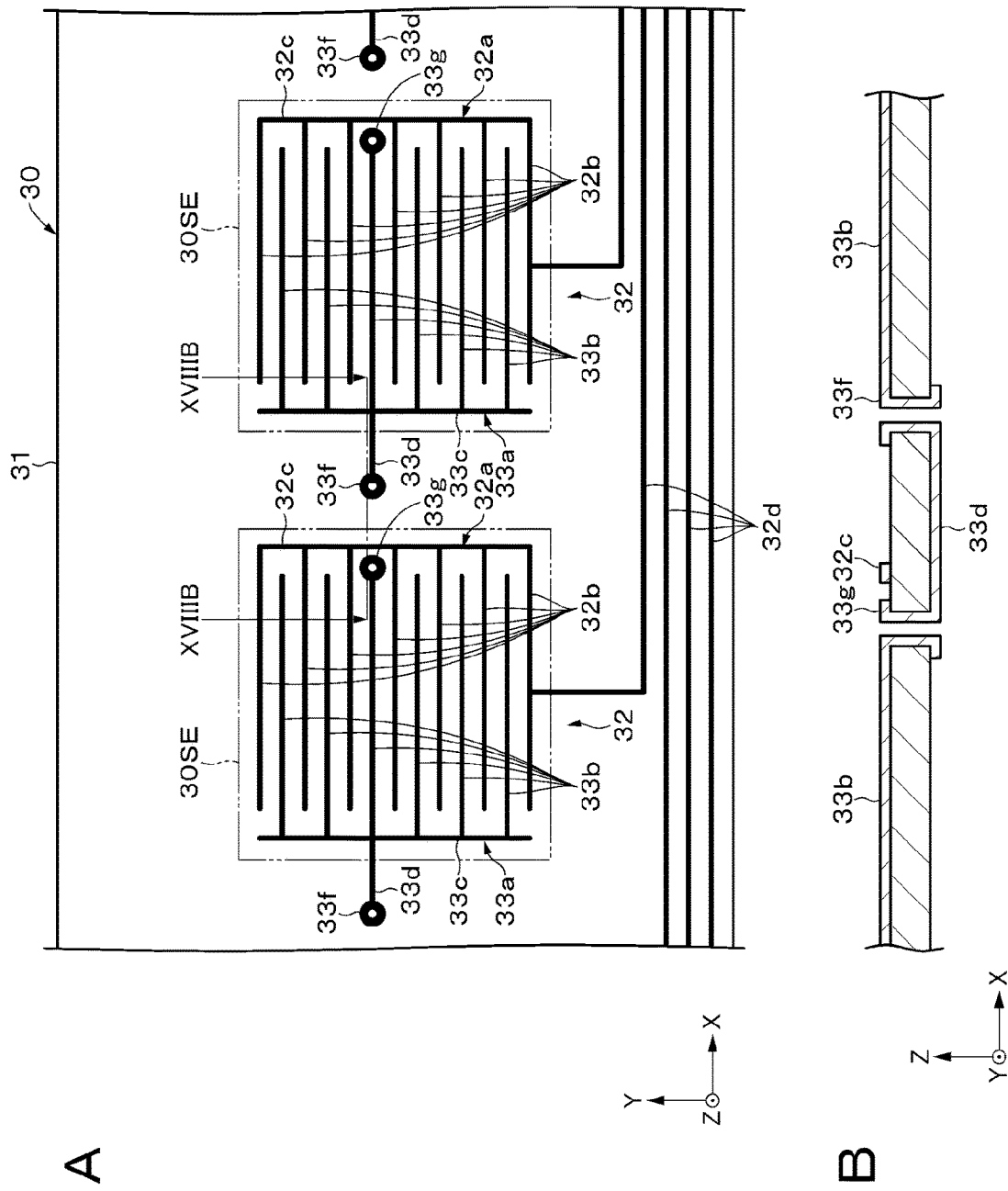
FIG. 18A is a plan view illustrating a modification of the flexible printed circuit.
FIG. 18B is a cross-sectional view taken along line XVIIIB-XVIIIB of FIG. 18A.

As illustrated in FIG. 18, the base material 31 may have via holes 33f and 33g as through holes. In this case, the via holes 33f and 33g are formed so as to sandwich the linking portion 32c. The connecting portion 33d is drawn from one main surface of the base material 31 to the other main surface thereof via the via hole 33f, then returns to the one main surface from the other main surface via the via hole 33g, and thereby connects the adjacent unit electrode bodies 33a to each other. This makes it possible to connect the adjacent unit electrode bodies 33a to each other without using a jumper wire or the like. Therefore, it is possible to suppress inhibition of deformation of the electrode base material 21 by a thicker insulating layer (not illustrated) such as a coverlay film. Furthermore, the unit electrode bodies 33a can be stably connected to each other as compared with the case of using a jumper wire or the like.

Furthermore, in the above-described first embodiment, the configuration in which the pulse electrode 32 and the sense electrode 33 are disposed on the same surface of the base material 31 has been described. However, a configuration in which the pulse electrode 32 is disposed on one surface of the base material 31 and the sense electrode 33 is disposed on the other surface may be adopted. In this case, the unit electrode bodies 32A and 33A may each have a shape other than a comb teeth shape, and may have, for example, a mesh shape, a concentric shape, or a spiral shape. Furthermore, a configuration in which the pulse electrode 32 and the sense electrode 33 are exchanged for each other may be adopted.

(Modification of how Sensor is Disposed)

In the above-described first embodiment, the configuration in which the electronic apparatus 10 includes the sensors 20 and 20 on the inner side surfaces 11SR and 11SL of the side wall portions 11R and 11L of the exterior body 11, respectively, has been described. However, the sensor 20 may be disposed on an inner side surface of the main surface portion 11M of the exterior body 11, or the sensor 20 may be disposed on an inner side surface of the front panel 14.

(Modification of Operation of Electronic Apparatus)

The electronic apparatus 10 may perform the following operation at the time of wake-up operation. The IC 13a determines whether or not the sum of output values of all the sensing units 30SE is equal to or larger than a threshold continuously for a specified number of frames. In a case where the IC 13a determines that the sum of the output values of all the sensing units 30SE is equal to or larger than the threshold continuously for the specified number of frames, the IC 13a may output a wake-up interrupt signal to the CPU 13b. In a case where the electronic apparatus 10 operates as described above, it is possible to suppress erroneous detection in a case where an object is hit on the side surface 10SR or 10SL of the electronic apparatus 10 and an impact is instantaneously applied thereto.

Figure 19:
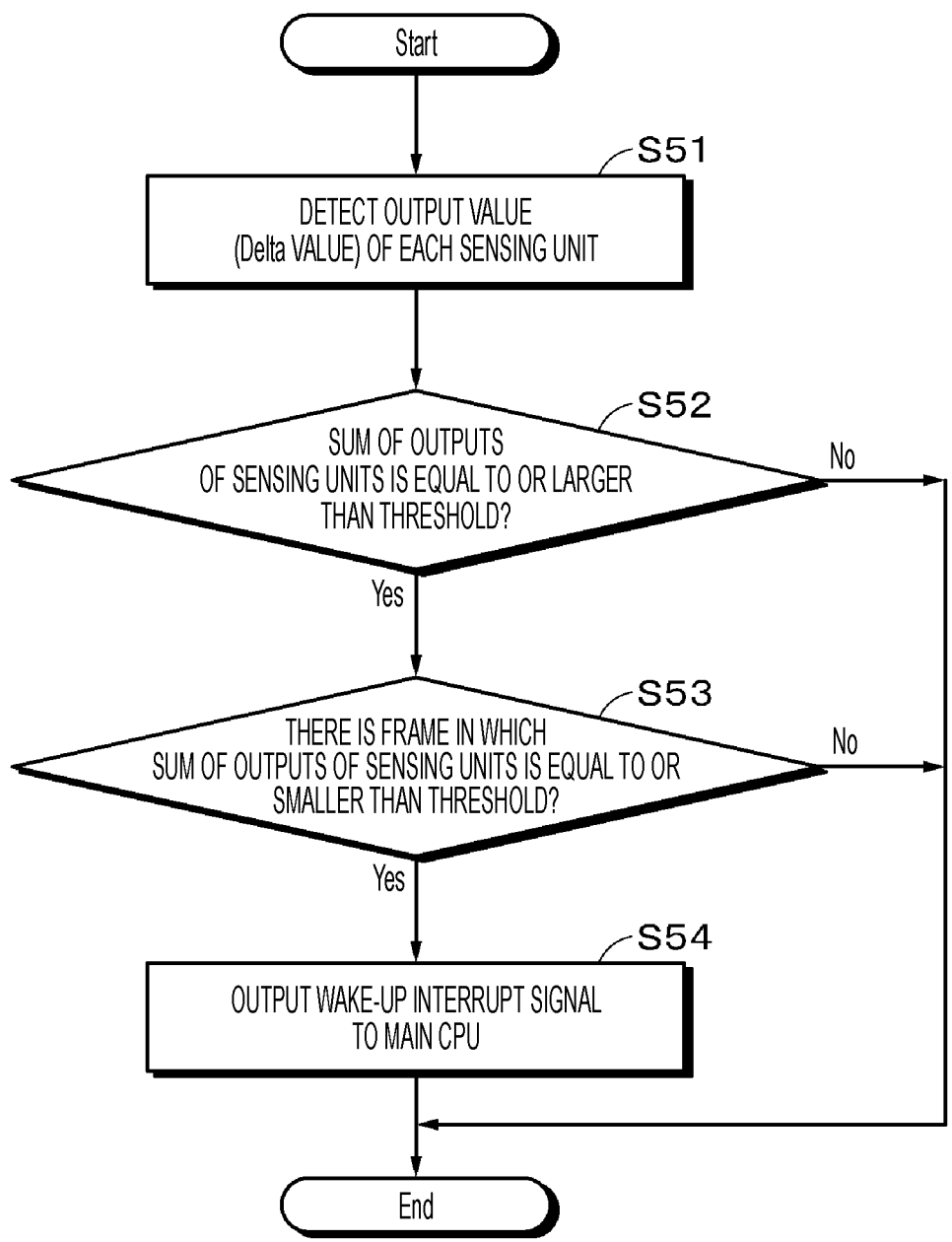
FIG. 19 is a flowchart for explaining a modification of operation of the electronic apparatus at the time of wake-up operation.

Furthermore, the electronic apparatus 10 may perform the following operation illustrated in FIG. 19 at the time of wake-up operation. First, in step S51, the IC 13a detects an output value (delta value) of each of the sensing units 30SE. Next, in step S52, the IC 13a determines whether or not the sum of output values of all the sensing units 30SE is equal to or larger than a threshold continuously for a specified number of frames.

In step S52, in a case where it is determined that the sum of the output values of all the sensing units 30SE is equal to or larger than a threshold continuously for a specified number of frames, in step S53, the IC 13a determines whether or not there is at least one frame in which the sum of the output values of all the sensing units 30SE is equal to or smaller than the threshold in a specified number of frames following the above specified number of frames. Meanwhile, in step S52, in a case where it is determined that the sum of the output values of all the sensing units 30SE is not equal to or larger than the threshold continuously for the specified number of frames, the process ends.

In step S53, in a case where it is determined that there is at least one frame in which the sum of the output values of all the sensing units 30SE is equal to or smaller than the threshold in the specified number of frames, a wake-up interrupt signal is output to the CPU 13b. Meanwhile, in step S53, in a case where it is determined that there is not at least one frame in which the sum of the output values of all the sensing units 30SE is equal to or smaller than the threshold in the specified number of frames, the process ends.

In a case where the electronic apparatus 10 operates as described above, it is possible to suppress erroneous operation of a wake-up function in a case where the electronic apparatus 10 housed in a bag or a pocket of clothes is pressed for a long time in a packed train or the like.

Furthermore, the electronic apparatus 10 may perform the following operation at the time of wake-up operation. In a case where the IC 13a determines whether or not an output value of a sensing unit 30SE at a specified position among all the sensing units 30SE is equal to or larger than a threshold and determines that the output value of the sensing unit 30SE at the specified position is equal to or larger than the threshold, the IC 13a may output a wake-up interrupt signal to the CPU 13b.

For example, as illustrated in FIG. 20A, even if the sensing unit 30SE of the sensor 20 on one side surface 10SL is pressed, the CPU 13b is not activated, and a sleeping mode is maintained. Meanwhile, as illustrated in FIG. 20B, when the sensing unit 30SE at a specified position among the sensing units 30SE of the sensors 20 and 20 on both side surfaces 10SR and 10SL is pressed, the CPU 13b wakes up from the sleeping mode and returns to a normal activation state.

In a case where the electronic apparatus 10 operates as described above, the CPU 13b wakes up from the sleeping mode and returns to a normal activation state only in a case where a user grips the electronic apparatus 10 consciously in a specific manner. Therefore, erroneous operation of the wake-up function can be suppressed. Furthermore, security of the electronic apparatus 10 can be improved.

(Examples of Electronic Apparatus Other than Smartphone)

In the above-described first embodiment, the case where the electronic apparatus is a smartphone has been described as an example. However, the present technology is not limited thereto, and can be applied to various electronic apparatuses each including an exterior body such as a housing. For example, the present technology can be applied to a personal computer, a mobile phone other than a smartphone, a television, a remote controller, a camera, a game apparatus, a navigation system, an electronic book, an electronic dictionary, a portable music player, a wearable terminal such as a smart watch or a head mound display, a radio, a stereo, a medical apparatus, and a robot.

(Examples Other than Electronic Apparatus)

The present technology is not limited to the electronic apparatus, but can also be applied to various ones other than the electronic apparatus. For example, the present technology can be applied to an electric apparatus such as a power tool, a refrigerator, an air conditioner, a water heater, a microwave oven, a dishwasher, a washing machine, a dryer, a lighting apparatus, or a toy. Moreover, the present technology can also be applied to a building including a house, a building member, a vehicle, furniture such as a table or a desk, a manufacturing device, an analysis apparatus, and the like. Examples of the building member include a bed stone, a wall material, a floor tile, and a floor board. Examples of the vehicle include a wheeled vehicle (for example, a car or a motorcycle), a ship, a submarine, a railroad wheeled vehicle, an aircraft, a spacecraft, an elevator, and a plaything.

(Other Modifications)

In the first embodiment, an example in which the present technology is applied to the side surfaces 10SR and 10SL of the electronic apparatus 10 has been described, but the present technology may be applied to the back surface or the front surface of the electronic apparatus.

In the first embodiment, a space may be formed between the inner side surfaces 11SR and 11SL and the first deformation layer 28, the inner side surfaces 11SR and 11SL and the first deformation layer 28 may be in contact with each other or substantially in contact with each other, or the inner side surfaces 11SR and 11SL and the first deformation layer 28 may be disposed such that the first deformation layer 28 is pressed in advance by the inner side surfaces 11SR and 11SL.

In the first embodiment, an example in which the electronic apparatus 10 includes the second deformation layer 23 between the electrode base material 21 and the sensor electrode unit 30, and includes the second deformation layer 24 between the electrode base material 22 and the sensor electrode unit 30 has been described. However, the electronic apparatus 10 may include only one of the second deformation layers 23 and 24.

In the first embodiment, an example in which the plurality of sensing units 30SE is arranged in a line in the X-axis direction has been described. However, the sensing units 30SE may be arranged in two or more lines.

The electronic apparatus 10 may have a zoom in/zoom out operation area in which zoom in/zoom out operation of a camera can be performed by slide operation on each of the side surfaces 10SR and 10SL as a slide operation area. In this case, it is sufficient if the IC 13a controls zoom in and zoom out of the camera according to slide operation on the zoom in/zoom out operation area.

The electronic apparatus 10 may have a screen operation area for performing operation of screen display such as screen scrolling or pointer movement by slide operation on each of the side surfaces 10SR and 10SL as a slide operation area. In this case, it is sufficient if the IC 13a controls screen display such as screen scrolling or pointer movement according to slide operation on the screen operation area. Note that the volume adjusting area VR, the zoom in/zoom out operation area, and the screen operation area may be the same as or different from one another.

At least one of the second deformation layers 23 or 24 may be absent. In a case where the second deformation layer 23 is absent, the electrode base material 21 and the sensor electrode unit 30 are bonded to each other by a thin adhesive layer. Meanwhile, when the second deformation layer 24 is absent, the electrode base material 22 and the sensor electrode unit 30 are bonded to each other by a thin adhesive layer.

The second deformation layers 23 and 24 may each have a predetermined shape pattern, or may include a plurality of columnar bodies. As the predetermined shape pattern, a pattern similar to the shape pattern of the first deformation layer 28 can be exemplified.

The first deformation layer 28 may be bonded to at least one of the sensing surface 20S or the back surface of the sensor 20, and may be disposed in advance on the sensing surface 20S and the back surface of the sensor 20, may be bonded to the inner side surfaces 11SR and 11SL of the side wall portions 11R and 11L, and may be disposed in advance on the inner side surfaces 11SR and 11SL of the side wall portions 11R and 11L, or may be bonded to the support surfaces 12SR and 12SL of the frame 12, and may be disposed in advance on the support surfaces 12SR and 12SL of the frame 12.

The above-described first embodiment has described the configuration in which the sensor 20 includes the plurality of sensing units 30SE. However, a configuration in which the sensor 20 includes one sensing unit 30SE may be adopted.

In the above-described first embodiment, the configuration in which the sensors 20 and are disposed on the inner side surfaces 11SR and 11SL of the side wall portions 11R and 11L has been described. However, a configuration in which the sensors 20 and 20 are disposed on the outer side surfaces of the side wall portions 11R and 11L may be adopted.

In a case where the sensor 20 is applied to the inside or outside of a soft housing of an apparatus such as a seat/weight scale, the elastic modulus (25% CLD) of the first deformation layer 28 is preferably 0.4 Mpa or less, and more preferably 0.3 Mpa or less. When the elastic modulus exceeds 0.4 Mpa, the first deformation layer 28 is too hard, and therefore the function of the first deformation layer 28 may be lowered. Here, the elastic modulus (25% CLD) is a value measured according to JIS K 6254.

Furthermore, the thickness of the first deformation layer 28 is preferably 100 μm or more and 10000 μm or less.

When the thickness of the first deformation layer 28 is less than 100 μm, the function of the first deformation layer 28 may be lowered. Meanwhile, when the thickness of the first deformation layer 28 exceeds 10000 μm, the deformation sensitivity may be lowered.

Furthermore, the area occupancy of the first deformation layer 28 is preferably 100% or less, and more preferably 10% or more and 100% or less. When the area occupancy of the first deformation layer 28 exceeds 100%, the function of the first deformation layer 28 may be lowered. Meanwhile, when the area occupancy of the first deformation layer 28 is less than 10%, processing of the first deformation layer 28 may be difficult.

In a case where the sensor 20 is applied to an apparatus for measuring in-plane distribution with high sensitivity, such as a commercial apparatus for detecting pressure or a projection, the elastic modulus (25% CLD) of the first deformation layer 28 is preferably 0.04 Mpa or less, and more preferably 0.03 Mpa or less. This is because when the elastic modulus exceeds 0.04 Mpa, the first deformation layer 28 is too hard, and therefore the function of the first deformation layer 28 may be lowered. Here, the elastic modulus (25% CLD) is a value measured according to JIS K 6254.

Furthermore, the thickness of the first deformation layer 28 is preferably 10 μm or more and 1000 μm or less.

When the thickness of the first deformation layer 28 is less than 10 μm, the function of the first deformation layer 28 may be lowered. Meanwhile, when the thickness of the first deformation layer 28 exceeds 1000 μm, the micro-deformation sensitivity may be lowered.

Furthermore, the area occupancy of the first deformation layer 28 is preferably 100% or less, and more preferably 50% or more and 100% or less. When the area occupancy of the first deformation layer 28 exceeds 100%, the function of the first deformation layer 28 may be lowered. Meanwhile, when the area occupancy of the first deformation layer 28 is less than 50%, in-plane sensitivity uniformity may be degraded.

2 Second Embodiment

[2.1 Configuration of Electronic Apparatus]

Figure 23:
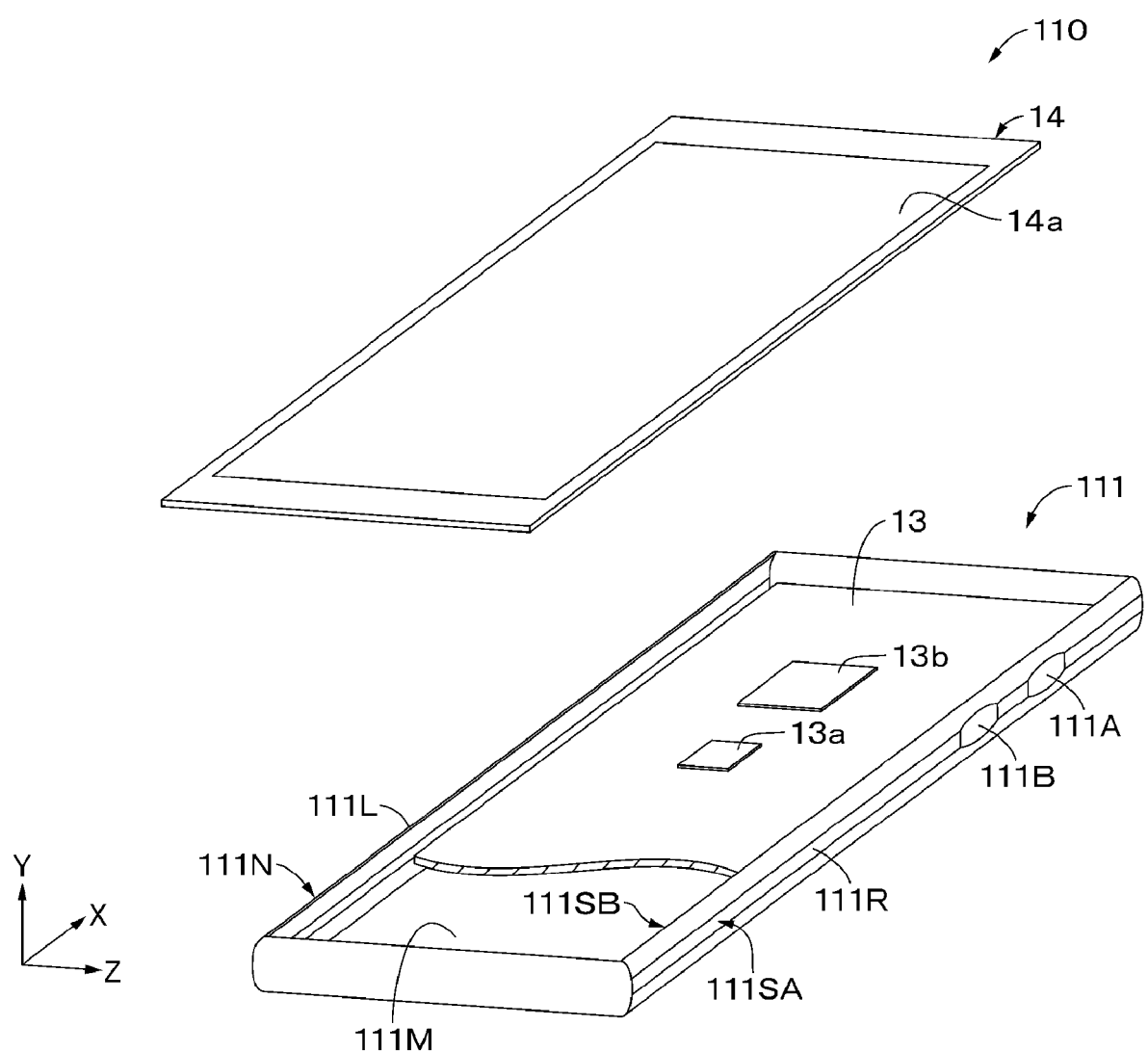
FIG. 23 is an exploded perspective view illustrating the configuration of an electronic apparatus according to a second embodiment of the present technology.

An electronic apparatus 110 according to a second embodiment of the present technology is a so-called smartphone as illustrated in FIG. 23, and includes: a housing 111 as an exterior body having a thin box shape with one main surface released; a substrate 13 housed in the housing 111; and a front panel 14 disposed so as to close the released one main surface. Note that, in the second embodiment, the same reference numerals are given to portions similar to the first embodiment, and description thereof will be omitted.

(Housing)

The housing 111 includes a rectangular plate-like bottom portion 111M constituting the back surface of the electronic apparatus 10, and a wall portion 111N disposed on the periphery of the bottom portion 111M. The wall portion 111N is erected perpendicularly to the bottom portion 111M, and has side wall portions 111R and 111L disposed on both long sides of the bottom portion 111M. The thickness of the housing 111 is preferably 1 mm or more, for example, 1.08 mm or 1.4 mm.

An outer side surface 111SA of the side wall portion 111R has depressions 111A and 111B formed in line in a length direction of the side wall portion 111R (that is, a circumferential direction of the wall portion 111N). The depressions 111A and 111B have a function as a pseudo volume button. Specifically, when one depression 111A is pressed with a finger, a volume-up process is executed. Meanwhile, when the other depression 111B is pressed with a finger, a volume-down process is executed.

The length of each of the depressions 111A and 111B as pressing portions is preferably about 10 mm or more and about 20 mm or less, for example, about 12 mm, in order to make one finger placed on each of the depressions 111A and 111B.

Figure 24:
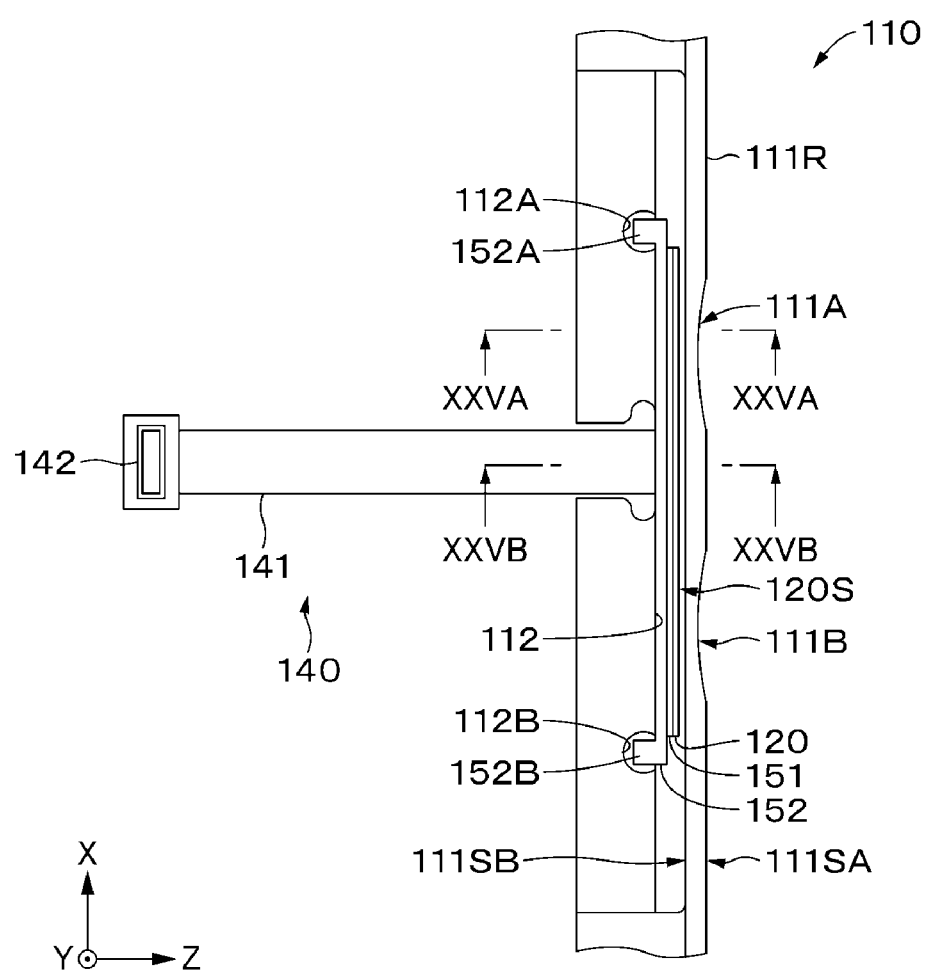
FIG. 24 is an enlarged plan view of a part of a side wall portion.

Hereinafter, the configuration of a pressing detection unit for achieving the above-described function as a pseudo volume button will be described with reference to FIGS. 24, 25A, 25B, and 26. As illustrated in FIGS. 24, 25A, and 25B, the housing 111 has a groove 112 formed along an inner side surface 111SB of the side wall portion 111R. A long sensor 120 having a film shape, a long elastic body 151 having a film shape, and a long spacer 152 having a film shape are housed in the groove 112 such that the main surfaces thereof are parallel to the inner side surface 111SB. Note that the film also includes a sheet in the present technology. Furthermore, at least one of the sensor 120, the elastic body 151, or the spacer 152 may have a plate shape.

In the groove 112, the sensor 120, the elastic body 151, and the spacer 152 overlap with one another in the order of the sensor 120, the elastic body 151, and the spacer 152 in a direction away from the side of the inner side surface 111SB. The elastic body 151 may be bonded to the sensor 120 by a double-sided adhesive tape or the like.

In the second embodiment, the housing 111 and the sensor 120 constitute an input device. The input device may further include the substrate 13 as necessary.

(Elastic Body)

The elastic body 151 is similar to the first deformation layer 28 of the first embodiment.

(Spacer)

The spacer 152 is press-fitted between the elastic body 151 and a side surface of the groove 112. By press-fitting the spacer 152 in this manner, it is possible to fill a gap generated by a variation (tolerance) in the dimensions of the groove 112, the sensor 120, and the like. One end of the spacer 152 in a width direction thereof has a wedge shape in order to facilitate press-fitting. The spacer 152 has a higher elastic modulus than the elastic body 151. The spacer 152 is, for example, a metal plate, a resin plate, or a laminated plate obtained by laminating these.

Protrusions 152A and 152B protruding in a direction perpendicular to one main surface are formed at both ends of the spacer 152. In addition, depressions 112A and 112B for fitting the protrusions 152A and 152B are formed at both ends of the groove 112.

(Sensor)

Figure 26:
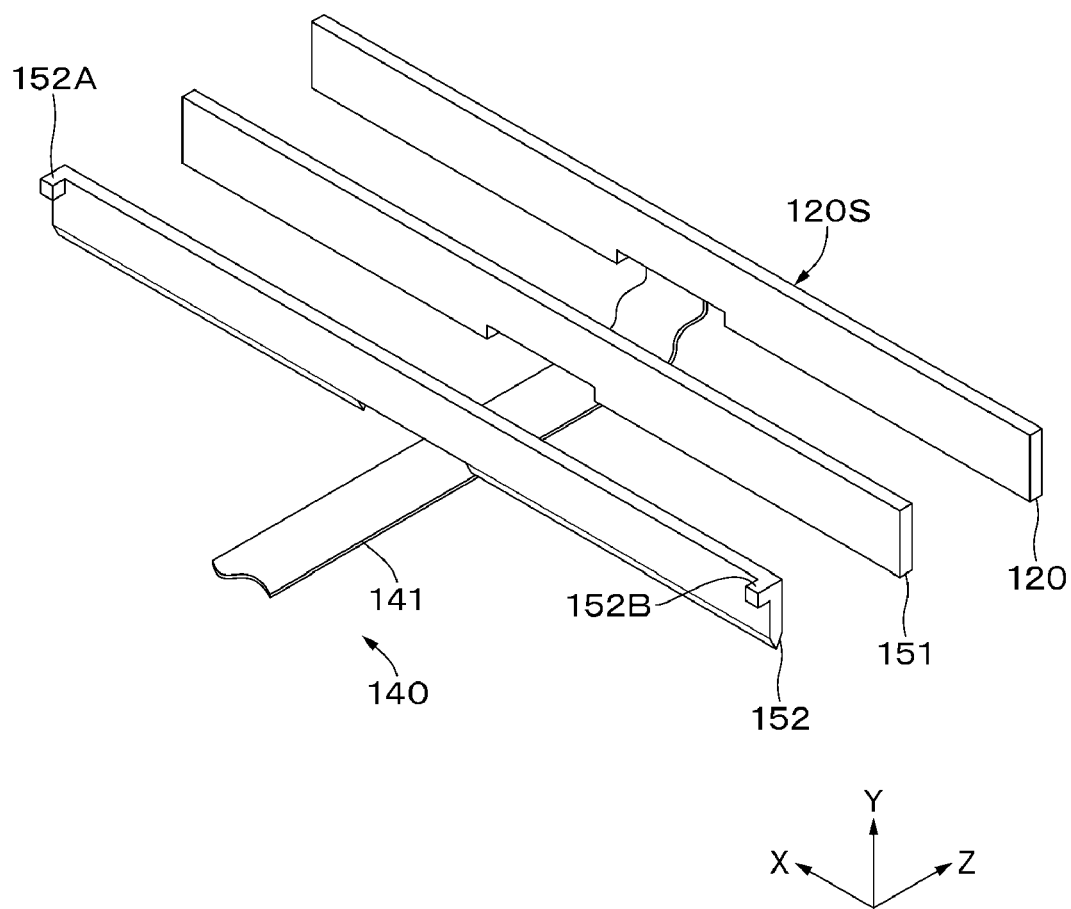
FIG. 26 is an exploded perspective view illustrating the configuration of a sensor support.

As illustrated in FIG. 26, the sensor 120 has an elongated rectangular shape, and the connecting portion 141 extends from the center of one long side of the sensor 120. As illustrated in FIG. 24, a connector 142 is disposed at a tip of the extending connecting portion 141, and the connector 142 is connected to a connector (not illustrated) disposed on the substrate 13. One main surface of the sensor 120 is a sensing surface 120S for detecting pressure, and the sensor 120 is housed in the groove 112 such that the sensing surface 120S is pressed against the inner side surface 111SB.

The sensor 120 and the connecting portion 141 are integrally configured by one FPC 140 having a T-shape. By adopting such a configuration, the number of parts can be reduced. Furthermore, impact durability of connection between the sensor 120 and the substrate 13 can be improved. However, the sensor 120 and the connecting portion 141 may be separately configured. In the case of this configuration, the sensor 120 may include, for example, a rigid substrate or a rigid flexible substrate.

Figure 27:
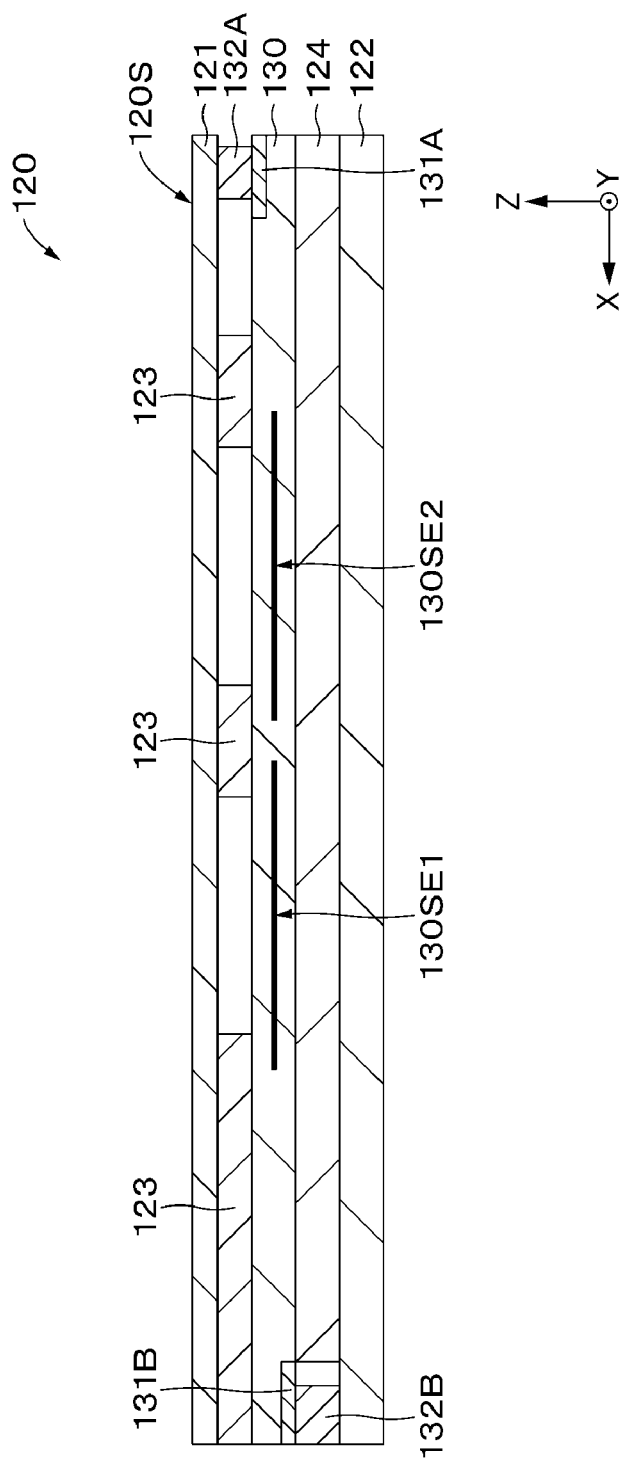
FIG. 27 is a cross-sectional view illustrating the configuration of a sensor.

The sensor 120 is a so-called pressure-sensitive sensor, and includes, as illustrated in FIG. 27, a sensor electrode layer 130 including first and second sensing units 130SE1 and 130SE2, metal layers 121 and 122, a plurality of support bodies 123, and an adhesive layer 124. The width of the sensor 120 is preferably about 2 mm or more and about 4 mm or less, for example, about 2.5 mm. The thickness of the sensor 120 including a mounting structure is preferably 2 mm or less, for example 1.53 mm.

The metal layer 121 and the sensor electrode layer 130 are disposed such that the main surfaces of the metal layer 121 and the sensor electrode layer 130 face each other. The plurality of support bodies 123 is disposed between the main surfaces of the metal layer 121 and the sensor electrode layer 130, and the metal layer 121 is supported by one main surface of the sensor electrode layer 130 such that the metal layer 121 is separated from the sensor electrode layer 130.

The metal layer 122 and the sensor electrode layer 130 are disposed such that the main surfaces of the metal layer 122 and the sensor electrode layer 130 face each other. The adhesive layer 124 is disposed between the metal layer 122 and the sensor electrode layer 130, and bonds the metal layer 122 to the sensor electrode layer 130.

The metal layers 121 and 122 may be disposed without being connected to any electrode or may be connected to an electrode of a ground voltage or an electrode of a power supply voltage in order to affect the sensor electrode layer 130 for an electric field or a magnetic field. For example, in a case of connection to an electrode of a ground voltage, the connection is made to ground electrode terminals 131A and 131B via connecting members 132A and 132B such as an anisotropic conductive film (ACF). Alternatively, the connection is made to a housing as one electrode of a ground voltage with a conductive material such as a wire mesh gasket or a copper foil conductive tape.

(Metal Layer)

The metal layers 121 and 122 each include, for example, a flexible metal plate. The metal layers 121 and 122 each include, for example, a simple substance such as aluminum, titanium, zinc, nickel, magnesium, copper, or iron, or an alloy containing two or more kinds thereof. Specific examples of the alloy include stainless used steel (SUS), an aluminum alloy, a magnesium alloy, and a titanium alloy.

The thickness of the metal layer 121 is, for example, 30 µm. The thickness of the metal layer 122 is, for example, similar to the thickness of the metal layer 121 or thicker than the thickness of the metal layer 121.

Note that the sensor 120 may include the electrode base materials 21 and 22 of the first embodiment instead of the metal layers 121 and 122. As the electrode base materials 21 and 22, a conductive film including a PET film and a metal layer (for example, ALPET (registered trademark) manufactured by PANAC Corporation) is preferable. The thickness of the electrode base material 22 is, for example, similar to the thickness of the electrode base material 21 or thicker than the thickness of the electrode base material 21.

(Support Body)

The plurality of support bodies 123 is disposed apart from one another in a longitudinal direction of the sensor 120 so as to be able to support the metal layer 121 at positions corresponding to both ends of the first and second sensing units 130SE1 and 130SE2. The support bodies 123 each include, for example, an insulating adhesive or double-sided adhesive tape. The support bodies 123 may be elastically deformed by a pressure applied to the sensing surface 120S.

(Adhesive Layer)

The adhesive layer 124 includes, for example, an insulating adhesive or double-sided adhesive tape. The adhesive layer 124 may be elastically deformed by a pressure applied to the sensing surface 120S. As each of the support bodies 123 and the adhesive layer 124, for example, a double-sided tape having a thickness of 30 μm can be used. Furthermore, for example, a double-sided tape having a thickness of 30 μm may be used as each of the support bodies 123, and a double-sided tape having a thickness of 100 μm may be used as the adhesive layer 124. The thickness of the double-sided tape may be adjusted by presence or absence of a PET base material or the thickness of the PET base material. Specific examples of the double-sided tape include a double-sided tape having a trade name of Neo Fix manufactured by Nichiei Kakoh Co., Ltd.

(Sensor Electrode Layer)

Figure 28:
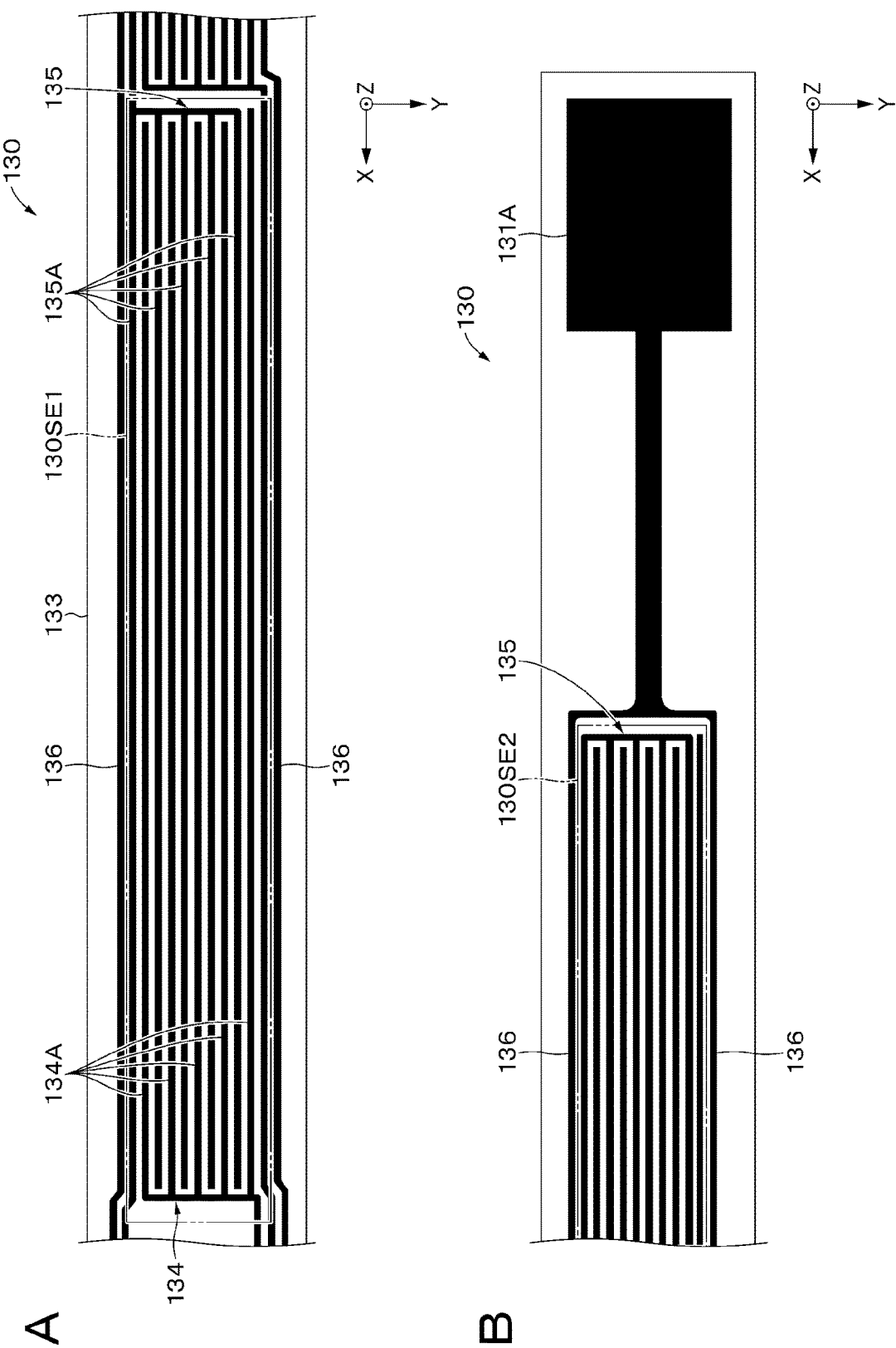
FIG. 28A is a plan view illustrating the configuration of a sensing unit or a sensing unit also serving as a resonance capacitor.
FIG. 28B is a plan view illustrating the configuration of a ground electrode or a self-capacitive sensing unit.

As illustrated in FIG. 28, the first and second electrodes 134 and 135 are disposed on one main surface of the sensor electrode layer 130, and the first and second electrodes 134 and 135 constitute the first and second sensing units 130SE1 and 130SE2. An insulating layer (not illustrated) such as a coverlay film covering the first and second electrodes 134 and 135 may be further disposed on one main surface of the sensor electrode layer 130.

The first and second electrodes 134 and 135 each have a comb teeth shape, and are disposed such that comb teeth portions are engaged with each other. Specifically, the first electrode 134 includes a plurality of linear sub electrodes 134A. The second electrode 135 includes a plurality of linear sub electrodes 135A. The plurality of sub electrodes 134A and 135A extend in the X-axis direction, and are disposed alternately so as to be separated from each other at predetermined intervals in the Y-axis direction. The adjacent sub electrodes 134A and 135A can form capacitive coupling.

The adjacent sub electrodes 134A and 135A operate as two mutual capacitive electrodes, and can also operate as one self-capacitive electrode. Furthermore, the adjacent sub electrodes 134A and 135A can be used as a resonance capacitor of a sensing and LC resonance circuit by utilizing capacitance due to bonding between the adjacent sub electrodes 134A and 135A.

The sensor electrode layer 130 may include rectangular thin film-like electrodes such as the ground electrode terminals 131A and 131B instead of the first and second sensing units 130SE1 and 130SE2. Note that the shape of the thin film-like electrode is not limited to the rectangular shape, and can also adopt a shape other than the rectangular shape. Furthermore, the number of thin film-like electrodes disposed on one main surface of the sensor electrode layer 130 may be one or more.

Furthermore, a linear ground electrode 136 is disposed on one main surface of the FPC 140 so as to surround the first and second sensing units 130SE1 and 130SE2. As illustrated in FIG. 28B, the ground electrode 136 is connected to the ground electrode terminal 131A. Furthermore, although not illustrated, the ground electrode 136 is also connected to the ground electrode terminal 131B.

The first and second sensing units 130SE1 and 130SE2 are disposed so as to form a line in a longitudinal direction of the sensor 120. The adjacent first and second sensing units 130SE1 and 130SE2 are separated from each other by a predetermined distance. The first and second sensing units 130SE1 and 130SE2 are disposed corresponding to the depressions 111A and 111B, respectively. Specifically, the first and second sensing units 130SE1 and 130SE2 are disposed so as to overlap with the depressions 111A and 111B in a thickness direction of the side wall portion 111R, respectively.

[2.2 Procedure for Disposing Sensor, Elastic Body, and Spacer]

First, one main surface of the elastic body 151 is bonded to the other main surface of the sensor 120. Next, the sensor 120 is inserted into the groove 112 such that the sensing surface 120S faces the inner side surface 111SB. Subsequently, the spacer 152 is press-fitted between the elastic body 151 and a side surface of the groove 112 such that one end having a wedge shape faces a bottom portion of the groove 112.

[2.3 Operation of Electronic Apparatus]

Figure 29:
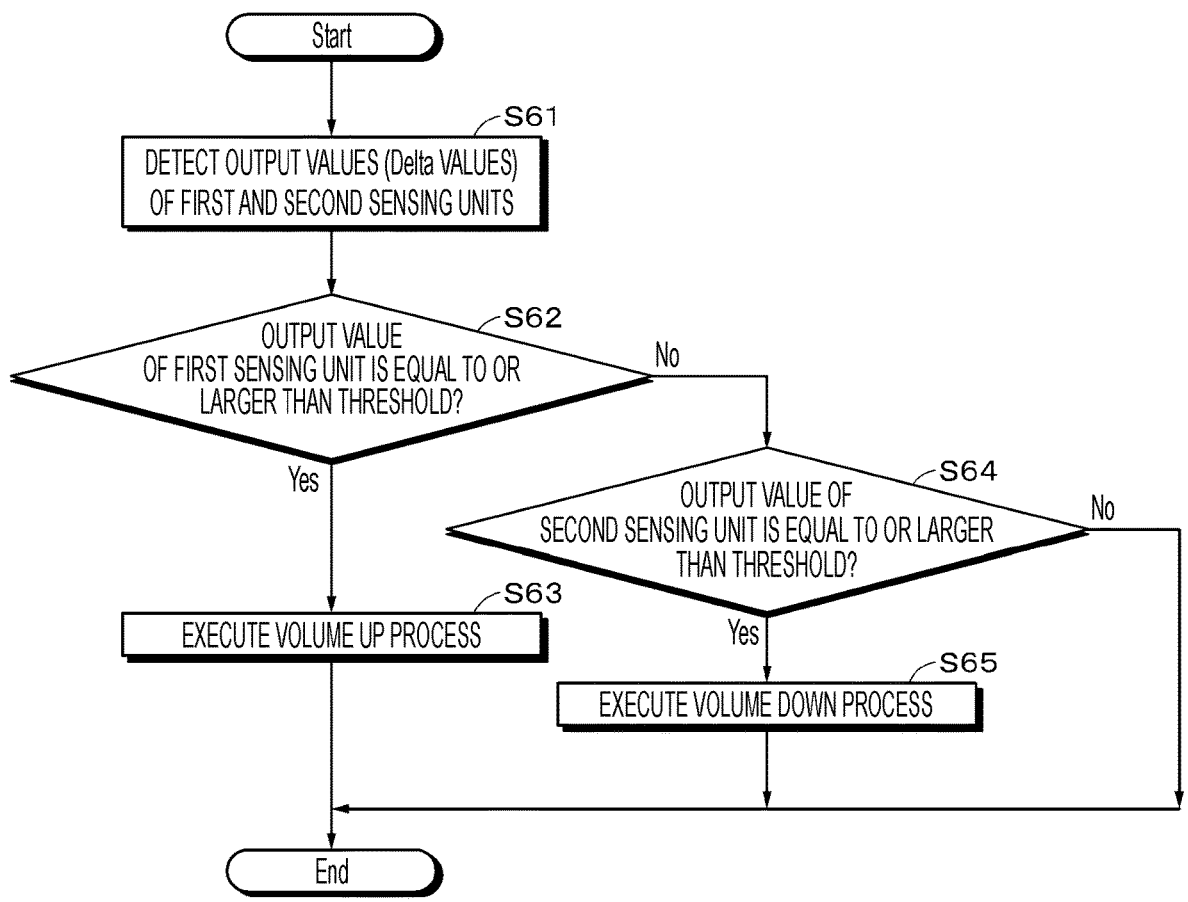
FIG. 29 is a flowchart for explaining operation of the electronic apparatus at the time of volume operation.

Hereinafter, operation of the electronic apparatus 110 at the time of volume operation will be described with reference to FIG. 29. Here, the process illustrated in FIG. 29 is executed, for example, in one frame.

First, in step S61, the IC 13a detects output values (delta values) of the first and second sensing units 130SE1 and 130SE2. Next, in step S62, the IC 13a determines whether or not the output value of the first sensing unit 130SE1 is equal to or larger than a threshold.

In step S62, in a case where it is determined that the output value of the first sensing unit 130SE1 is equal to or larger than the threshold, in step S63, the IC13a notifies the CPU 13b that the depression 111A has been pressed. Then, the CPU 13b that has received the notification executes a volume-up process.

In step S62, in a case where it is determined that the output value of the first sensing unit 130SE1 is not equal to or larger than the threshold, in step S64, the IC13a determines whether or not the output value of the second sensing unit 130SE2 is equal to or larger than the threshold.

In step S64, in a case where it is determined that the output value of the second sensing unit 130SE2 is equal to or larger than the threshold, in step S65, the IC13a notifies the CPU 13b that the depression 111B has been pressed. Then, the CPU 13b that has received the notification executes a volume-down process. In step S64, in a case where it is determined that the output value of the second sensing unit 130SE2 is not equal to or larger than the threshold, the process ends.

[2.4 Effect]

In the second embodiment, the depressions 111A and 111B are formed on the outer side surface 111SA of the side wall portion 111R, and the sensor 120 including the first and second sensing units 130SE1 and 130SE2 is disposed on the inner side surface 111SB of the side wall portion 111R. In addition, the positions of the first and second sensing units 130SE1 and 130SE2 correspond to the positions of the depressions 111A and 111B, respectively. This makes it possible to impart a function as a pseudo volume button to the depressions 111A and 111B.

[2.5 Modification]

In the second embodiment, the configuration in which the sensor 120 includes the first and second sensing units 130SE1 and 130SE2 has been described as an example, but the number of the sensing units is not limited thereto, and may be one or three or more.

In a case where the housing 111 is a metal housing, the sensor 120 does not have to include the metal layer 121. In this case, the support bodies 123 are pressed against the inner side surface 111SB, and the inner side surface 111SB is supported by the support bodies 123.

Furthermore, in a case where the spacer 152 includes a metal, the metal layer 122 does not have to be included. In this case, the spacer 152 is bonded to the sensor electrode layer 130 by the adhesive layer 124.

A leaf spring may be used instead of the spacer 152. As the leaf spring, for example, a metal plate bent in a U-shape, a W-shape, or the like can be used. Note that in a case where the metal plate has a long shape, a bending direction of the metal plate may be a longitudinal direction or a width direction.

Figure 30:
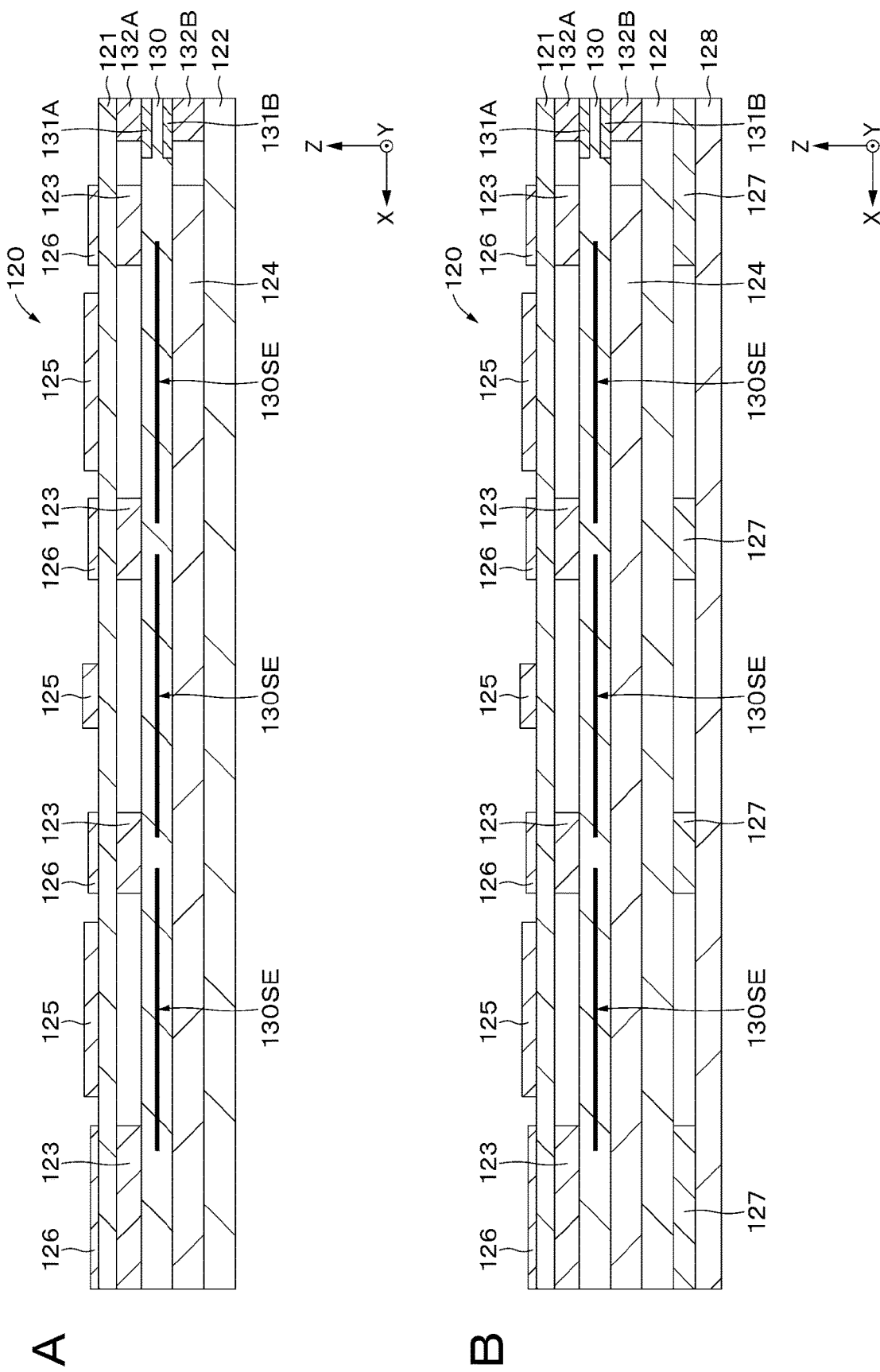
FIGS. 30A and 30B are each a cross-sectional view illustrating the configuration of a sensor.

As illustrated in FIG. 30A, the sensor 120 may include a plurality of protrusions 125 and a plurality of protrusions 126 on the sensing surface 120S (in other words, the main surface of the metal layer 121 opposite to the sensor electrode layer 130).

The protrusions 125 are formed at positions corresponding to the sensing units 130SE. Specifically, the protrusions 125 are formed so as to overlap with the sensing units 130SE in a thickness direction of the sensor 20. Meanwhile, the protrusions 126 are formed at positions corresponding to the support bodies 123. Specifically, the protrusions 126 are formed so as to overlap with the support bodies 123 in a thickness direction of the sensor 120.

The protrusions 125 and 126 are formed, for example, by printing a resin material on one main surface of the metal layer 121 or by bonding resin pieces such as a single-sided or double-sided pressure sensitive adhesive film thereto.

The size of each of the protrusions 125 may be smaller toward the center from each end of the sensing surface 120S in a longitudinal direction thereof. This makes it possible to adjust the sensitivity of the sensing units 130SE. Furthermore, each of the protrusions 125 is preferably higher than each of the protrusions 126.

By forming the protrusions 125 on the sensing surface 120S as described above, it is possible to fill a gap (void) generated by a variation (tolerance) in the dimensions of the groove 112 and the sensor 210, and to maintain contact between the sensing surface 120S and the inner side surface 111S of the side wall portion 111R. Furthermore, by forming the protrusions 126 on the sensing surface 120S as described above, it is possible to suppress excessive deformation of the sensing surface 120S due to formation of the protrusions 125. Therefore, reduction of a dynamic range can be suppressed. Furthermore, when the sensing surface 120S is pressed, the inner side surface 111SB of the side wall portion 111R can be supported by the protrusions 126. Therefore, deformation of the inner side surface 111SB of the side wall portion 111R can be concentrated on a portion corresponding to the sensing unit 120SE.

Furthermore, the protrusions 125 and 126 may be formed on the inner side surface 111SB of the side wall portion 111R instead of forming the protrusions 125 and 126 on the sensing surface 120S.

As illustrated in FIG. 30B, the sensor 120 may further include the deformation layer 128 on the back surface of the sensor 120 opposite to the sensing surface 120S (in other words, the main surface of the metal layer 122 opposite to the sensor electrode layer 130). As the deformation layer 128, a layer similar to the first deformation layer 28 of the first embodiment can be used. As the deformation layer 128, it is preferable to use a microcell polymer sheet (PORON (registered trademark) manufactured by Rogers Inoac Corporation) having a thickness of 0.5 mm. By inclusion of the deformation layer 128 in the sensor 120, it is possible to fill a gap generated by a variation (tolerance) in the dimensions of the groove 112, the sensor 120, and the like.

In a case where the sensor 120 includes the deformation layer 128, a plurality of support bodies 127 may be disposed between the metal layer 122 and the deformation layer 128. The support bodies 127 are disposed at positions corresponding to the support bodies 123. Specifically, the support bodies 127 are disposed so as to overlap with the support bodies 123 in a thickness direction of the sensor 120. As the support bodies 127, support bodies similar to the support bodies 123 can be used. By inclusion of the support bodies 127 in the sensor 120, it is possible to suppress deformation of the metal layer 122 toward the sensing units 130SE due to pressing of the back surface of the sensor 120 by the deformation layer 128.

Figure 31:
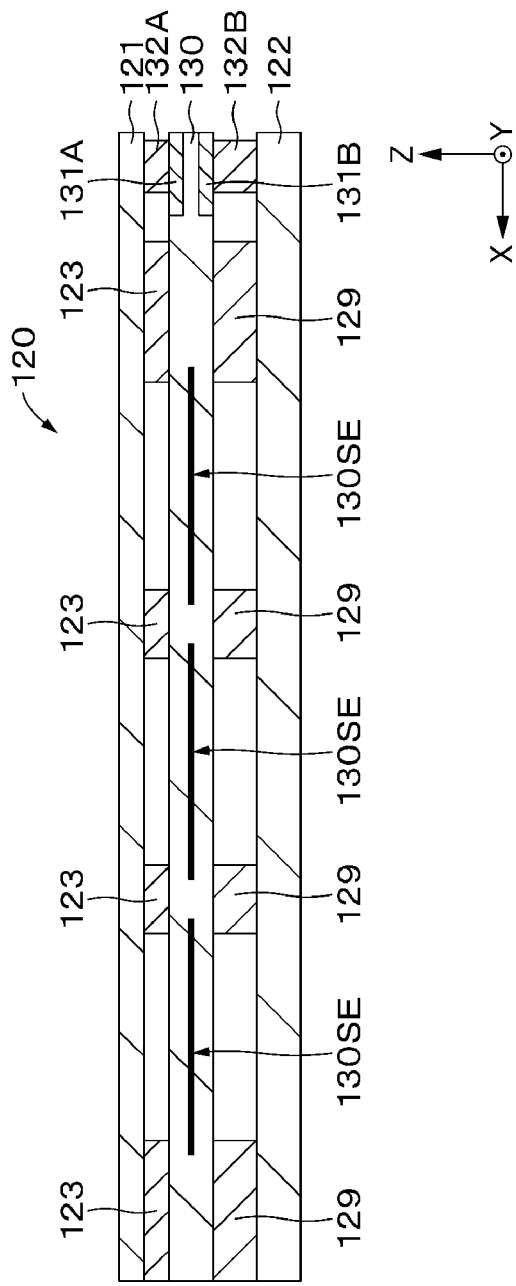
FIG. 31 is a cross-sectional view illustrating the configuration of a sensor.

As illustrated in FIG. 31, the sensor 120 may include a plurality of support bodies 129 instead of the adhesive layer 124. The plurality of support bodies 129 is disposed between the main surfaces of the metal layer 122 and the sensor electrode layer 130, and the metal layer 122 is supported by the other main surface of the sensor electrode layer 130 such that the metal layer 122 is separated from the sensor electrode layer 130. The support bodies 129 each include, for example, an insulating adhesive or double-sided adhesive tape. The support bodies 129 may be elastically deformed by a pressure applied to the sensing surface 120S.

Figure 32:
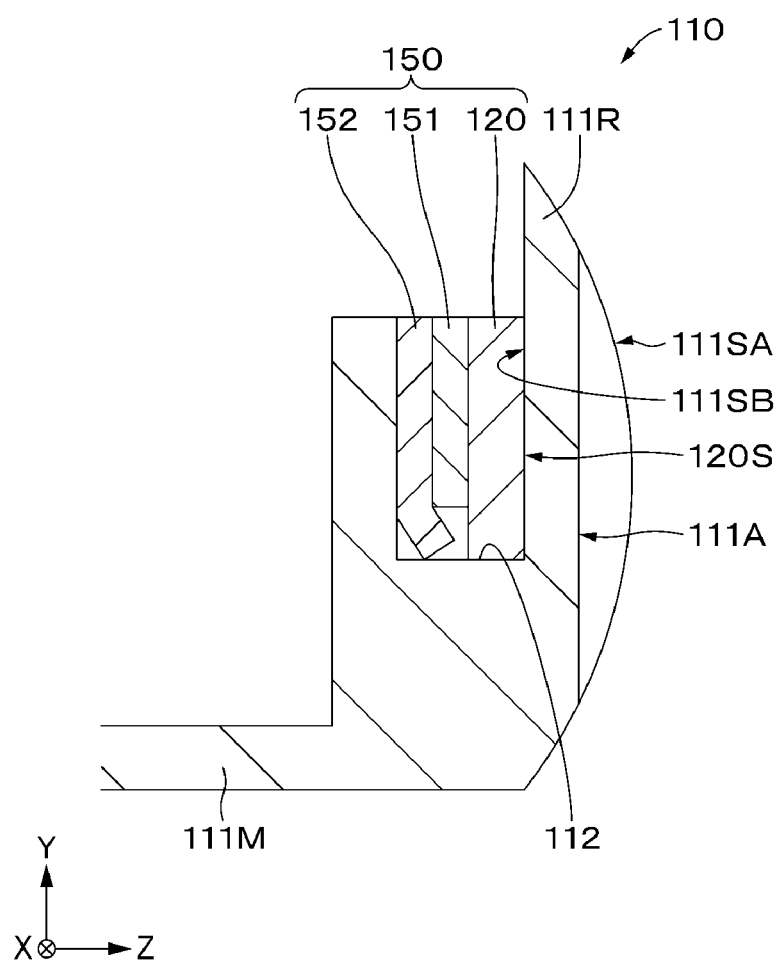
FIG. 32 is a cross-sectional view illustrating the configuration of a sensor support.

As illustrated in FIG. 32, by bonding the sensor 120, the elastic body 151, and the spacer 152 in advance to one another to form a laminate 150, and bending or curving one end of the spacer 152 in a width direction thereof toward the sensor 120, one end of the laminate 150 in a width direction thereof may be formed into a wedge shape. By adopting such a configuration, the sensor 120, the elastic body 151, and the spacer 152 can be easily press-fitted into the groove 112. The above configuration is particularly effective in a case where the spacer 152 is thin. This is because in a case where the spacer 152 is thin, it may be difficult to press-fit the spacer 152 alone into the groove 112 as in the first embodiment.

For example, in a case where the thickness of the sensor 120 is 0.5 mm, the thickness of the elastic body 151 is 0.5 mm, the thickness of the spacer 152 is 0.2 mm, and the width of the groove 112 is 1 mm, by press-fitting the laminate 150 into the groove 112, the elastic body 151 is crushed by 0.2 mm.

The bent or curved portion formed at one end of the spacer 152 is preferably formed so as not to press the back surface of the sensor 120 and not to come into contact with the back surface of the sensor 120. Specifically, for example, preferably, one end of the elastic body 151 in a width direction thereof is positioned at a position inside the bent or curved portion of the spacer 152, and the bending amount of the bent portion or the curving amount of the curved portion is equal to or less than the thickness of the elastic body 151 in a state in which the laminate 150 is press-fitted into the groove 112. By adopting the above configuration, it is possible to prevent the bent or curved portion from pressing the back surface of the sensor 120 via the elastic body 151. Therefore, reduction of a dynamic range of the sensor 120 can be suppressed.

As illustrated in FIGS. 33A and 33B, the electronic apparatus 110 may include a support member 153 supporting the sensor 120 and the elastic body 151 such that the main surfaces thereof are parallel to the inner side surface 111SB and pressing the sensor 120 against the inner side surface 111SB via the elastic body 151. In this case, the protrusions 125 may be disposed on the sensing surface 120S of the sensor 120.

In the housing 111, holes 113A and 113B are formed near the inner side surface 111SB of the side wall portion 111R. The support member 153 has a long plate shape, and through holes 153A and 153B are formed at both ends of the support member 153 in a longitudinal direction thereof. The support member 153 is fixed to the vicinity of the inner side surface 111SB by fixing screws 154A and 154B to the holes 113A and 113B such that the screws 154A and 154B pass through the through holes 153A and 153B, respectively.

The outer side surface 111SA of the side wall portion 111R may include three depressions 111A, 111B, and 111C, and the sensor 120 may include three sensing units corresponding to the depressions 111A, 111B, and 111C. In this case, volume increase/decrease operation may be able to be performed by pressing the depressions 111A and 111B, and power on/off operation may be able to be performed by pressing the depression 111C.

In the second embodiment, the configuration in which the outer side surface 111SA of the side wall portion 111R has the depressions 111A and 111B at the pressing positions (that is, the positions corresponding to the first and second sensing units 130SE1 and 130SE2) has been described as an example, but the configuration that makes the pressing portion tactilely graspable is not limited thereto. For example, an uneven hook may be formed on the outer side surface 111SA, or a projection may be formed on the outer side surface 111SA. Furthermore, the surface roughness of the pressing portion and a peripheral portion thereof may be changed. For example, one of the pressing portion and a peripheral portion thereof may be a rough surface, and the other may be a smooth surface. Furthermore, a sensible temperature with respect to the pressing portion and a peripheral portion thereof may be changed. For example, one of the pressing portion and a peripheral portion thereof may include a metal, and the other may include a polymer resin.

Instead of making the pressing portion tactilely graspable, the pressing portion may be visually graspable or may be tactilely and visually graspable. In order to make the pressing portion visually graspable, for example, it is sufficient if at least one of a symbol, a character, a mark, a pattern, or a color is printed on the outer side surface 111SA of the housing 111. Furthermore, at least one of a symbol, a character, a mark, or a pattern in the pressing portion may be marked on the outer side surface 111SA of the housing 111. For example, in a case where a function of a volume button is imparted to the pressing portion, it is sufficient if the symbol of "+" or "−" is printed or marked on the pressing portion.

The sensor 120 may further include a temperature detection electrode unit for detecting the temperature by a change in capacitance. In this case, the IC 13a may detect the temperature on the basis of a change in capacitance of the temperature detection electrode unit, and may correct a threshold (threshold for determining pressing of the depressions 111A and 111B) on the basis of the detected temperature. As the temperature detection electrode unit, an electrode unit having a similar configuration to the first and second sensing units 130SE1 and 130SE2 may be used.

The substrate 13 may further include a temperature detection unit. In this case, the IC 13a may detect the temperature by the temperature detection unit and may correct a threshold (threshold for determining pressing of the depressions 111A and 111B) on the basis of the detected temperature.

The sensor 120 may further include a strain detection electrode unit that is deformed by a torsional strain applied to the housing 111 (specifically, the sensor 120) but is not pressed from the outside. In this case, the IC 13a may detect the strain on the basis of a change in capacitance of the strain detection electrode unit, and may correct a threshold (threshold for determining pressing of the depressions 111A and 111B) on the basis of the detected strain. As the strain detection electrode unit, an electrode unit having a similar configuration to the first and second sensing units 130SE1 and 130SE2 may be used.

The sensor 120, the elastic body 151, and the spacer 152 may be divided into a plurality of parts in a length direction of the groove 112. This makes it possible to suppress measurement error of the sensor 120 due to a torsional strain applied to the housing 111. Furthermore, a plurality of grooves 112 may be formed, and the sensor 120, the elastic body 151, and the spacer 152 may be housed in each of the grooves 112.

In the sensor 120, the first and second sensing units 130SE1 and 130SE2 of the sensor electrode layer 130 may include spiral coil wires. In this case, the spiral coil wires of the first and second sensing units 130SE1 and 130SE2 detect deformation of the metal layers 121 and 122 not by a change in electric field but by a change in magnetic field.

EXAMPLES

Hereinafter, the present technology will be described specifically with Examples, but the present technology is not limited only to these Examples.

In the following samples, the elastic modulus (25% CLD) is a value measured in accordance with JIS K 6254.

[Samples 1-1 to 1-4]

Figure 21:
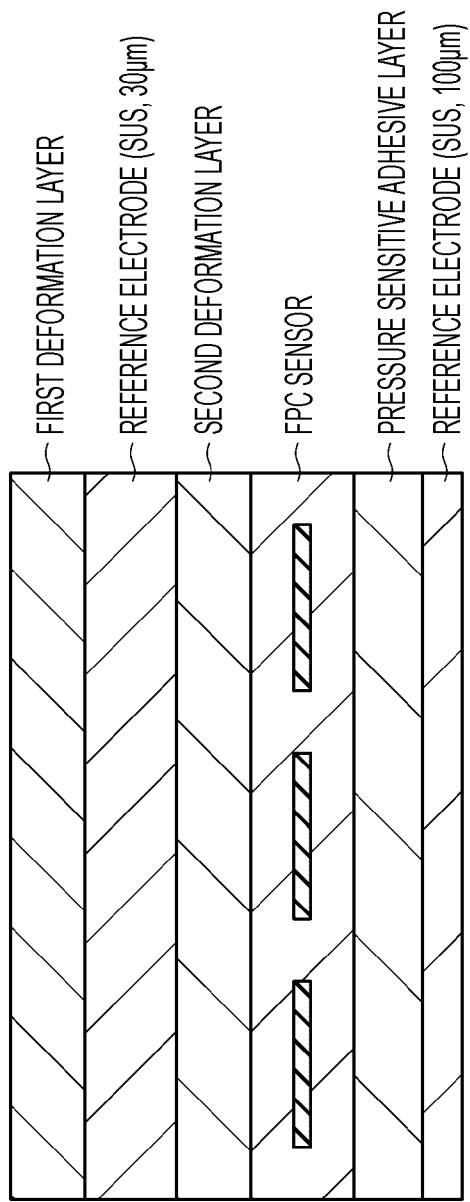
FIG. 21 is a schematic cross-sectional view illustrating the configuration of each of sensors of samples 1-1 to 1-4.

A sensor having the configuration illustrated in FIG. 21 was manufactured. Note that the following were specifically used as the first and second change layers.

<First Deformation Layer>
Material: foam (PureCell S series manufactured by Inoac Corporation)
Elastic modulus (25% CLD): 0.015 MPa
Thickness: 0 μm, 60 μm, 100 μm, or 200 μm
Area occupancy: 100%

<Second Deformation Layer>
Material: foam (PureCell 5006 manufactured by Inoac Corporation)
Elastic modulus (25% CLD): 0.028 MPa
Thickness: 60 μm
Area occupancy: 100%

[Samples 2-1 to 2-5]

A sensor was manufactured in a similar manner to Sample 1-1 except that the following was used as the first deformation layer.

<First Deformation Layer>
Material: foam (PureCell 020, S006, S010, or S020 manufactured by Inoac Corporation, or PORON SR-S-20P manufactured by Rogers Inoac Corporation)
Elastic modulus (25% CLD): 0.036 MPa, 0.028 MPa, 0.015 MPa, 0.012 MPa, or 0.006 MPa
Thickness: 200 μm
Area occupancy: 100%

[Samples 3-1 to 3-4]

A sensor was manufactured in a similar manner to Sample 1-1 except that the following was used as the first deformation layer.

<First Deformation Layer>
Material: foam (PureCell 5006 manufactured by Inoac Corporation)
Elastic modulus (25% CLD): 0.028 MPa
Area occupancy: 100%. 75%, 50%, or 10%

[Sample 4]

A sensor was manufactured in a similar manner to Sample 1-1 except that a PET base material having a thickness of 20 μm and an area occupancy of 110% was used as the first deformation layer. Note that the elastic modulus (25% CLD) of the PET base material was unmeasurable.

[Evaluation]

For the sensors manufactured as described above, a relationship between a load and a displacement amount, and a relationship between a load and delta were determined. Tables 1 to 4 and FIG. 22 illustrate results thereof.

Table 1 illustrates evaluation results of the sensors of Samples 1-1 to 1-4.

TABLE 1

| Load [gf] | Sample 1-1 (Thickness of first deformation layer: 0 μm) | | Sample 1-2 (Thickness of first deformation layer: 60 μm) | | Sample 1-3 (Thickness of first deformation layer: 100 μm) | | Sample 1-4 (Thickness of first deformation layer: 200 μm) | |
|---|---|---|---|---|---|---|---|---|
| | Displacement [μm] | Delta | Displacement [μm] | Delta | Displacement [μm] | Delta | Displacement [μm] | Delta |
| 20 | 19 | 53 | 28 | 66 | 27 | 44 | 43 | 43 |
| 30 | 23 | 89 | 33 | 92 | 36 | 75 | 61 | 83 |
| 40 | 27 | 111 | 37 | 129 | 44 | 98 | 74 | 103 |
| 50 | 30 | 165 | 41 | 172 | 50 | 139 | 85 | 161 |
| 100 | 41 | 350 | 56 | 349 | 71 | 337 | 116 | 355 |
| 150 | 49 | 473 | 65 | 471 | 82 | 467 | 132 | 472 |
| 200 | 55 | 584 | 71 | 577 | 90 | 564 | 143 | 579 |
| 250 | 59 | 630 | 75 | 625 | 95 | 646 | 150 | 655 |
| 300 | 63 | 700 | 79 | 692 | 100 | 706 | 156 | 708 |
| 350 | 66 | 751 | 82 | 742 | 103 | 743 | 160 | 745 |
| 400 | 68 | 791 | 85 | 770 | 106 | 784 | 164 | 785 |
| 450 | 70 | 836 | 87 | 810 | 109 | 835 | 168 | 838 |
| 500 | 72 | 870 | 89 | 852 | 111 | 859 | 171 | 852 |

Table 2 illustrates the configurations and evaluation results of the sensors of Samples 1-1 to 1-4.

TABLE 2

| | Thickness of first deformation layer [μm] | Displacement amount at load of 50 g/cm² [μm] | Material of first deformation layer |
|---|---|---|---|
| Sample 1-1 | None | 30 | PureCell S series |
| Sample 1-2 | 60 | 41 | |
| Sample 1-3 | 100 | 50 | |
| Sample 1-4 | 200 | 85 | |

Table 3 illustrates the configurations and evaluation results of the sensors of Samples 2-1 to 2-5.

TABLE 3

| | Elastic modulus of first deformation layer [MPa] (25% CLD) | Displacement amount at load of 50 g/cm² [μm] | Material of first deformation layer |
|---|---|---|---|
| Sample 2-1 | 0.036 | 30 | PureCell 020 |
| Sample 2-2 | 0.028 | 41 | PureCell S006 |
| Sample 2-3 | 0.015 | 50 | PureCell S010 |
| Sample 2-4 | 0.012 | 85 | PureCell S020 |
| Sample 2-5 | 0.006 | 100 | PORON SR-S-20P |

Table 4 illustrates the configurations and evaluation results of the sensors of Samples 3-1 to 3-4 and 4.

TABLE 4

| | Area occupancy of first deformation layer [%] | Displacement amount at load of 50 g/cm² [μm] | Material of first deformation layer |
|---|---|---|---|
| Sample 3-1 | 100 | 41 | PureCell S006 |
| Sample 3-2 | 75 | 46 | |
| Sample 3-3 | 50 | 60 | |
| Sample 3-4 | 10 | 60 | |
| Sample 4 | 110 | 30 | 20 μm PET base material |

FIG. 22 indicates that a delta with respect to a change in load is almost constant regardless of the thickness of the first deformation layer, whereas a displacement with respect to the change in load increases with an increase in the thickness of the first deformation layer. Therefore, it can be seen that Samples 3-2 to 3-4 can suppress crushing of the second deformation layer and can keep the sensitivity constant even if there are variations in the thicknesses of the housings and the sensors.

Tables 1 and 2 indicate that the displacement amount of a sensor increases as the thickness of the first deformation layer increases. Table 3 indicates that the displacement amount of a sensor increases as the elastic modulus of the first deformation layer decreases. Table 4 indicates that the displacement amount of a sensor increases as the area occupancy of the first deformation layer decreases.

Hereinabove, the embodiments of the present technology and Modifications thereof have been described specifically. However, the present technology is not limited to the above embodiments and Modifications thereof, and various modifications based on a technical idea of the present technology can be made.

For example, the configurations, the methods, the steps, the shapes, the materials, the numerical values, and the like exemplified in the above embodiments and Modifications thereof are only examples, and a configuration, a method, a step, a shape, a material, a numerical value, and the like different therefrom may be used as necessary.

Furthermore, the configurations, the methods, the steps, the shapes, the materials, the numerical values, and the like in the above embodiments and Modifications thereof can be combined to each other as long as not departing from the gist of the present technology.

Furthermore, the present technology can adopt the following configurations.

(1)

An electronic apparatus including:

an exterior body;

a pressure-sensitive sensor having a first surface and a second surface;

a support body supporting the pressure-sensitive sensor such that the exterior body faces the first surface; and a first deformation layer disposed on at least either between the first surface and the exterior body or between the second surface and the support body, in which the pressure-sensitive sensor includes a capacitive sensor electrode unit including a sensing unit, a reference electrode layer, and a second deformation layer disposed between the reference electrode layer and the sensor electrode unit, and the first deformation layer and the second deformation layer satisfy at least one of relationships represented by the following formulas (1) to (3).

$$\text{Elastic modulus of the first deformation layer} \leq \text{elastic modulus of the second deformation layer} \quad (1)$$

$$\text{Thickness of the first deformation layer} \geq \text{thickness of the second deformation layer} \quad (2)$$

$$\text{Area occupancy of the first deformation layer} \leq \text{area occupancy of the second deformation layer} \quad (3)$$

(2)
The electronic apparatus according to (1), in which the first deformation layer and the second deformation layer each contain a foamed resin.

(3)
The electronic apparatus according to (1) or (2), in which the first deformation layer has a shape pattern.

(4)
The electronic apparatus according to any one of (1) to (3), in which the exterior body contains a metal or a polymer resin.

(5)
The electronic apparatus according to any one of (1) to (4), in which
the exterior body has a side wall portion, and
the pressure-sensitive sensor and the first deformation layer are disposed on the side wall portion.

(6)
The electronic apparatus according to any one of (1) to (5), in which the exterior body is a housing.

(7)
The electronic apparatus according to any one of (1) to (6), in which the exterior body can press the first surface by being pressed toward the first surface.

(8)
The electronic apparatus according to any one of (1) to (7), in which the first deformation layer and the second deformation layer satisfy at least two of the relationships represented by the above formulas (1) to (3).

(9)
The electronic apparatus according to any one of (1) to (7), in which the first deformation layer and the second deformation layer satisfy all the relationships represented by the above formulas (1) to (3).

(10)
The electronic apparatus according to any one of (1) to (9), in which the first deformation layer and the second deformation layer satisfy at least one of relationships represented by the following formulas (4) to (6).

$$\text{Elastic modulus of the first deformation layer} \leq \text{elastic modulus of the second deformation layer} \quad (4)$$

$$\text{Thickness of the first deformation layer} \geq \text{thickness of the first deformation layer} \quad (5)$$

$$\text{Area occupancy of the first deformation layer} \leq \text{area occupancy of the first deformation layer} \quad (6)$$

(11)
The electronic apparatus according to any one of (1) to (10), in which the first deformation layer has an elastic modulus of 0.04 MPa or less,
the first deformation layer has a thickness of 10 μm or more and 1000 μm or less, and
the first deformation layer has an area occupancy of 10% or more and 100% or less.

(12)
An electronic apparatus including:
an exterior body;
a pressure-sensitive sensor having a first surface and a second surface;
a support body supporting the pressure-sensitive sensor such that the exterior body faces the first surface; and
a first deformation layer disposed on at least either between the first surface and the exterior body or between the second surface and the support body, and including a conductive material, in which
the pressure-sensitive sensor includes
a capacitive sensor electrode unit including a sensing unit, and
a second deformation layer disposed between the first deformation layer and the sensor electrode unit, and
the first deformation layer and the second deformation layer satisfy at least one of relationships represented by the following formulas (1) to (3).

$$\text{Elastic modulus of the first deformation layer} \leq \text{elastic modulus of the second deformation layer} \quad (1)$$

$$\text{Thickness of the first deformation layer} \geq \text{thickness of the second deformation layer} \quad (2)$$

$$\text{Area occupancy of the first deformation layer} \leq \text{area occupancy of the second deformation layer} \quad (3)$$

(13)
A sensor including:
a pressure-sensitive sensor main body having a first surface and a second surface; and
a first deformation layer disposed on at least one of the first surface or the second surface, in which
the pressure-sensitive sensor main body includes
a capacitive sensor electrode unit including a sensing unit,
a reference electrode layer, and
a second deformation layer disposed between the reference electrode layer and the sensor electrode unit, and
the first deformation layer and the second deformation layer satisfy at least one of relationships represented by the following formulas (1) to (3).

$$\text{Elastic modulus of the first deformation layer} \leq \text{elastic modulus of the second deformation layer} \quad (1)$$

$$\text{Thickness of the first deformation layer} \geq \text{thickness of the second deformation layer} \quad (2)$$

$$\text{Area occupancy of the first deformation layer} \leq \text{area occupancy of the second deformation layer} \quad (3)$$

(14)
An input device including:
an exterior body;
a pressure-sensitive sensor having a first surface and a second surface;
a support body supporting the pressure-sensitive sensor such that the exterior body faces the first surface; and
a first deformation layer disposed at least either between the first surface and the exterior body or between the second surface and the support body, in which
the pressure-sensitive sensor includes
a capacitive sensor electrode unit including a sensing unit,
a reference electrode layer, and
a second deformation layer disposed between the reference electrode layer and the sensor electrode unit, and the first deformation layer and the second deformation layer satisfy at least one of relationships represented by the following formulas (1) to (3).

$$\text{Elastic modulus of the first deformation layer} \leq \text{elastic modulus of the second deformation layer} \quad (1)$$

$$\text{Thickness of the first deformation layer} \geq \text{thickness of the second deformation layer} \quad (2)$$

$$\text{Area occupancy of the first deformation layer} \leq \text{area occupancy of the second deformation layer} \quad (3)$$

REFERENCE SIGNS LIST

10 Electronic apparatus
11 Exterior body
11M Main surface portion
11R, 11L Side wall portion
11SR, 11SL Inner side surface
11VR Volume adjusting area
11CR Camera holding area
11SHR Shutter operating area
12 Frame
12SR, 12SL Support surface
13 Substrate
13a Controller IC
13b CPU
14 Front panel
14a Display device
20 Sensor
20S Sensing surface
21, 22 Electrode base material
21a, 22a Base material
21b, 22b Reference electrode layer
23, 24 Second deformation layer
25 to 27 Adhesive layer
28 First deformation layer
30 Sensor electrode unit
30SE Sensing unit
31 Base material
32 Pulse electrode (first electrode)
33 Sense electrode (second electrode)

The invention claimed is:

1. An electronic apparatus comprising:
an exterior body;
a pressure-sensitive sensor having a first surface and a second surface;
a support body supporting the pressure-sensitive sensor such that the exterior body faces the first surface; and
a first deformation layer disposed at least either between the first surface and the exterior body or between the second surface and the support body, wherein
the pressure-sensitive sensor includes
a capacitive sensor electrode unit including a sensing unit,
a reference electrode layer, and
a second deformation layer disposed between the reference electrode layer and the sensor electrode unit, and the first deformation layer and the second deformation layer satisfy at least one of relationships represented by the following formulas (1) to (3), $$\text{Elastic modulus of the first deformation layer} \leq \text{elastic modulus of the second deformation layer} \quad (1)$$

$$\text{Thickness of the first deformation layer} \geq \text{thickness of the second deformation layer} \quad (2)$$

$$\text{Area occupancy of the first deformation layer} \leq \text{area occupancy of the second deformation layer} \quad (3)$$

2. The electronic apparatus according to claim 1, wherein the first deformation layer and the second deformation layer each contain a foamed resin.

3. The electronic apparatus according to claim 1, wherein the first deformation layer has a shape pattern.

4. The electronic apparatus according to claim 1, wherein the exterior body contains a metal or a polymer resin.

5. The electronic apparatus according to claim 1, wherein the exterior body has a side wall portion, and
the pressure-sensitive sensor and the first deformation layer are disposed on the side wall portion.

6. The electronic apparatus according to claim 1, wherein the exterior body includes a housing.

7. The electronic apparatus according to claim 1, wherein the exterior body can press the first surface by being pressed toward the first surface.

8. The electronic apparatus according to claim 1, wherein the first deformation layer and the second deformation layer satisfy at least two of the relationships represented by the above formulas (1) to (3).

9. The electronic apparatus according to claim 1, wherein the first deformation layer and the second deformation layer satisfy all the relationships represented by the above formulas (1) to (3).

10. The electronic apparatus according to claim 1, wherein the first deformation layer and the second deformation layer satisfy at least one of relationships represented by the following formulas (4) to (6), $$\text{Elastic modulus of the first deformation layer} < \text{elastic modulus of the second deformation layer} \quad (4)$$

$$\text{Thickness of the first deformation layer} > \text{thickness of the first deformation layer} \quad (5)$$

$$\text{Area occupancy of the first deformation layer} < \text{area occupancy of the first deformation layer} \quad (6)$$

11. The electronic apparatus according to claim 1, wherein
the first deformation layer has an elastic modulus of 0.04 MPa or less,
the first deformation layer has a thickness of 10 μm or more and 1000 μm or less, and
the first deformation layer has an area occupancy of 10% or more and 100% or less.

12. An electronic apparatus comprising:
an exterior body;
a pressure-sensitive sensor having a first surface and a second surface;
a support body supporting the pressure-sensitive sensor such that the exterior body faces the first surface; and a first deformation layer disposed at least either between the first surface and the exterior body or between the second surface and the support body, and including a conductive material, wherein the pressure-sensitive sensor includes a capacitive sensor electrode unit including a sensing unit, and a second deformation layer disposed between the first deformation layer and the sensor electrode unit, and the first deformation layer and the second deformation layer satisfy at least one of relationships represented by the following formulas (1) to (3), $$\text{Elastic modulus of the first deformation layer} \leq \text{elastic modulus of the second deformation layer} \quad (1)$$

$$\text{Thickness of the first deformation layer} \geq \text{thickness of the second deformation layer} \quad (2)$$

$$\text{Area occupancy of the first deformation layer} \leq \text{area occupancy of the second deformation layer} \quad (3)$$

13. A sensor comprising:

a pressure-sensitive sensor main body having a first surface and a second surface; and a first deformation layer disposed on at least one of the first surface or the second surface, wherein the pressure-sensitive sensor main body includes a capacitive sensor electrode unit including a sensing unit, a reference electrode layer, and a second deformation layer disposed between the reference electrode layer and the sensor electrode unit, and the first deformation layer and the second deformation layer satisfy at least one of relationships represented by the following formulas (1) to (3), $$\text{Elastic modulus of the first deformation layer} \leq \text{elastic modulus of the second deformation layer} \quad (1)$$

$$\text{Thickness of the first deformation layer} \geq \text{thickness of the second deformation layer} \quad (2)$$

$$\text{Area occupancy of the first deformation layer} \leq \text{area occupancy of the second deformation layer} \quad (3)$$

14. An input device comprising:

an exterior body;

a pressure-sensitive sensor having a first surface and a second surface;

a support body supporting the pressure-sensitive sensor such that the exterior body faces the first surface; and a first deformation layer disposed at least either between the first surface and the exterior body or between the second surface and the support body, wherein the pressure-sensitive sensor includes a capacitive sensor electrode unit including a sensing unit, a reference electrode layer, and a second deformation layer disposed between the reference electrode layer and the sensor electrode unit, and the first deformation layer and the second deformation layer satisfy at least one of relationships represented by the following formulas (1) to (3), $$\text{Elastic modulus of the first deformation layer} \leq \text{elastic modulus of the second deformation layer} \quad (1)$$

$$\text{Thickness of the first deformation layer} \geq \text{thickness of the second deformation layer} \quad (2)$$

$$\text{Area occupancy of the first deformation layer} \leq \text{area occupancy of the second deformation layer} \quad (3)$$

* * * * *